United States Patent
Kim et al.

(10) Patent No.: US 11,190,784 B2
(45) Date of Patent: Nov. 30, 2021

(54) METHOD FOR ENCODING/DECODING IMAGE AND DEVICE THEREFOR

(71) Applicant: SAMSUNG ELECTRONICS CO., LTD., Suwon-si (KR)

(72) Inventors: Jae-hwan Kim, Yongin-si (KR); Young-o Park, Seoul (KR); Jeong-hoon Park, Seoul (KR); Jong-seok Lee, Suwon-si (KR); Sun-young Jeon, Anyang-si (KR); Kwang-pyo Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/468,338

(22) PCT Filed: Feb. 6, 2018

(86) PCT No.: PCT/KR2018/001542
§ 371 (c)(1),
(2) Date: Jun. 11, 2019

(87) PCT Pub. No.: WO2019/009490
PCT Pub. Date: Jan. 10, 2019

(65) Prior Publication Data
US 2020/0389658 A1    Dec. 10, 2020

(30) Foreign Application Priority Data

Jul. 6, 2017   (KR) ........................ 10-2017-0086137
Jul. 6, 2017   (WO) ................. PCT/KR2017/007258

(51) Int. Cl.
*H04N 19/33*   (2014.01)
*H04N 19/117*  (2014.01)
(Continued)

(52) U.S. Cl.
CPC ............... *H04N 19/33* (2014.11); *G06N 3/08* (2013.01); *G06T 9/002* (2013.01); *H04N 19/117* (2014.11); *H04N 19/154* (2014.11); *H04N 19/80* (2014.11)

(58) Field of Classification Search
CPC ...... H04N 19/33; H04N 19/154; H04N 19/80; H04N 19/117; G06T 9/002; G06N 3/08
See application file for complete search history.

(56) References Cited

U.S. PATENT DOCUMENTS

| 8,385,406 B2 | 2/2013 | Cho et al. |
| 9,251,572 B2 | 2/2016 | Shu et al. |

(Continued)

FOREIGN PATENT DOCUMENTS

| JP | 2009-540625 A | 11/2009 |
| KR | 10-0657280 A  | 12/2006 |

(Continued)

OTHER PUBLICATIONS

Wen Tao et al., "An End-to-End Compression Framework Based on Convolutional Neural Networks", 2017 Data Compression Conference (DCC), IEEE, XP033095376, Apr. 4, 2017, pp. 463.

(Continued)

*Primary Examiner* — Nasim N Nirjhar
(74) *Attorney, Agent, or Firm* — Sughrue Mion, PLLC

(57) ABSTRACT

Provided are an image compressing method including determining a compressed image by performing downsampling using a deep neural network (DNN) on an image; determining a prediction signal by performing prediction based on the compressed image; determining a residual signal based on the compressed image and the prediction signal; and generating a bitstream comprising information about the residual signal, wherein the DNN has a network structure that is predetermined according to training of a downsam- (Continued)

pling process using information generated in an upsampling process, and an image compressing device for performing the image compressing method. Also, provided are an image reconstructing method of reconstructing a compressed image by using a DNN for upsampling, the compressed image having been compressed by the image compressing method, and an image reconstructing device for performing the image reconstructing method.

7 Claims, 28 Drawing Sheets

(51) Int. Cl.
*H04N 19/154* (2014.01)
*H04N 19/80* (2014.01)
*G06N 3/08* (2006.01)
*G06T 9/00* (2006.01)

(56) References Cited

U.S. PATENT DOCUMENTS

| | | | |
|---|---|---|---|
| 10,623,775 B1* | 4/2020 | Theis | H04N 19/61 |
| 10,986,356 B2 | 4/2021 | Kim et al. | |
| 2005/0129306 A1 | 6/2005 | Wang et al. | |
| 2007/0189392 A1 | 8/2007 | Tourapis et al. | |
| 2008/0140594 A1 | 6/2008 | Tannhof et al. | |
| 2009/0148054 A1 | 6/2009 | Kim et al. | |
| 2014/0037015 A1 | 2/2014 | Ye et al. | |
| 2014/0177706 A1 | 6/2014 | Fernandes et al. | |
| 2015/0256828 A1 | 9/2015 | Dong et al. | |
| 2016/0328630 A1 | 11/2016 | Han et al. | |
| 2016/0360155 A1 | 12/2016 | Civanlar et al. | |
| 2017/0039456 A1 | 2/2017 | Saberian et al. | |
| 2017/0345130 A1* | 11/2017 | Wang | G06K 9/66 |
| 2017/0347061 A1 | 11/2017 | Wang et al. | |
| 2018/0176576 A1* | 6/2018 | Rippel | G06K 9/00288 |
| 2019/0230354 A1 | 7/2019 | Kim | |
| 2020/0053408 A1 | 2/2020 | Park et al. | |
| 2020/0143194 A1* | 5/2020 | Hou | G06K 9/46 |
| 2021/0160556 A1 | 5/2021 | Jang | |

FOREIGN PATENT DOCUMENTS

| | | | |
|---|---|---|---|
| KR | 10-1375663 B1 | 4/2014 | |
| KR | 10-1425602 B1 | 7/2014 | |
| KR | 10-2015-0041098 A | 4/2015 | |
| KR | 10-2015-0060906 A | 6/2015 | |
| KR | 10-2016-0036662 A | 4/2016 | |
| KR | 10-2016-0131848 A | 11/2016 | |
| KR | 10-2016-0132331 A | 11/2016 | |
| KR | 10-2018-0001428 A | 1/2018 | |
| KR | 10-1885855 B1 | 8/2018 | |
| KR | 10-2018-0100976 A | 9/2018 | |
| KR | 10-2022648 B1 | 9/2019 | |
| KR | 10-2019-0130479 A | 11/2019 | |
| KR | 10-2020-0009118 A | 1/2020 | |
| WO | 2016/132148 A1 | 8/2016 | |
| WO | 2016/132152 A1 | 8/2016 | |
| WO | 2017/036370 A1 | 3/2017 | |

OTHER PUBLICATIONS

Lucas Theis et al., "Lossy Image Compression with Compressive Autoencoders", ARXIV.org, Cornell University Library, Ithaca, NY, XP080753545, Mar. 1, 2017, pp. 1-19.
Feng Jiang et al., "An End-to-End Compression Framework Based on Convolutional Neural Networks", IEEE Transactions on Circuits and Systems for Video Technology, XP055610399, Aug. 2, 2017, pp. 1-13.
Viet-Anh Nguyen et al., "Adaptive Downsampling/Upsampling for Better Video Compression at Low Bit Rate", 2008 IEEE International Symposium on Circuits and Systems, Piscataway, NJ, XP031392300, May 18, 2008, pp. 1624-1627.
Woon-Sung Park et al., "CNN-Based In-Loop Filtering for Coding Efficiency Improvement", IEEE, 2016, 5 pages.
Yuanying Dai et al., "A Convolutional Neural Network Approach for Post-Processing in HEVC Intra Coding", Oct. 29, 2016, 12 pages.
Communication dated Aug. 19, 2019, issued by the European Patent Office in counterpart European Application No. 19183429.0.
Communication dated Apr. 28, 2020, from the European Patent Office in counterpart European Application No. 19183429.0.
Haitam Ben Yahia et al. "Frame Interpolation using Convolutional Neural Networks on 2D animation" Bachelor Thesis, Jun. 24, 2016, (20 pages total) XP055558906.
Slawomir Skoneczny et al. "Classical and neural methods of image sequence interpolation" Proceedings of SPIE, vol. 4535, Aug. 24, 2001, (p. 191-204) XP055688092.
Written Opinion (PCT/ISA/237) and International Search Report (PCT/ISA/210) dated Apr. 5, 2018 issued by the International Searching Authority in International Application No. PCT/KR2017/007258.
Xiao-Jiao Mao et al., "Image Restoration Using Convolutional Auto-encoders with Symmetric Skip Connections", Cornell University Library, Retrieved from URL: <https://arxiv.org/abs/1606.08921>, Aug. 30, 2016, 18 pages.
Written Opinion (PCT/ISA/237) and International Search Report (PCT/ISA/210) dated Jul. 11, 2018 issued by the International Searching Authority in International Application No. PCT/KR2018/001542.
Communication dated Apr. 27, 2021, issued by the Korean Patent Office in counterpart Korean Patent Application No. 10-2020-0022379.
Communication dated Mar. 8, 2021, issued by the India Intellectual Property Office in Indian Patent Application No. 201927038419.
Johnston et al., "Improved Lossy Image Compression with Priming and Spatially Adaptive Bit Rates for Recurrent Networks," Computer Vision Foundation, Proceedings of the IEEE Conference on CVPR, Jun. 23, 2018, pp. 4385-4393.
Communication dated Jan. 5, 2021, issued by the Korean Intellectual Property Office in Korean Application No. 10-2019-0076569.
Communication dated Jan. 6, 2021, issued by the Korean Intellectual Property Office in Korean Application No. 10-2019-0077250.
Communication dated Jan. 13, 2021, issued by the Korean Intellectual Property Office in Korean Application No. 10-2019-0078344.
Communication dated Jan. 12, 2021, issued by the Korean Intellectual Property Office in Korean Application No. 10-2019-0078343.
Communication dated Dec. 22, 2020, issued by the Korean Intellectual Property Office in Korean Application No. 10-2019-0066057.
Communication dated Jan. 14, 2021, issued by the Korean Intellectual Property Office in Korean Application No. 10-2020-7000378.
Communication dated Dec. 16, 2020, issued by the Korean Intellectual Property Office in Korean Application No. 10-2019-0062583.
Communication dated Dec. 11, 2020, issued by the Korean Intellectual Property Office in Korean Application No. 10-2019-0041109.
Communication dated Dec. 11, 2020, from the European Patent Office in European Application No. 19 183 429.0.
Communication dated Dec. 10, 2020, issued by the Korean Intellectual Property Office in Korean Application No. 10-2019-0041102.
Seunghyun Cho et al., "A Technical Analysis on Deep Learning based Image and Video Compression", Journal of Broadcast Engineering Society, Korean Institute of Broadcast and Media Engineers, May 2018, vol. 23, No. 3, pp. 383-394 (12 pages total).
Nick Johnston et al., "Improved Lossy Image Compression with Priming and Spatially Adaptive Bit Rates for Recurrent Networks", Cornell University, Mar. 29, 2017, pp. 1-9 (9 pages total).

(56) References Cited

OTHER PUBLICATIONS

Christos Louizos et al., "Relaxed Quantization for Discretized Neural Networks", Cornell University, Oct. 3, 2018, pp. 1-14 (14 pages total).
Jiwon Kim et al., "Deeply-Recursive Convolutional Network for Image Super-Resolution", Cornell University, Nov. 11, 2016, pp. 1-9 (9 pages total).
Suo Qiu et al., "FReLU: Flexible Rectified Linear Units for Improving Convolutional Neural Networks" Cornell University, Jan. 29, 2018, pp. 1-6 (6 pages total).
Xiao-Jiao Mao et al., "Title:Image Restoration Using Convolutional Auto-encoders with Symmetric Skip Connections", , arxiv.org, Cornell university, Jun. 29, 2016, pp. 1-17 (22 pages total).
Sergey Ioffe, et al. Batch Normalization: Accelerating Deep Network Training by Reducing Internal Covariate Shift, Cornell University, Feb. 11, 2015, pp. 1-11.
Li et al., "Learning a Convolutional Neural Network for Image Compact-Resolution," IEEE Transactions on Image Processing, vol. 28, No. 3, pp. 1092-1107, Mar. 2019, XP011703593.
Li et al., "Convolutional Neural Network-Based Block Up-Sampling for Intra Frame Coding," IEEE Transactions on Circuits and Systems for Video Technology, vol. 28, No. 9, pp. 2316-2330, Sep. 2018, XP055610817.
Communication dated Jun. 1, 2021, issued by the International Searching Authority in counterpart International Application No. PCT/KR2021/002204 (PCT/ISA/220, 210, 237).
Communication dated Jul. 27, 2021, issued by the Korean Patent Office in counterpart Korean Patent Application No. 10-2020-0022379.
Communication dated Jun. 7, 2021, issued by the INDIA Intellectual Property Office in Indian Patent Application No. 201924041670.
Communication dated Aug. 9, 2021, issued by the Korean Patent Office in counterpart Korean Patent Application No. 10-2019-0062583.
Communication dated Jun. 21, 2021, issued by the Korean Patent Office in counterpart Korean Patent Application No. 10-2019-0062583.
Communication dated Jun. 21, 2021, issued by the Korean Patent Office in counterpart Korean Patent Application No. 10-2019-0066057.
Communication dated Aug. 9, 2021, issued by the Korean Patent Office in counterpart Korean Patent Application No. 10-2019-0066057.
Communication dated Jun. 29, 2021, issued by the European Patent Office in counterpart European Application No. 19872393.4.
Communication dated Oct. 4, 2021, from the European Patent Office in European Application No. 19873223.2.
Mehdi S. M. Sajjadi et al., "EnhanceNet: Single Image Super-Resolution Through Automated Texture Synthesis", IEEE International Conference on Computer Vision, 2017, pp. 4501-4510 (10 pages total).
Tiantong Guo et al., "Deep Learning Based Image Super-Resolution with Coupled Backpropagation", GlobalSIP, 2016, pp. 237-241 (5 pages total).

\* cited by examiner

FIG. 20

| BLOCK SHAPE DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD FOR ENCODING/DECODING IMAGE AND DEVICE THEREFOR

TECHNICAL FIELD

The disclosure relates to a method and device for changing an original signal and a decoded signal before and after an image encoding process or an image decoding process so as to improve encoding and decoding efficiencies.

BACKGROUND ART

Image data is encoded according to a predetermined data compression standard, for example, a codec according to the Moving Picture Expert Group (MPEG) standard, and then is stored in a recording medium or transferred via a communication channel in the form of a bitstream.

As hardware for reproducing and storing high resolution or high quality image content is being developed and supplied, a need for a codec for effectively encoding or decoding the high resolution or high quality image content is increasing. Image content that has been encoded may be reproduced by being decoded. Recently, methods of effectively compressing the high resolution or high quality image content are performed. For example, a method of efficiently compressing an image to be encoded, by processing the image in a proper manner, is performed.

DESCRIPTION OF EMBODIMENTS

Technical Problem

There is a need for preventing deterioration in coding efficiency that occurs when the amount of information of an original image to be encoded is increased, and a need for improving efficiency in a process of receiving a bitstream of an encoded image and decoding the encoded image.

Solution to Problem

According to an embodiment, an image reconstructing method may include obtaining, from a bitstream, a residual signal with respect to a compressed image obtained by downsampling an image; decoding the compressed image by using the residual signal and a prediction signal obtained by performing prediction; and reconstructing the image by performing upsampling using a deep neural network (DNN) on the decoded compressed image, wherein the DNN has a network structure that is predetermined according to training of an upsampling process using information generated in a downsampling process.

According to an embodiment, an image compressing method may include determining a compressed image by performing downsampling using a deep neural network (DNN) on an image; determining a prediction signal by performing prediction based on the compressed image; determining a residual signal based on the compressed image and the prediction signal; and generating a bitstream including information about the residual signal, wherein the DNN has a network structure that is predetermined according to training of a downsampling process using information generated in an upsampling process.

According to an embodiment, an image reconstructing device may include a residual signal obtainer configured to obtain, from a bitstream, a residual signal with respect to a compressed image obtained by downsampling an image; and a reconstructor configured to decode the compressed image by using the residual signal and a prediction signal obtained by performing prediction, and reconstruct the image by performing upsampling using a deep neural network (DNN) on the decoded compressed image, wherein the DNN has a network structure that is predetermined according to training of an upsampling process using information generated in a downsampling process.

Advantageous Effects of Disclosure

It is possible to improve encoding and decoding efficiencies by decreasing data throughput in a process of encoding and decoding images having a large amount of information.

BRIEF DESCRIPTION OF DRAWINGS

FIG. 20 illustrates a process of determining a depth of a coding unit as a shape and size of the coding unit change, when the coding unit is recursively partitioned such that a plurality of coding units are determined, according to an embodiment.

BEST MODE

Figure 1A:
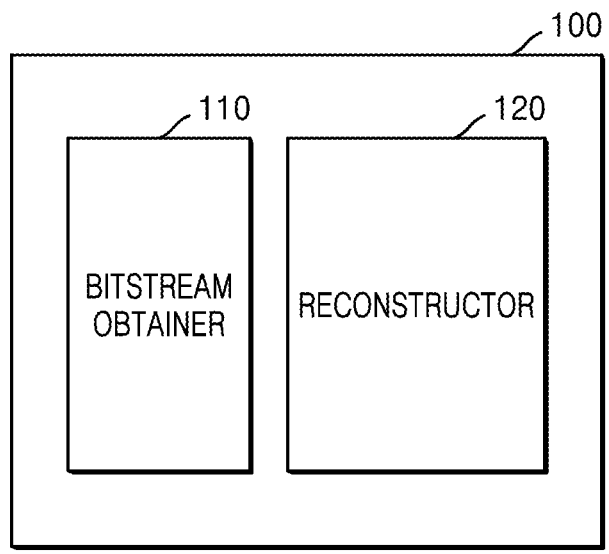
FIG. 1A illustrates a block diagram of an image reconstructing device for reconstructing an image, according to an embodiment.

According to an embodiment, an image reconstructing method includes obtaining, from a bitstream, a residual signal with respect to a compressed image obtained by downsampling an image; decoding the compressed image by using the residual signal and a prediction signal obtained by performing prediction; and reconstructing the image by performing upsampling using a deep neural network (DNN) on the decoded compressed image, wherein the DNN has a network structure that is predetermined according to training of an upsampling process using information generated in a downsampling process.

According to an embodiment, the reconstructing of the image may include performing upsampling by using a deep convolutional neural network including a plurality of hidden layers.

According to an embodiment, the performing of the upsampling by using the deep convolutional neural network may include performing the upsampling by performing filtering in each of the plurality of hidden layers by using at least one of a plurality of filter kernels, and types of the plurality of filter kernels are different from types of filter kernels used when the image is downsampled.

According to an embodiment, the upsampling may include performing filtering by using at least one filter kernel in each of a plurality of layers of the DNN.

According to an embodiment, the filtering may include performing filtering using a plurality of filter kernels in a layer in which the plurality of filter kernels are used, the layer being from among the plurality of hidden layers; concatenating a plurality of signals obtained according to a result of the filtering; and performing filtering in a next layer by using the concatenated signals as an input of the next layer.

According to an embodiment, the concatenating of the plurality of signals may include, when feature maps including the plurality of signals have difference sizes, performing padding on the feature maps so as to allow the sizes of the feature maps to be equal; and concatenating the padded feature maps.

According to an embodiment, the DNN used by the image reconstructing method may trained to allow a sum of at least one lossy information to be decreased, wherein the at least one lossy information is determined by comparing an image with an original image before downsampling is performed and the image being reconstructed by performing upsampling, and some of the at least one lossy information may be used in a training process for a DNN for downsampling.

According to an embodiment, an image compressing method may include determining a compressed image by performing downsampling using a deep neural network (DNN) on an image; determining a prediction signal by performing prediction based on the compressed image; determining a residual signal based on the compressed image and the prediction signal; and generating a bitstream including information about the residual signal, wherein the DNN has a network structure that is predetermined according to training of a downsampling process using information generated in an upsampling process.

According to an embodiment, the determining of the compressed image may include determining the compressed image by using a deep convolutional neural network including a plurality of hidden layers.

According to an embodiment, the determining of the compressed image may include generating the compressed image by performing filtering in each of the plurality of hidden layers by using at least one of a plurality of filter kernels.

According to an embodiment, the performing of the filtering may include performing filtering using a plurality of filter kernels in a layer in which the plurality of filter kernels are used, the layer being from among the plurality of hidden layers; concatenating a plurality of signals obtained according to a result of convolution; and performing filtering in a next layer by using the concatenated signals as an input of the next layer.

According to an embodiment, the generating of the bitstream may include generating the bitstream including sampling information indicating a degree of a decrease in at least one of a size of the image and a frame rate of the image, the decrease being caused by the downsampling.

According to an embodiment, a DNN for downsampling may be trained to allow a sum of at least one lossy information to be decreased, the at least one lossy information indicating a loss caused by the downsampling using the DNN, some of the at least one lossy information may be determined by comparing an image with an original image before downsampling is performed and the image being reconstructed by performing upsampling on the compressed image after the compressed image is decoded, and a result of the comparing may be used in a training process for a DNN for upsampling.

According to an embodiment, an image reconstructing device may include a residual signal obtainer configured to obtain, from a bitstream, a residual signal with respect to a compressed image obtained by downsampling an image; and a reconstructor configured to decode the compressed image by using the residual signal and a prediction signal obtained by performing prediction, and reconstruct the image by performing upsampling using a deep neural network (DNN) on the decoded compressed image, wherein the DNN has a network structure that is predetermined according to training of an upsampling process using information generated in a downsampling process.

Mode of Disclosure

Advantages and features of the present disclosure and methods of accomplishing the same may be understood more readily by reference to the following detailed descriptions of embodiments and the accompanying drawings. The present disclosure may, however, be embodied in many different forms and should not be construed as being limited to the embodiments set forth herein. Rather, these embodiments are provided so that the present disclosure will be thorough and complete and will fully convey the concept of the present disclosure to those of ordinary skill in the art.

Terms that are used in the specification will be briefly described, and the present disclosure will be described in detail.

All terms used in the present disclosure are general terms that are selected in consideration of their functions in the present disclosure and are currently widely used. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed descriptions of the disclosure. Thus, the terms used herein have to be defined based on the meaning of the terms together with the description throughout the specification.

In the present specification, a singular form may include plural forms, unless there is a particular description contrary thereto.

Throughout the specification, when a part "includes" or "comprises" an element, unless there is a particular description contrary thereto, the part may further include another element, not excluding other elements. The term "unit", as used in the specification, means a software or hardware component, such as a Field Programmable Gate Array (FPGA) or Application Specific Integrated Circuit (ASIC), which performs certain tasks. However, the "unit" is not limited to software or hardware. The "unit" may be configured to reside on an addressable storage medium and to execute one or more processors. Thus, the "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units".

Hereinafter, an "image" may indicate a static image such as a still image of a video or may indicate a dynamic image such as a moving picture that is the video itself.

Hereinafter, a "signal" or "sample" may refer to data that is allocated to a sampling location of an image and is a processing target. For example, pixel values of an image in a spatial domain and transform coefficients in a transform domain may be samples. A unit including at least one of the samples may be defined as a block.

Hereinafter, the present disclosure will now be described more fully with reference to the accompanying drawings for one of ordinary skill in the art to be able to perform the embodiments of the present disclosure without any difficulty. In addition, portions irrelevant to the description of the present disclosure will be omitted in the drawings for a clear description of the present disclosure.

FIG. 1A illustrates a block diagram of an image reconstructing device 100 for reconstructing an image, according to an embodiment.

The image reconstructing device 100 according to an embodiment may include a bitstream obtainer 110 and a reconstructor 120, the bitstream obtainer 110 being configured to obtain a bitstream and thus obtain information related to an encoded image, and the reconstructor 120 being configured to perform a process of reconstructing a compressed image by using the information obtained from the bitstream. According to an embodiment, the reconstructor 120 may obtain various types of information used in encoding an image, by using the bitstream obtained by the bitstream obtainer 110, and may reconstruct the image by performing a decoding process on the image by using the obtained information.

According to an embodiment, the reconstructor 120 may execute a program command stored in a memory and/or a storage. The reconstructor 120 may include at least one processor including a central processing unit (CPU), a graphics processing unit (GPU), or the like.

Figure 2A:
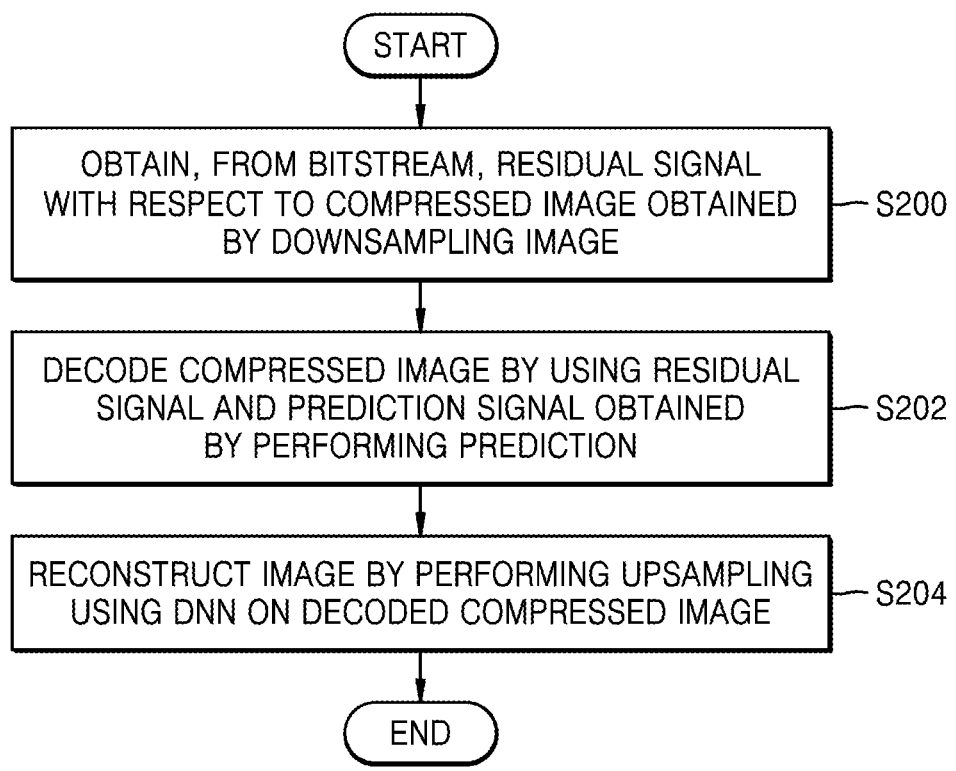
FIG. 2A is a flowchart illustrating an image reconstructing process that an image reconstructing device may perform, according to an embodiment.

FIG. 2A is a flowchart illustrating an image reconstructing process that the image reconstructing device 100 may perform, according to an embodiment.

In operation S200, the bitstream obtainer 110 of the image reconstructing device 100 according to an embodiment may obtain, from a bitstream, a residual signal with respect to a compressed image obtained by downsampling an image. According to an embodiment, the residual signal that is obtained from the bitstream by the image reconstructing device 100 may be a result of performing encoding based on a downsampled image in an image compression process.

Figure 3:
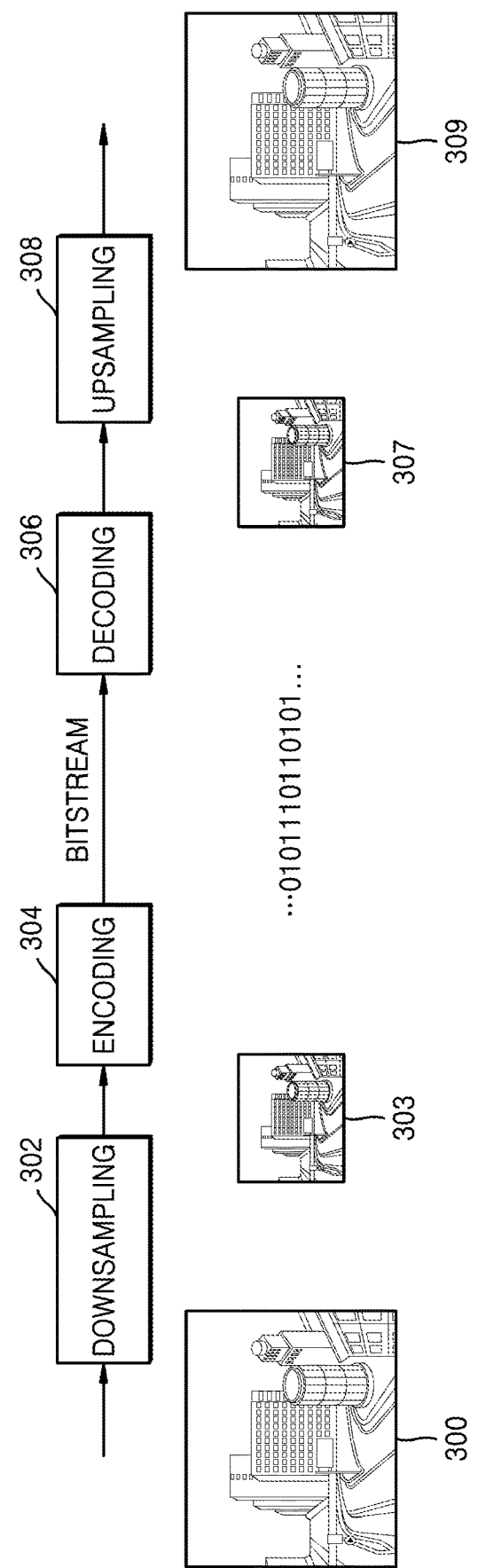
FIG. 3 is a diagram for describing a process in which a compressed image is reconstructed through encoding and decoding processes, according to an embodiment.

FIG. 3 is a diagram for describing a process in which a compressed image is reconstructed through encoding and decoding processes, according to an embodiment.

Referring to FIG. 3, an original image 300 according to an embodiment may undergo an encoding process 304 such that a bitstream that is a result of transformation to a frequency domain may be generated. The amount of information of the original signal 300 may be decreased through the encoding process 304 with respect to the original signal 300. For example, the encoding process 304 may include a process of generating a residual signal corresponding to a difference between the original signal 300 and a prediction signal; a process of transforming the residual, which is a spatial domain component, to a frequency domain component; a process of quantizing the residual signal that has been transformed to the frequency domain component; a process of generating a bitstream by entropy encoding the quantized residual signal, or the like. The residual signal that is the frequency domain component may be transformed to the spatial domain component by performing a decoding process 306 on the bitstream with respect to the residual signal, and then a reconstructed image 309 may be generated based on the residual signal.

Information throughput for encoding is increased because a size of an image to be encoded is increased, and thus, a process for improving encoding and decoding efficiencies for the image is required. According to an embodiment, a compressed image 303 obtained through downsampling 302 with respect to the original signal 300 may be generated, and the encoding process 304 may be performed on the compressed image 303. As a result of the decoding process 306 with respect to a bitstream including a result of the encoding process 304, a decoded compressed image 307 may be determined, upsampling 308 may be performed on the decoded compressed image 307, and thus a reconstructed image 309 may be determined. In detail, downsampling 302 and upsampling 308 may be performed by using a deep neural network (DNN), and processes of the downsampling 302 and upsampling 308 using the DNN will be described below in various embodiments.

In operation S202, the image reconstructing device 100 according to an embodiment may decode the compressed image by using the residual signal and a prediction signal obtained by performing prediction. The reconstructor 120 of the image reconstructing device 100 may split the compressed image to be decoded, according to a predetermined data unit. For example, the reconstructor 120 may split an image into a plurality of largest coding units, and may decode the image by using coding units determined by recursively splitting each largest coding unit. According to an embodiment, the reconstructor 120 may perform a prediction process so as to decode a signal included in a coding unit. The reconstructor 120 may add the prediction signal determined in the prediction process and the residual signal obtained in operation S200. According to an embodiment, the reconstructor 120 may additionally perform predetermined image-decoding processes (e.g., in-loop filtering, a decoded picture buffer (DPB) storing process, entropy decoding, or the like) on a result of adding the prediction signal and the residual signal. An image decoding process using a prediction signal and a residual signal may be included in various processes that one of ordinary skill in the art may easily perform.

In operation S204, the image reconstructing device 100 may reconstruct the image by performing upsampling using the DNN on the decoded compressed image. According to an embodiment, the image decoded in operation S202 may correspond to a result of obtaining, from the bitstream, and decoding information of the encoded compressed image. The reconstructor 120 may perform upsampling using the DNN on the decoded compressed image and thus may reconstruct the image.

Figure 4A:
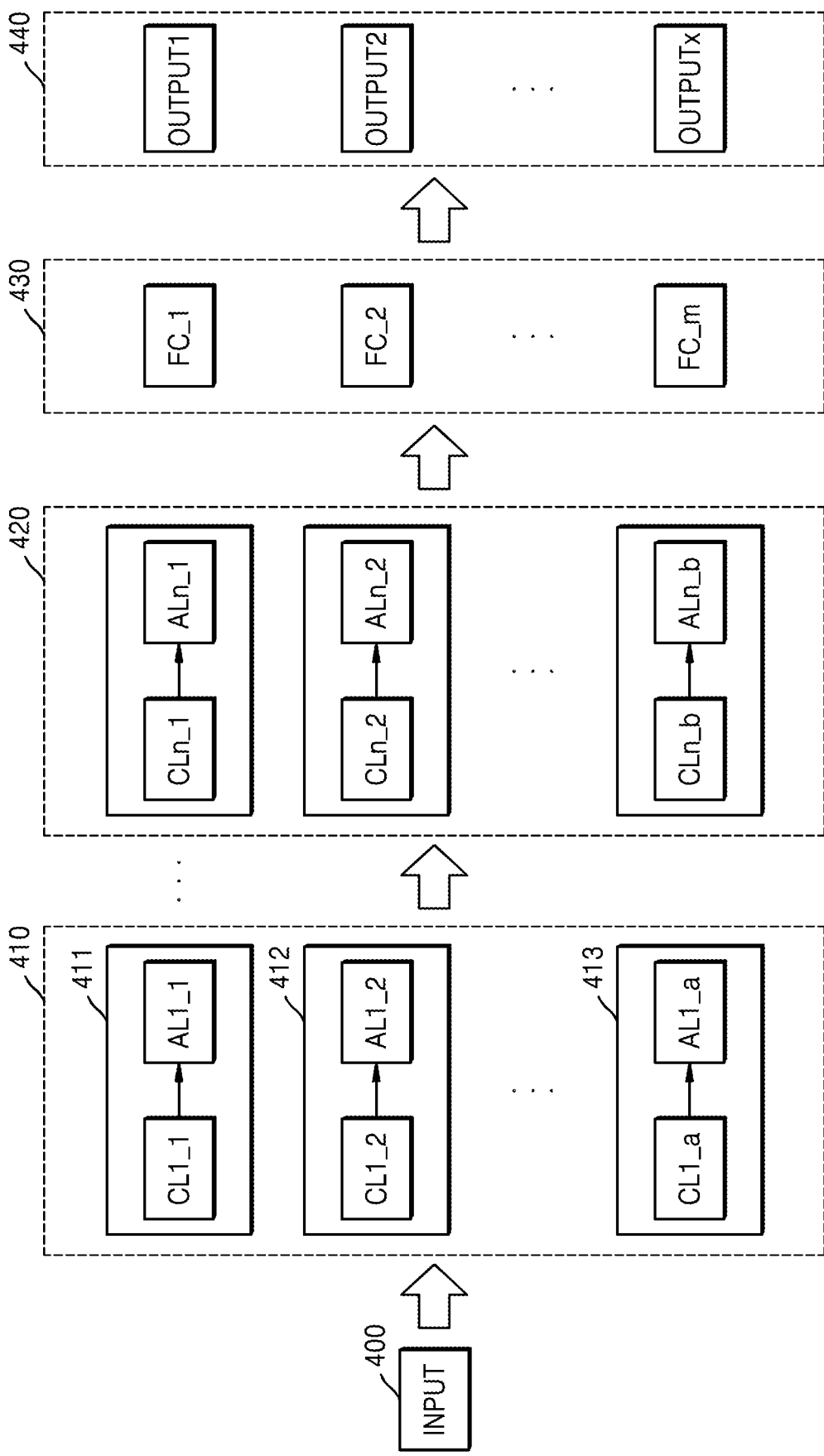
FIG. 4A is a diagram for describing a deep convolutional neural network included in a deep neural network (DNN).

FIG. 4A is a diagram for describing a deep convolutional neural network included in a DNN.

According to an embodiment, the image reconstructing device 100 may use the DNN including a plurality of layers so as to perform upsampling. According to an embodiment, to perform a convolution operation in the plurality of layers, the reconstructor 120 may use the deep convolutional neural network as the DNN capable of performing upsampling.

According to an embodiment, the deep convolutional neural network may include the plurality of layers (e.g., a plurality of layers including a first layer 410 and an $n^{th}$ layer 420). According to an embodiment, each of the plurality of layers configuring the deep convolutional neural network may include convolution layers for generating a plurality of feature maps by using filter kernels, and activation layers for adjusting a weight of the filter kernels.

Each of the convolution layers may include a plurality of nodes. According to an embodiment, a convolution layer may generate a plurality of feature maps by using a plurality of filter kernels. The feature maps generated by nodes of the convolution layer may be input to an activation layer. According to an embodiment, the reconstructor 120 may perform a convolution operation and activation on each of a plurality of nodes 411, 412, 413, or the like included in the first layer 410. The reconstructor 120 may perform a convolution operation on an input signal (e.g., an input 400 that is a compression signal) of a first layer in convolution layers $CL1\_1, CL1\_2, \ldots, CL1\_a$ included in the first layer, and different filter kernels may be used in the convolution operation with respect to each of the convolution layers $CL1\_1, CL1\_2, \ldots, CL1\_a$. According to an embodiment, to activate results of convolution operations respectively performed in the convolution layers $CL1\_1, CL1\_2, \ldots, CL1\_a$, the results of the convolution operations may be input to activation layers related to the convolution layers $CL1\_1, CL1\_2, \ldots, CL1\_a$, respectively. The reconstructor 120 may determine a plurality of feature maps of the first layer 410 by activating the results of the convolution operations. According to an embodiment, the number of a plurality of feature maps obtained from a particular layer may be in proportion to the number of filter kernels. According to an embodiment, a feature map obtained from a particular layer may be used as an input value for a next layer. That is, a feature map obtained from the first layer 410 may be input to the $n^{th}$ layer 420 (n>1) such that a convolution operation and activation may be performed. Hereinafter, for convenience of description, a predetermined signal processing process including a convolution operation and activation, which is performed in each layer, is referred to as a filtering process.

According to an embodiment, after passing through all of the plurality of layers included in the deep convolutional neural network, and then a fully-connected layer 430, an output signal 440 may be obtained.

A fully-connected layer FC may be connected to the first layer 410 to the $n^{th}$ layer 420. The fully-connected layer FC may allocate different weights to all previous layers. A method of allocating weights to previous layers may be trained, and a training method may include various methods including a supervised learning method. The reconstructor 120 may improve the deep convolutional neural network by changing, due to training, a method by which the fully-connected layer FC allocates weights to lower layers.

According to an embodiment, an activation layer may apply a non-linear feature to an output result of a convolution layer. The deep convolutional neural network may learn a non-linear function or a parameter by using activation layers. The activation layers may use an activation function. The activation function may include a sigmoid function, a tan h function, a rectified linear unit (ReLU) function, or the like, but is not construed as being limited thereto.

The deep convolutional neural network may determine weights of nodes included in each of the convolution layers. The nodes included in each of the convolution layers may generate feature maps by using different filter kernels. The deep convolutional neural network may adjust the weights of the nodes and thus may adjust weights of the filter kernels that generate the feature maps.

According to an embodiment, the reconstructor 120 may perform a process of changing weights of the nodes included in the convolution layers. A process in which the reconstructor 120 changes the weights of the nodes included in the convolution layers is referred to as a back propagation process. According to an embodiment, the reconstructor 120 may train a convolutional neural network through the back propagation process.

According to an embodiment, the reconstructor 120 may decode a compressed image that is an image downsampled by using the DNN, and then may upsample the decoded compressed image by using the DNN. According to an embodiment, a downsampling or upsampling process using the DNN may correspond to a process of compressing or decompressing at least one of spatial information such as a resolution of an image and temporal information such as a bitrate.

FIGS. 4B to 4F illustrate exemplary structures of various convolutional neural networks (CNNs).

Figure 4B:
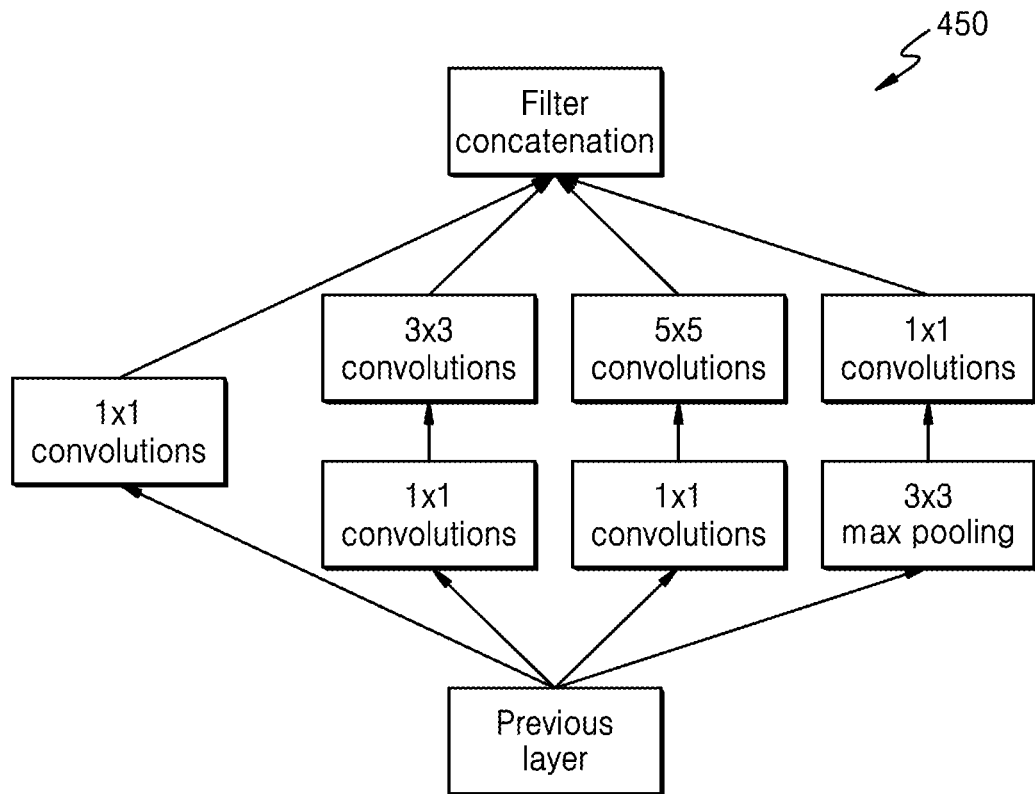
FIGS. 4B to 4F illustrate exemplary structures of various convolutional neural networks (CNNs).

Referring to FIG. 4B, a structure of a CNN according to another embodiment is illustrated.

A CNN 450 of FIG. 4B may be a network consisting of a plurality of parallel layers. That is, a plurality of convolution layers and pooling layers may be arrayed in parallel. In the CNN 450, a result output from a previous layer may be input to the plurality of separate parallel layers. The plurality of separate parallel layers may apply different filters thereto. For example, the plurality of separate parallel layers may reduce a dimension of the result according to 1×1 convolutions, and then may apply 3×3 convolutions, 5×5 convolutions, or the like thereto. In another layer, 3×3 max pooling may be performed and then convolution may be applied thereto. A layer that applies only 1×1 convolutions may function as an identity loop that maintains initial information. Outputs of the plurality of parallel layers on which convolution has been performed may be finally concatenated and thus may be output as a result of calculation with respect to a current layer. According to the CNN 450, layers are not required to be always sequentially stacked. A structure of the CNN 450 is based on a probability that a network of a non-sequentially optimized structure has errors less than those of a network of a sequential structure.

Figure 4C:
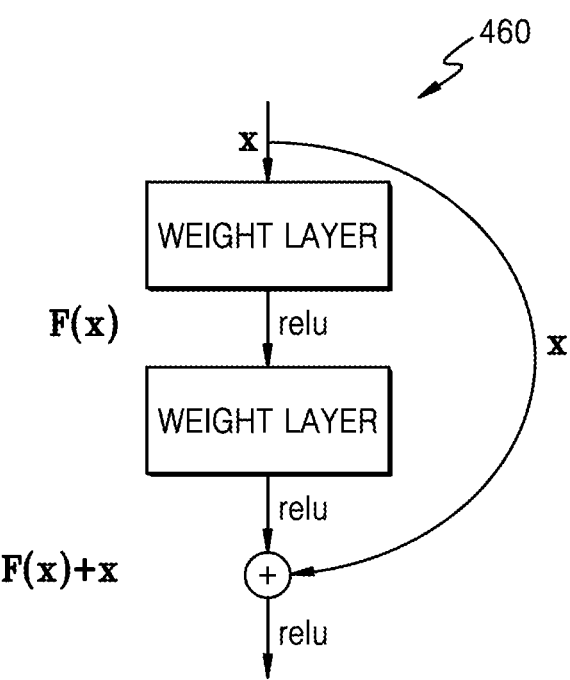

Referring to FIG. 4C, a structure of a CNN according to another embodiment is illustrated.

A CNN 460 of FIG. 4C is a network using a concept of a skip layer. The CNN 460 has a structure in which an input of a past layer is added to an output of a current layer. In the CNN 460, a result of adding the input of the past layer to the output of the current layer may be an input of a next layer. In a structure of a general CNN, a convolution and pooling process is performed in a plurality of layers such that a size of a result value may be significantly small. In this case, detail information of the result value may be lost. The CNN 460 has an effect of reinforcing detail information by reusing a past result in a convolution and pooling process.

Figure 4D:
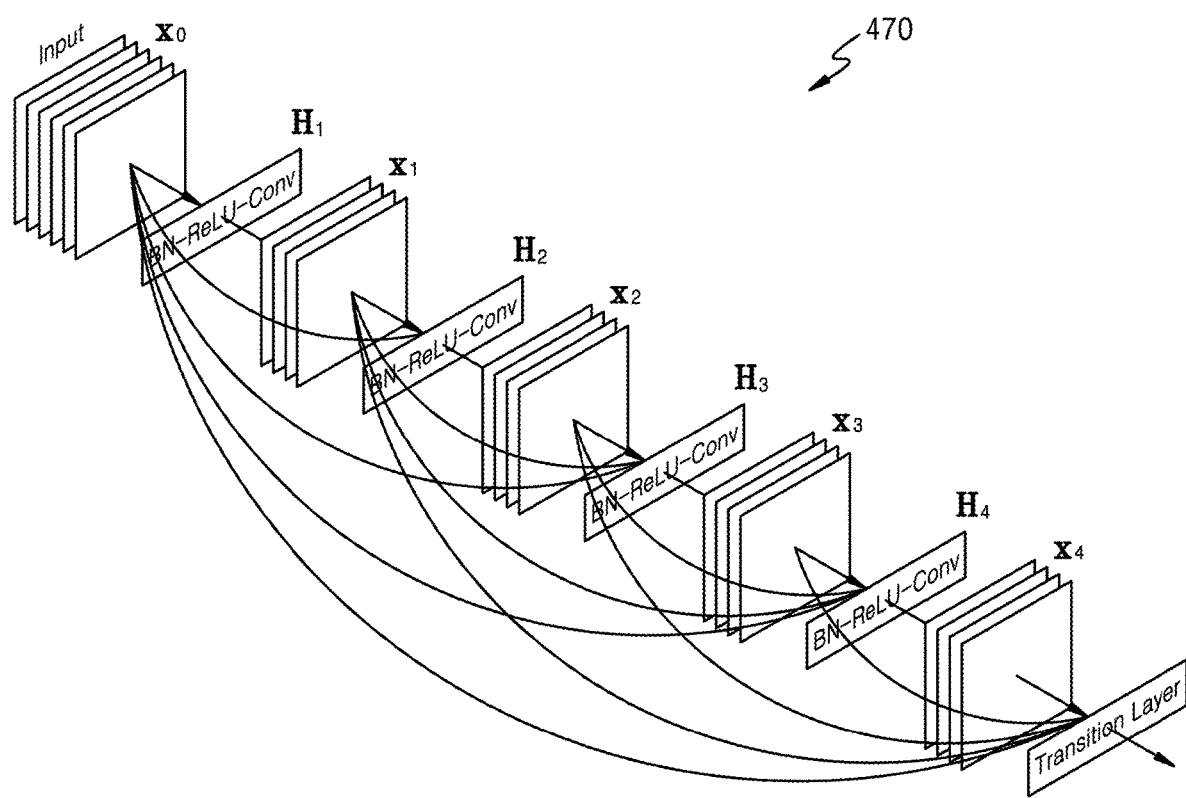

Referring to FIG. 4D, a structure of a CNN according to another embodiment is illustrated.

A CNN 470 of FIG. 4D is a network using a concept of a skip layer, as in the CNN 460 of FIG. 4C. However, compared to the CNN 460, the CNN 470 is characterized in that a past result may be added to an input of a layer at a random position such that a relation between layers is dense. Furthermore, the CNN 470 may use a result of computation through a convolution operation with respect to a past layer, as an input of a layer at a random position.

Figure 4E:
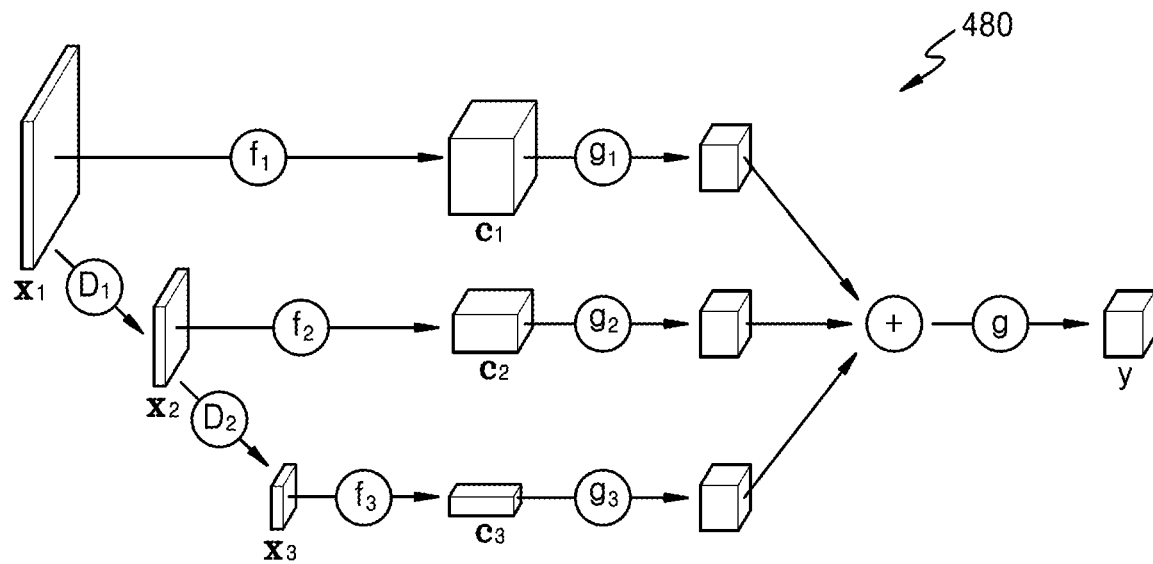

Referring to FIG. 4E, a structure of a CNN according to another embodiment is illustrated.

A CNN 480 of FIG. 4E is a network using a pyramid structure of multi-resolutions. The CNN 480 may divide a result of a previous convolution layer into a pyramid with several levels. For example, in level 1, a resolution may not be scaled, in level 2, the resolution may be ½×½ scaled, and in level 3, the resolution may be ¼×¼ scaled. Results of such levels may be concatenated and may be used as an input of a fully-connected layer. A convolution layer is not affected by a size of an image but a fully-connected layer is limited by a size of an input image, such that, in a general network, the size of the input image has to be fixed. However, as in the CNN 480, when features output from several levels of a pyramid are used as an input of the fully-connected layer, and an output of the pyramid is preset regardless of a size of an image, the fully-connected layer may not be limited by a size of an image.

Figure 4F:
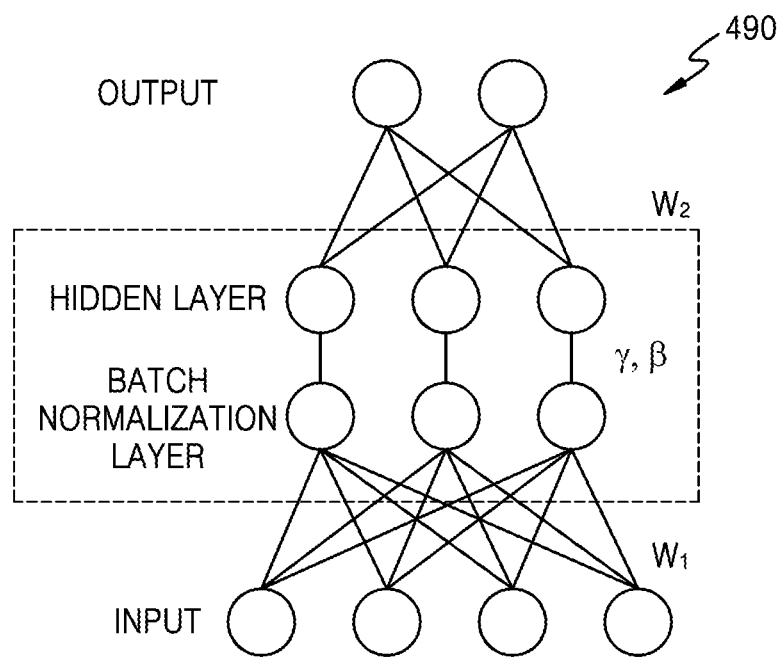

Referring to FIG. 4F, a structure of a CNN according to another embodiment is illustrated.

A CNN 490 of FIG. 4F is a network having a structure in which batch normalization is performed before or after a ReLu function is performed. A batch normalization layer is located before a hidden layer and adjusts distributions of inputs. Also, because the batch normalization layer is a layer merged into a network, the batch normalization layer may optimize related variables (scale and shift variables) through back-propagation. A method of improving the distributions of the inputs may be performed in such a manner that data input to each layer is normalized with a mean of 0 and a distribution of 1, is multiplied by a scale variable y, and a shift variable β is added thereto. During the process, the scale and shift variables may be determined through training. The CNN 490 may normalize a convolution result and thus may prevent problems such as gradient vanishing or gradient exploding. Also, due to the batch normalization, a training time may be reduced and training accuracy may be improved.

In embodiments, CNNs having various structures described with reference to FIGS. 4A to 4F may be applied thereto, and combinations thereof or combinations with previously-known learning networks may also be applied thereto. Therefore, the CNNs having the aforementioned various structures are exemplary only for convenience of description, and in a present embodiment, CNNs having variously modified structures may be used.

Figure 5A:
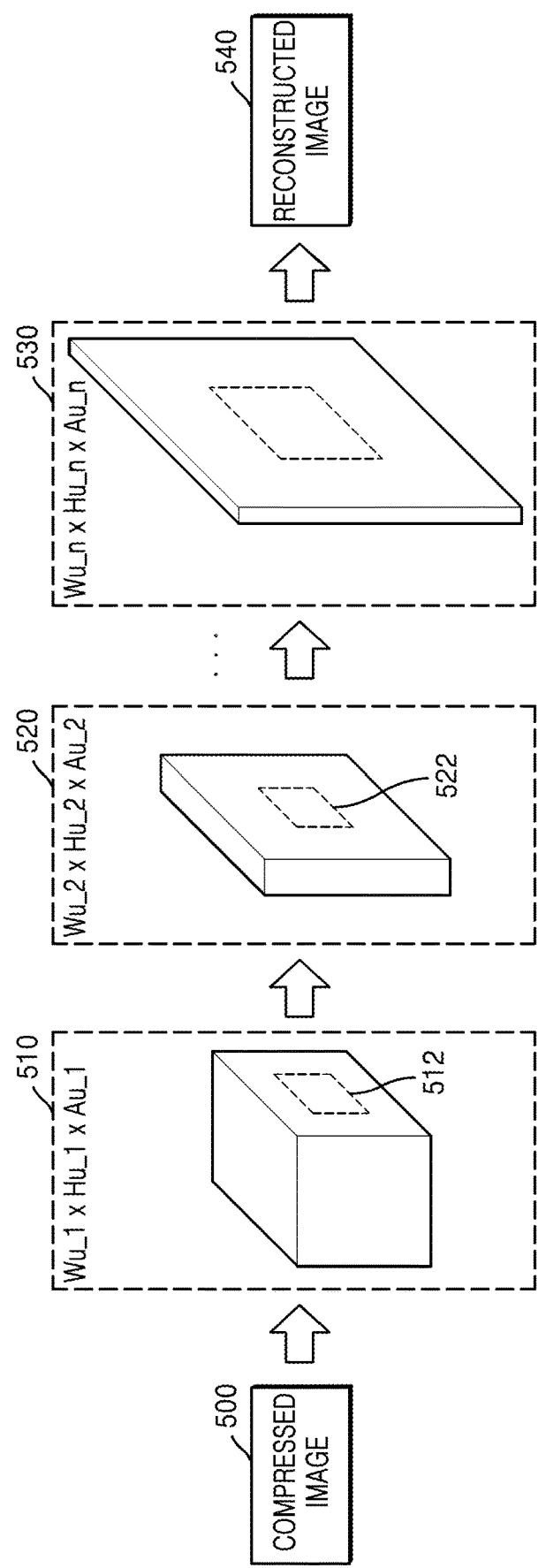
FIG. 5A is a diagram for describing an operation of upsampling spatial information by using a DNN, according to an embodiment.

FIG. 5A is a diagram for describing an operation of upsampling spatial information by using a DNN according to an embodiment.

According to an embodiment, the reconstructor 120 may spatially upsample a decoded compressed image by using the DNN. According to an embodiment, for upsampling, the reconstructor 120 may use the DNN so as to perform various operations related to a convolution operation. According to an embodiment, the reconstructor 120 may perform an upsampling operation using the DNN so as to reconstruct a spatial component of a compressed image to a component corresponding to a spatial component of an original image before it has been compressed, and the upsampling operation may include operations such as transposed convolution, un-pooling, or the like.

Referring to FIG. 5A, according to an embodiment, the reconstructor 120 may use a DNN including a plurality of layers 510, 520, and 530 so as to perform upsampling on a plurality of frames included in a compressed image 500. Transposed convolution for upsampling may be performed in each layer. The reconstructor 120 may determine a frame whose resolution has been improved, according to a result of transposed convolution performed in each layer. According to an embodiment, the reconstructor 120 may perform transposed convolution on a frame of the compressed image 500 in the first layer 510, and as a result, the reconstructor

120 may determine a feature map having a size of Wu_1x Hu_1x Au_1. Wu_1 and Hu_1 may indicate a width and a height of the feature map determined in the first layer 510, and Au_1 may correspond to the number of filter kernels 512 used in the first layer 510. According to an embodiment, the width (Wu_1) and the height (Hu_1) of the feature map determined in the first layer 510 are greater than a width W0 and a height H0 of the frame of the compressed image 500 input to the first layer 510.

According to an embodiment, the reconstructor 120 may perform transposed convolution in the second layer 520, and as a result, the reconstructor 120 may determine a feature map having a size of Wu_2x Hu_2x Au_2. Wu_2 and Hu_2 may indicate a width and a height of the feature map determined in the second layer 520, and Au_2 may correspond to the number of filter kernels 522 used in the second layer 520. According to an embodiment, an input of the second layer 520 may correspond to an output of the first layer 510. According to an embodiment, the width (Wu_2) and the height (Hu_2) of the feature map determined in the second layer 520 are greater than the width (Wu_1) and the height (Hu_1) of the feature map of the first layer 510.

According to an embodiment, the reconstructor 120 may perform upsampling on the compressed image 500 by using the DNN including n layers. A feature map determined by performing upsampling in an $n^{th}$ layer 530 may have a size of Wu_n×Hu_n×Au_n. The reconstructor 120 may determine a reconstructed image 540 by using the feature map of the $n^{th}$ layer 530 having a size greater than the frame of the compressed image 500.

According to an embodiment, the reconstructor 120 of the image reconstructing device 100 may temporally upsample a compressed image by using a DNN. According to an embodiment, the compressed image may be an image that has been temporally compressed by using the DNN (e.g., a compressed image whose bitrate is smaller than an original image). According to an embodiment, the reconstructor 120 may perform temporal upsampling by inserting an additional frame between a plurality of frames included in the compressed image by using the DNN (e.g., a CNN, a recurrent neural network (RNN), or the like). According to an embodiment, in order to add an additional frame between a plurality of frames included in a compressed image, the reconstructor 120 may perform an upsampling process using the DNN by referring to comparison result of two input frames, bitrate magnification to be upsampled (e.g., upsampling from 30 fps to 60 fps), the number of frames to be added between the two frames, or the like. For example, to reconstruct a frame of a time t, the reconstructor 120 may use at least two frames from among frames of a previous time zone (t−1, t−2, . . . ) and frames of a next time zone (t+1, t+2, . . . ), according to a DNN input.

According to an embodiment, the reconstructor 120 may perform temporal upsampling by using a frame of a predetermined time zone, according to the number of frames required for upsampling. For example, when the number of frames required for temporal upsampling of a t time zone is 2, the reconstructor 120 may perform upsampling by using frames of t−1 and t+1 time zones. As another example, when the number of frames required for temporal upsampling of a t time zone is 3, the reconstructor 120 may perform upsampling by using frames of t−1, t−2, and t+1 time zones or t−1 t+1, t+2 time zones. As another example, when the number of frames required for temporal upsampling of a t time zone is 4, the reconstructor 120 may perform upsampling by using frames of t−1, t−2, t+1, and t+2 time zones. According to an embodiment, the reconstructor 120 may use frames of a time zone required for temporal upsampling so as to perform temporal upsampling of a t time zone. According to an embodiment, the reconstructor 120 may perform filtering on frames of different time zones used in temporal upsampling, and thus may determine a feature map with respect to each of the frames. The reconstructor 120 may concatenate feature maps respectively determined for time zones and thus may determine a feature map with respect to a frame of a t time zone. The reconstructor 120 may perform filtering (e.g., convolution, or the like) to reconstruct a feature map and thus may temporally reconstruct the frame of the t time zone. A method of concatenating feature maps of each time zone may correspond to a method used in the aforementioned spatial upsampling process.

According to an embodiment, the bitstream obtainer 110 of the image reconstructing device 100 may obtain, from a bitstream, temporal upsampling information that is information indicating which frame of a time zone requires temporal upsampling, and the reconstructor 120 may perform temporal upsampling based on the obtained temporal upsampling information.

According to an embodiment, the image reconstructing device 100 may obtain, from the bitstream, change information indicating how much spatial and temporal upsampling is required to be performed, and thus may perform upsampling. According to an embodiment, the reconstructor 120 may increase a resolution of a compressed image based on the change information obtained from the bitstream. For example, when the obtained change information indicates that a resolution of an original image is twice as high as a resolution of a compressed image, the reconstructor 120 may perform, by using a DNN, upsampling to double the resolution of the compressed image. According to another embodiment, when a bitrate of the original image is twice as high as a bitrate of the compressed image according to the change information obtained from the bitstream, the reconstructor 120 may perform, by using the DNN, upsampling to double the bitrate of the compressed image. However, the aforementioned characteristic of the change information obtained by the image reconstructing device 100 is only an example to describe a characteristic with which an image compressing device 150 may generate a bitstream including information indicating a compression degree of an image, and thus the change information may include various types of information capable of indicating the compression degree.

According to an embodiment, the image reconstructing device 100 may perform upsampling by referring to specifications of the image reconstructing device 100. The image reconstructing device 100 may perform upsampling according to computation ability of the image reconstructing device 100 and thus may reconstruct to an image optimized for image reconstruction. For example, when a display (not shown) included in the image reconstructing device 100 supports only full HD (FHD) of 1920×1080 as a maximum resolution, and a resolution of a compressed image is 1280×720, the reconstructor 120 may perform upsampling to double the resolution of the compressed image. As another example, when it is determined that an image having a resolution of a compressed image can be reproduced at 60 fps according to computation ability of the image reconstructing device 100, the reconstructor 120 may perform upsampling to double a bitrate of a compressed image having a bitrate of 30 fps. As another example, when it is determined that an image having a resolution that is 1.5 times greater than a resolution of a compressed image can be reproduced at 60 fps according to computation ability of the image reconstructing device 100, the reconstructor 120 may perform upsampling to double a bitrate of a compressed image having a bitrate of 30 fps and to increase the resolution of the compressed image 1.5 times.

According to an embodiment, the image reconstructing device 100 may use a filter kernel in each layer so as to perform upsampling using a DNN, and a type of the filter kernel that is usable in each layer may be different from a type of a filter kernel for downsampling. That is, types of sizes and numbers of filter kernels used in layers included in a DNN for downsampling and a DNN for upsampling may vary.

Figure 6:
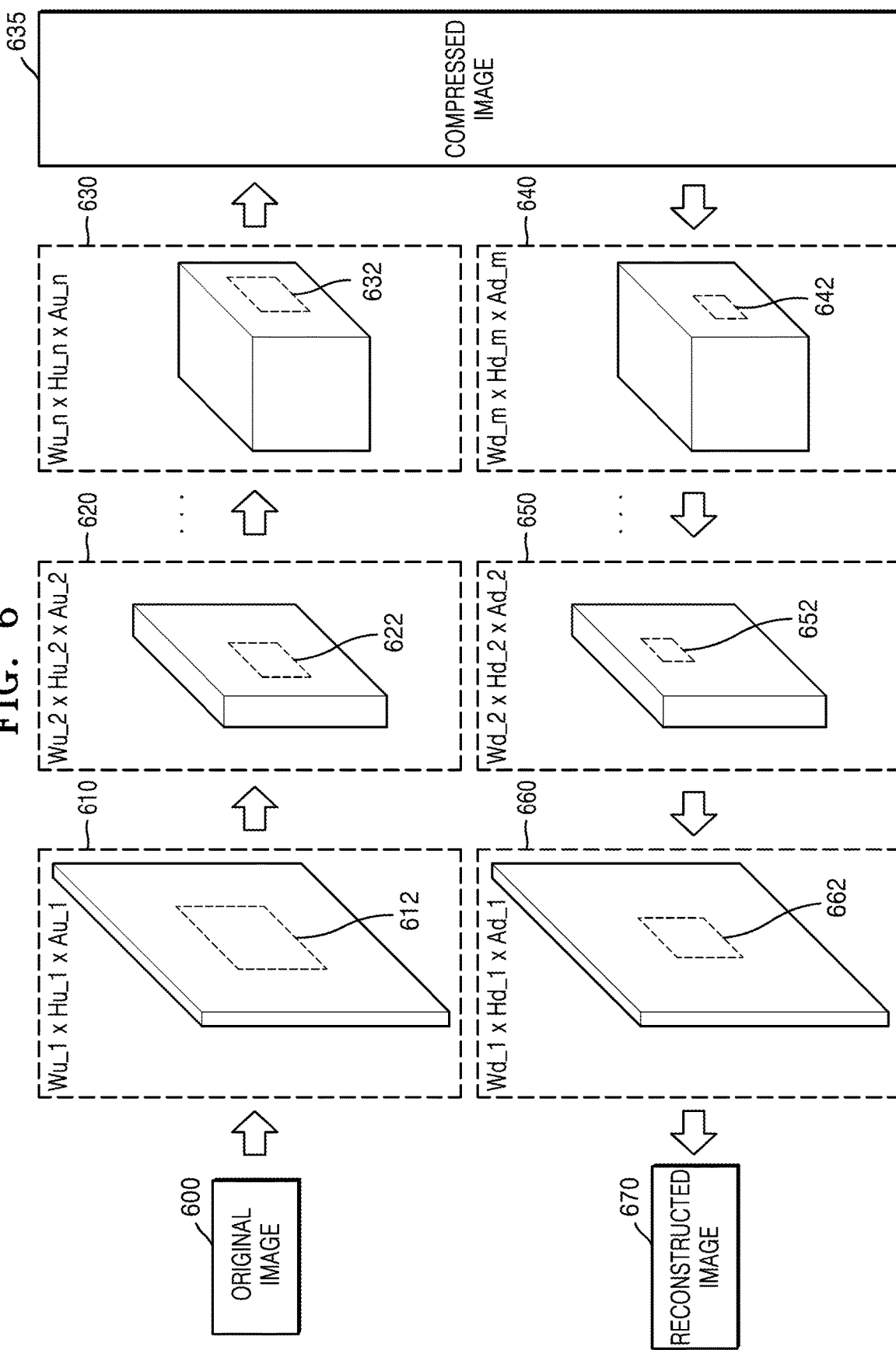
FIG. 6 is a diagram for describing that types of a filter kernel used in an upsampling process or a downsampling process may be different, according to an embodiment.

FIG. 6 is a diagram for describing that types of a filter kernel used in an upsampling process or a downsampling process may be different, according to an embodiment.

According to an embodiment, filter kernels may be respectively used in m layers (where m may be an integer equal to or different from n) included in a DNN for upsampling such that filtering (e.g., a transposed convolution operation) may be performed. According to an embodiment, a type of a filter kernel that is usable in filtering for upsampling may be different from a type of a filter kernel used in filtering for downsampling. For example, even when types of a size of a filter kernel used in a DNN for downsampling are 3×3, 3×3, and 5×5, types of a size of a filter kernel used in a DNN for upsampling may be 3×3, 5×5, and 7×7. According to an embodiment, types of a size and a number of a filter kernel that is usable by the reconstructor 120 in each layer of a DNN for upsampling may be different from types of a size and a number of a filter kernel that is usable in a DNN for downsampling.

Figure 7A:
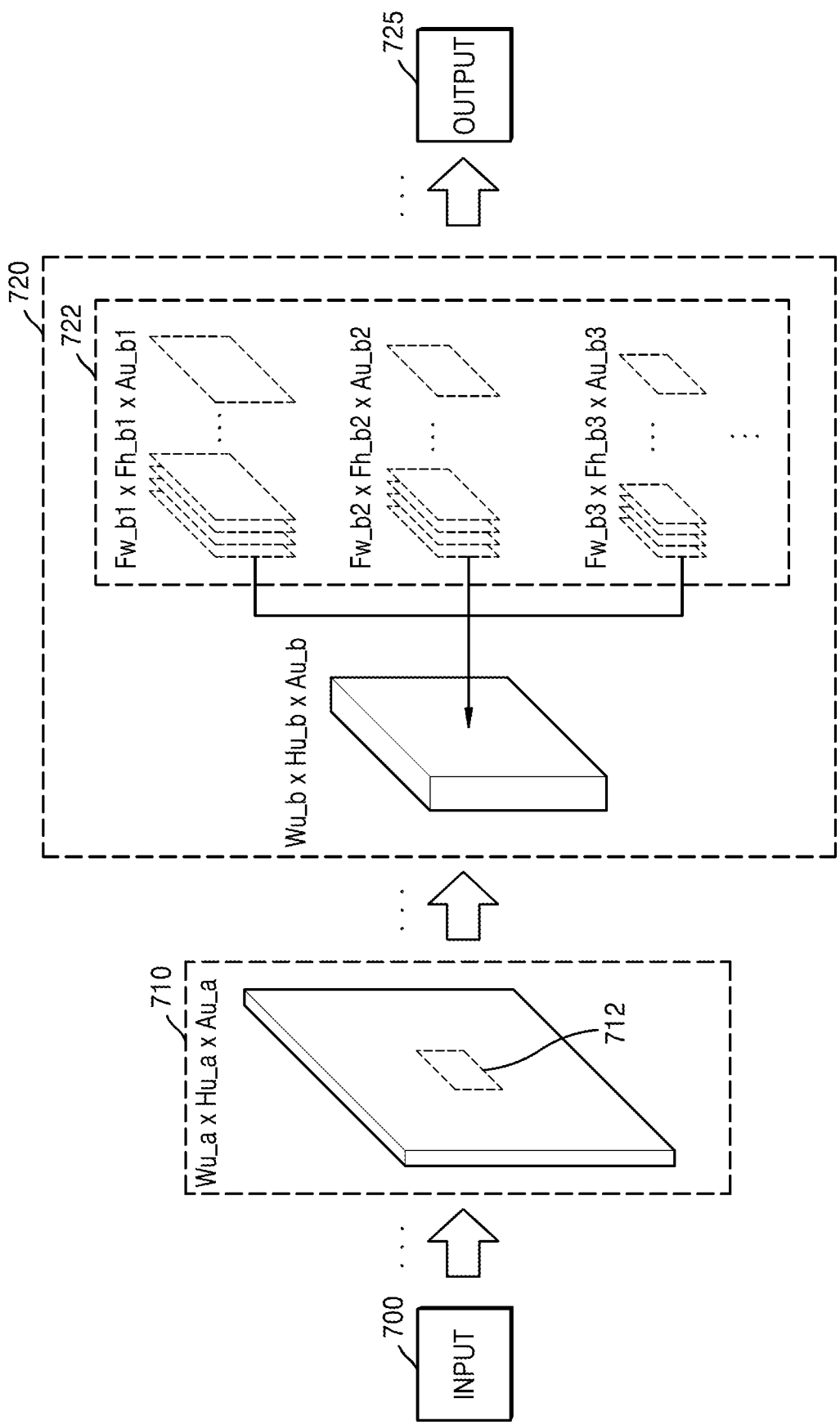
FIG. 7A is a diagram for describing a characteristic in which a predetermined layer from among a plurality of layers included in a DNN performs filtering by using a plurality of filter kernels, according to an embodiment.

FIG. 7A is a diagram for describing a characteristic in which a predetermined layer from among a plurality of layers included in a DNN performs filtering by using a plurality of filter kernels, according to an embodiment.

According to an embodiment, the reconstructor 120 may perform filtering by using one type of a filter kernel in each layer. According to an embodiment, to reconstruct a compressed image that is an input 700 of a DNN, the reconstructor 120 may use a DNN including a plurality of layers. The reconstructor 120 may perform filtering by using A_a filter kernels 712 each having a size of Fw_a×Fh_a in an a layer 710 among the plurality of layers, and thus may determine A_a feature maps each having a size of W_a× H_a.

According to an embodiment, the reconstructor 120 may perform filtering by using a filter kernel having a plurality of sizes in a predetermined layer. According to an embodiment, the reconstructor 120 may perform filtering by using filter kernels 722 having sizes of Fw_b1×Fh_b1, Fw_b2×Fh_b2, Fw_b3×Fh_b3, or the like in a b layer 720 among the plurality of layers. According to an embodiment, filter kernels having different sizes may include different numbers of filter kernels. For example, A_b1 filter kernels each having a size of Fw_b1×Fh_b1, A_b2 filter kernels each having a size of Fw_b2×Fh_b2, and A_b3 filter kernels each having a size of Fw_b3×Fh_b3 may be used in filtering. According to an embodiment, the reconstructor 120 may perform filtering by using filter kernels having a plurality of sizes, and thus may determine feature maps corresponding to the number of the used filter kernels. That is, the reconstructor 120 may perform filtering by using the filter kernels 722 having sizes of Fw_b1×Fh_b1, Fw_b2×Fh_b2, and Fw_b3×Fh_b3, and thus may determine A_b feature maps, and in this case, A_b may correspond to A_b1+A_b2+A_b3. The reconstructor 120 may perform a remaining reconstruction process by using the A_b feature maps each having a size of W_b×H_b, and thus may determine a reconstructed image that is an output 725.

Figure 7B:
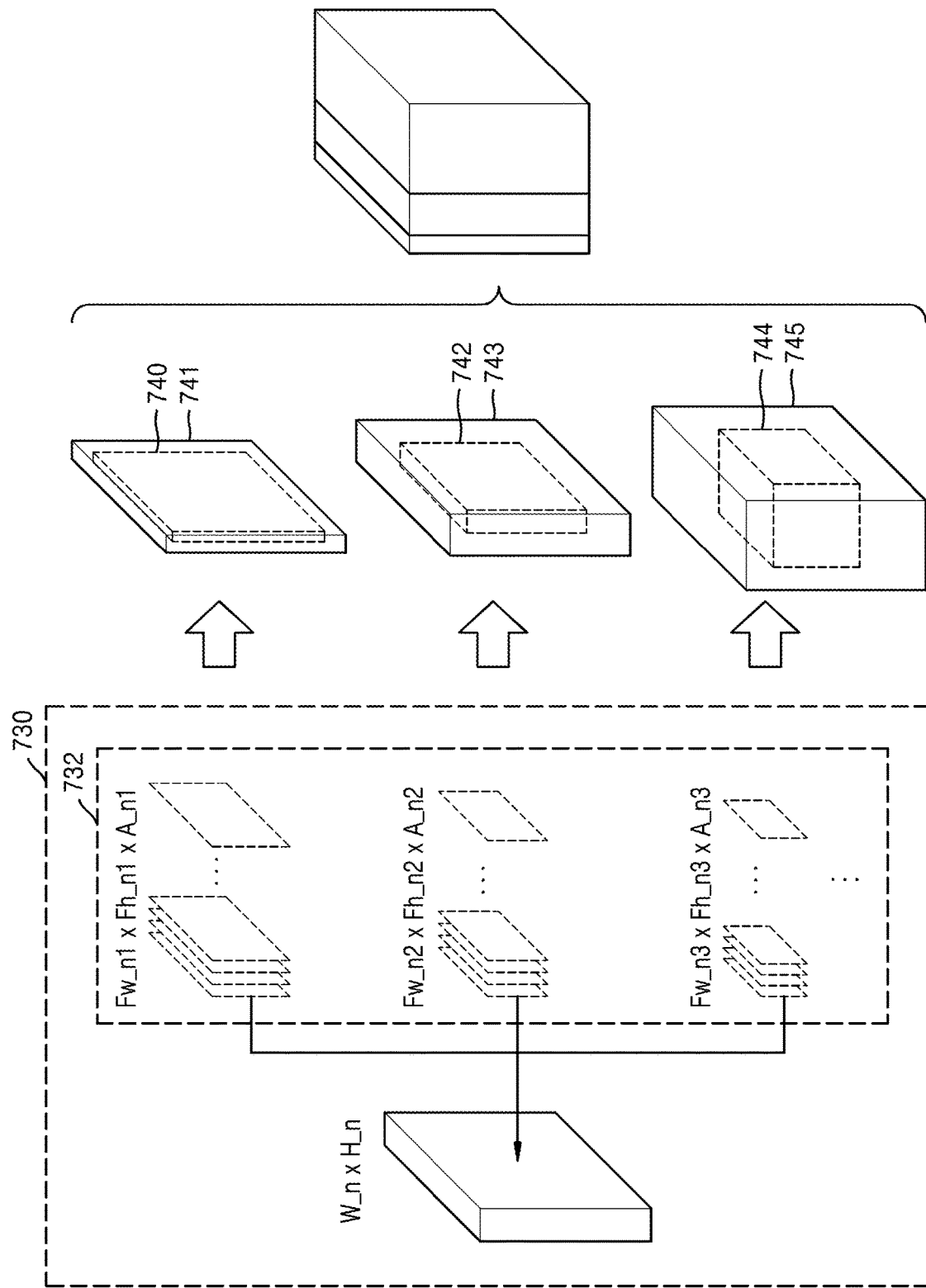
FIG. 7B is a diagram for describing a filtering process using feature maps determined by performing filtering according to filter kernels having a plurality of sizes, according to an embodiment.

FIG. 7B is a diagram for describing a filtering process using feature maps determined by performing filtering according to filter kernels having a plurality of sizes, according to an embodiment.

According to an embodiment, the reconstructor 120 of the image reconstructing device 100 may determine feature maps by using filter kernels having a plurality of sizes in an arbitrary layer. According to an embodiment, the reconstructor 120 may perform filtering by using filter kernels 732 having a plurality of sizes in an $n^{th}$ layer 730 that is one of a plurality of layers included in a DNN. As a result of performing, by the reconstructor 120, filtering (e.g., a convolution operation), feature maps 740, 742, and 744 having a plurality of sizes may be determined. According to an embodiment, when a size of a feature map or a frame of a compressed image, which is input to an $n^{th}$ layer, is W_n× H_n, the reconstructor 120 may perform filtering by using a filter kernel having a size of Fw_n1×Fh_n1 in the $n^{th}$ layer 730 and thus may determine A_n1 feature maps having a size of (W_n−Fw_n1+1)×(H0−Fh_n1+1). In addition, the reconstructor 120 may perform filtering by using filter kernels having different sizes, and thus may determine A_n2 feature maps having a size of (W_n−Fw_n2+1)×(H0− Fh_n2+1), and A_n3 feature maps having a size of (W_n− Fw_n3+1)×(H0−Fh_n3+1).

According to an embodiment, the reconstructor 120 may perform a padding operation to allow feature maps to have a same size, the feature maps having been generated depending on sizes of filter kernels. According to an embodiment, the padded feature maps may each have a same size as an input of a corresponding layer. Referring to FIG. 7B, padding may be performed on the feature maps 740, 742, and 744 such that the feature maps 740, 742, and 744 that have been respectively generated depending on sizes of filter kernels may each have a same size as W_n×H_n that is a size of a feature map or a frame of a compressed image which is input to the $n^{th}$ layer 730. Accordingly, the padded feature maps 741, 743, and 745 may have a same size (i.e., W_n×H_n). According to an embodiment, an input and an output of a layer in which filter kernels having a plurality of sizes are used have a same planar size.

According to an embodiment, the reconstructor 120 may determine feature maps corresponding to the number of filter kernels used in filtering by using the filter kernels having a plurality of types of a size. That is, the reconstructor 120 may determine the feature maps 740, 742, and 744 by filtering by using the filter kernels 732 having sizes of Fw_n1×Fh_n1, Fw_n2×Fh_n2, and Fw_n3×Fh_n3, and may perform padding on the feature maps 740, 742, and 744, thereby determining feature maps 741, 743, and 745 that have been padded to a same size. The reconstructor 120 may determine an output of the $n^{th}$ layer 730 by concatenating the padded feature maps 741, 743, and 745. Accordingly, as a result of performing filtering by inputting the feature map having a size of W_n×H_n to the $n^{th}$ layer, A_n1+A_n2+ A_n3 feature maps each having a size of W_n×H_n may be output.

According to an embodiment, the image reconstructing device 100 may use data units of various shapes so as to decode an image and perform upsampling. The aforementioned various embodiments, as a process being applicable to the reconstructor 120 according to an embodiment, may be performed based on various data units that are usable in an image encoding process. According to an embodiment, the reconstructor 120 may perform a process of decoding, upsampling, and downsampling an image by using various data units including a video, a sequence, a frame, a slice, a slice segment, a largest coding unit, a coding unit, a prediction unit, a transform unit, a processing unit, or the like.

According to an embodiment, the reconstructor 120 may determine a subjective image quality of each frame. The bitstream obtainer 110 may obtain change information for each picture, the change information indicating a downsampling degree. According to an embodiment, the reconstructor 120 may perform a downsampling process or an upsampling process on each largest coding unit. However, data units used when the reconstructor 120 performs a predetermined process are not construed as being limited to the aforementioned embodiment, and thus it may be construed that various data units that are usable by one of ordinary skill in the art can be used. Characteristics of various data units that are usable by the image reconstructing device 100 will be described below with reference to FIGS. 10 to 23.

Hereinafter, various embodiments of the image compressing device 150 capable of performing a process of compressing an image to be reconstructed by the image reconstructing device 100 will now be described.

Figure 1B:
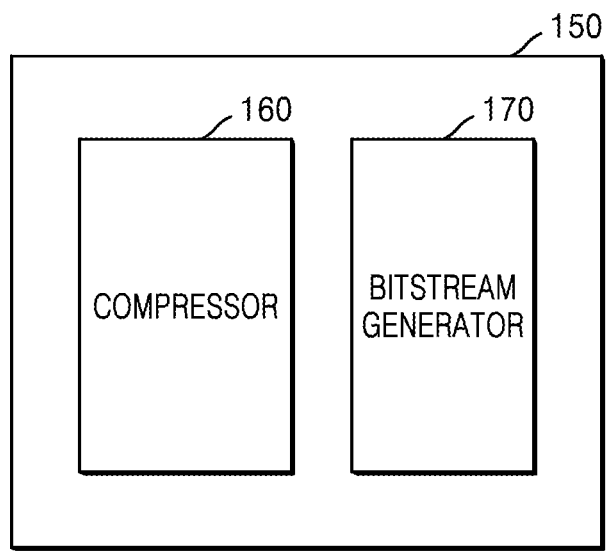
FIG. 1B illustrates a block diagram of an image compressing device for compressing an image, according to an embodiment.

FIG. 1B illustrates a block diagram of the image compressing device 150 for compressing an image, according to an embodiment.

According to an embodiment, the image compressing device 150 may include a compressor 160 for encoding and downsampling an original image to compress the original image and a bitstream generator 170 for generating a bitstream including information about a compressed image. According to an embodiment, the compressor 160 may execute a program command stored in a memory and/or a storage. The compressor 160 may include at least one processor including a central processing unit (CPU), a graphics processing unit (GPU), or the like.

Figure 2B:
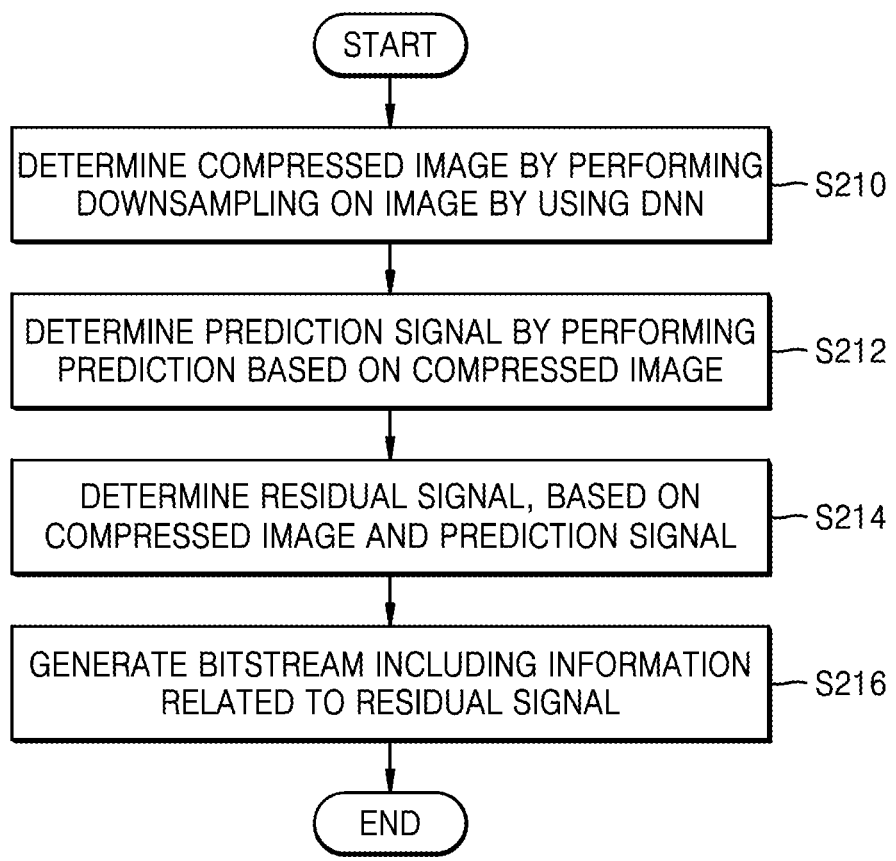
FIG. 2B is a flowchart illustrating an image compressing process that the image compressing device may perform, according to an embodiment.

FIG. 2B is a flowchart illustrating an image compressing process that the image compressing device 150 may perform, according to an embodiment.

In operation S210, the image compressing device 150 may perform downsampling on an image by using a DNN and thus may determine a compressed image.

FIG. 3 is a diagram for describing a process in which a compressed image is processed through encoding and decoding processes, according to an embodiment.

Referring to FIG. 3, the compressor 160 may decrease an information amount of the original signal 300 through the encoding process 304 with respect to the original signal 300. For example, the encoding process 304 may include the process of generating a residual signal corresponding to a difference between the original signal 300 and a prediction signal; the process of transforming the residual, which is a spatial domain component, to a frequency domain component; the process of quantizing the residual signal that has been transformed to the frequency domain component; the process of generating a bitstream by entropy encoding the quantized residual signal, or the like. The residual signal that is the frequency domain component may be transformed to the spatial domain component by performing the decoding process 306 on the bitstream with respect to the residual signal, and then a reconstructed image 309 may be generated based on the residual signal. According to an embodiment, the bitstream generator 170 may generate the bitstream including a result of transformation to the frequency domain through the encoding process 304 on the original image 300.

According to an embodiment, the image compressing device 150 may generate the compressed image 303 by performing downsampling 302 on the original image 300, and may perform the encoding process 304 on the compressed image 303. For errorless decoding, the compressor 160 may perform not only an encoding process but also perform a decoding process corresponding thereto. The compressor 160 may determine the decoded compressed image 307 by performing the decoding process, and may determine the compressed image 309 by performing upsampling 308 on the decoded compressed image 307. The bitstream generator 170 may generate a bitstream including information about the compressed image 303, and may transmit the bitstream to the image reconstructing device 100 capable of reconstructing a compressed image. According to an embodiment, the downsampling 302 and the upsampling 308 may be performed by using a DNN, and the processes of the downsampling 302 and upsampling 308 using the DNN will be described below in various embodiments.

In operation S212, the image compressing device 150 according to an embodiment may decode the compressed image by using the residual signal and a prediction signal obtained by performing prediction. The compressor 160 of the image compressing device 150 may split an original image to be compressed, according to a predetermined data unit. For example, the compressor 160 may split an image into a plurality of largest coding units, and may decode the image by using coding units determined by recursively splitting each largest coding unit. According to an embodiment, the compressor 160 may perform a prediction process so as to encode a signal included in a coding unit.

In operation S214, according to an embodiment, the image compressing device 150 may determine a residual signal, based on the compressed image and the prediction signal. The compressor 160 may determine the residual signal by subtracting the prediction signal determined in operation S212 from the compressed image determined in operation S210. According to an embodiment, the compressor 160 may perform, on the residual signal, a predetermined process (e.g., in-loop filtering, a DPB storing process, entropy encoding, or the like) for additionally encoding an image. An image encoding process using a residual signal may be included in various processes that one of ordinary skill in the art may easily perform.

In operation S216, the bitstream generator 170 of the image compressing device 150 may generate a bitstream including information related to the encoded residual signal. FIG. 4A is a diagram for describing a deep convolutional neural network included in a DNN. According to an embodiment, the image compressing device 150 may use the DNN including a plurality of layers so as to perform downsampling. According to an embodiment, to perform a convolution operation in the plurality of layers, the compressor 160 may use the deep convolutional neural network as the DNN capable of performing downsampling.

According to an embodiment, the deep convolutional neural network may include the plurality of layers (e.g., the plurality of layers including the first layer 410 and the $n^{th}$ layer 420). According to an embodiment, each of the plurality of layers configuring the deep convolutional neural network may include convolution layers for generating a plurality of feature maps by using filter kernels, and activation layers for adjusting a weight of the filter kernels.

Each of the convolution layers may include a plurality of nodes. According to an embodiment, a convolution layer may generate a plurality of feature maps by using a plurality of filter kernels. The feature maps generated by nodes of the convolution layer may be input to an activation layer.

According to an embodiment, the compressor 160 may perform a convolution operation and activation on each of a plurality of nodes 411, 412, 413, or the like included in the first layer 410. The compressor 160 may perform a convolution operation on an input signal (e.g., an input 400 that is a compression signal) of a first layer in convolution layers CL1_1, CL1_2, . . . , CL1_a included in the first layer, and different filter kernels may be used in the convolution operation with respect to each of the convolution layers CL1_1, CL1_2, . . . , CL1_a. According to an embodiment, to activate results of convolution operations respectively performed in the convolution layers CL1_1, CL1_2, . . . , CL1_a, the results of the convolution operations may be input to activation layers related to the convolution layers CL1_1, CL1_2, . . . , CL1_a, respectively. The compressor 160 may determine a plurality of feature maps of the first layer 410 by activating the results of the convolution operations. According to an embodiment, the number of a plurality of feature maps obtained from a particular layer may be in proportion to the number of filter kernels. According to an embodiment, a feature map obtained from a particular layer may be used as an input value for a next layer. That is, a feature map obtained from the first layer 410 may be input to the $n^{th}$ layer 420 (n>1) such that a convolution operation and activation may be performed. Hereinafter, for convenience of description, a predetermined signal processing process including a convolution operation and activation, which is performed in each layer, is referred to as a filtering process. According to an embodiment, characteristics of the DNN that is usable by the image compressing device 150 may be the same as or similar to characteristics of the DNN that are usable by the image reconstructing device 100 and are described above with reference to FIG. 4A, and thus, detailed descriptions thereof are omitted here.

Figure 5B:
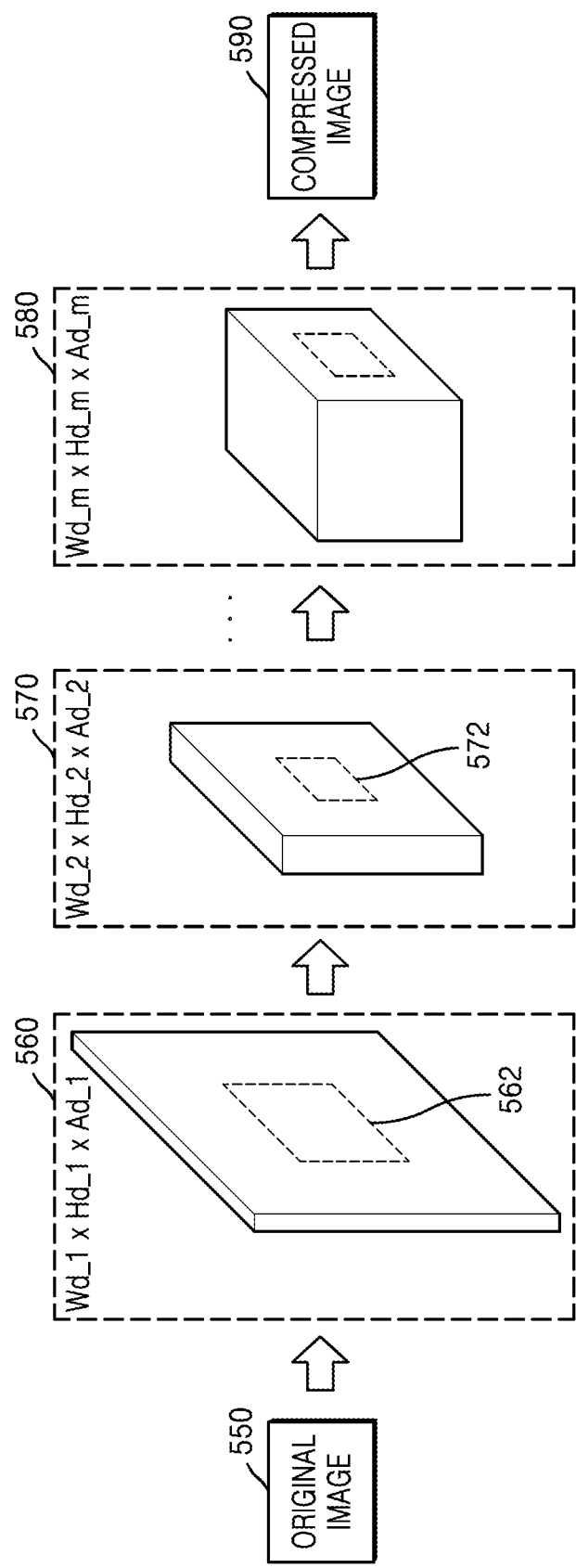
FIG. 5B is a diagram for describing an operation of downsampling spatial information by using a DNN, according to an embodiment.

FIG. 5B is a diagram for describing an operation of downsampling spatial information by using a DNN, according to an embodiment.

According to an embodiment, the compressor 160 may spatially downsample an original image by using the DNN. According to an embodiment, for downsampling, the compressor 160 may use the DNN so as to perform various operations related to a convolution operation. According to an embodiment, a downsampling operation performed by the compressor 160 may include operations such as convolution, pooling, or the like.

Referring to FIG. 5B, according to an embodiment, the compressor 160 may use a DNN including a plurality of layers 560, 570, and 580 so as to perform downsampling on a plurality of frames included in an original image 550. Convolution for downsampling may be performed in each layer. The compressor 160 may determine a frame whose resolution has been decreased, according to a result of convolution performed in each layer. According to an embodiment, the compressor 160 may perform convolution on a frame of the original image 550 in the first layer 560, and as a result, the compressor 160 may determine a feature map having a size of Wd_1×Hd_1×Ad_1. Wd_1 and Hd_1 may indicate a width and a height of the feature map determined in the first layer 560, and Ad_1 may correspond to the number of filter kernels 562 used in the first layer 560. According to an embodiment, the width (Wd_1) and the height (Hd_1) of the feature map determined in the first layer 560 are smaller than a width W0 and a height H0 of the frame of the original image 550 input to the first layer 560.

According to an embodiment, the compressor 160 may perform convolution in the second layer 570, and as a result, the compressor 160 may determine a feature map having a size of Wd_2×Hd_2×Ad_2. Wd_2 and Hd_2 may indicate a width and a height of the feature map determined in the second layer 570, and Ad_2 may correspond to the number of filter kernels 572 used in the second layer 570. According to an embodiment, an input of the second layer 570 may correspond to an output of the first layer 560. According to an embodiment, the width (Wd_2) and the height (Hd_2) of the feature map determined in the second layer 570 are smaller than the width (Wd_1) and the height (Hd_1) of the feature map of the first layer 560.

According to an embodiment, the compressor 160 may perform downsampling on the original image 550 by using the DNN including n layers. A feature map determined by performing downsampling in an $n^{th}$ layer 580 may have a size of Wd_n×Hd_n×Ad_n. The compressor 160 may determine a compressed image 590 by using the feature map of the $n^{th}$ layer 580 having a size smaller than the frame of the original image 550.

According to an embodiment, the compressor 160 of the image compressing device 150 may temporally downsample an original image by using a DNN. According to an embodiment, a compressed image may be an image that has been temporally compressed by using the DNN (e.g., a compressed image whose bitrate is smaller than an original image). According to an embodiment, the compressor 160 may perform temporal downsampling by removing a predetermined frame from among a plurality of frames included in the original image by using the DNN (e.g., a CNN, a RNN, or the like). According to an embodiment, in order to remove the predetermined frame included in the original image, the compressor 160 may perform a downsampling process using the DNN by referring to a comparison result of the plurality of input frames, bitrate magnification to be downsampled (e.g., upsampling from 60 fps to 30 fps), the number of frames to be removed, or the like. For example, to remove a frame of a time t, the compressor 160 may use at least two frames from among frames of a previous time zone (t−1, t−2, . . . ) and frames of a next time zone (t+1, t+2, . . . ), according to a DNN input.

According to an embodiment, the compressor 160 may perform temporal downsampling by using a frame of a predetermined time zone, according to the number of frames required for downsampling. For example, when the number of frames required for temporal downsampling of a t time zone is 2, the compressor 160 may perform downsampling by using frames of t−1 and t+1 time zones. As another example, when the number of frames required for temporal downsampling of a t time zone is 3, the compressor 160 may perform downsampling on a frame of the t time zone by using frames of t−1, t−2, and t+1 time zones or t−1, t+1, t+2 time zones. As another example, when the number of frames required for temporal downsampling on the frame of the t time zone is 4, the compressor 160 may perform downsampling by using frames of t−1, t−2, t+1, and t+2 time zones.

According to an embodiment, the compressor 160 may use frames of a time zone required for temporal downsampling so as to perform temporal downsampling of a t time zone. According to an embodiment, the compressor 160 may perform filtering on frames of different time zones used in temporal downsampling, and thus may determine a feature map with respect to each of the frames.

According to an embodiment, when a plurality of frames having less motion are determined by referring to motion information (e.g., a global motion vector, a local motion vector, or the like) of feature maps determined according to each time zone, the compressor 160 may perform temporal downsampling to remove a frame included between the plurality of frames.

According to an embodiment, when frames of a plurality of time zones are determined as different scenes, as a result of comparing the feature maps determined according to each time zone, the compressor 160 may determine not to perform temporal downsampling on a frame between the frames of the plurality of time zones.

According to an embodiment, the compressor 160 of the image compressing device 150 may determine on which frame temporal downsampling is to be performed, and the bitstream generator 170 may generate a bitstream including temporal downsampling information that is information indicating which frame of a time zone is temporally downsampled.

According to an embodiment, the image compressing device 150 may generate a bitstream including change information indicating how much spatial and temporal downsampling is performed. According to an embodiment, when the compressor 160 has performed downsampling to doubly compress a resolution of an original image, the bitstream generator 170 may generate a bitstream including change information indicating that the resolution of the original image is twice as large as that of a compressed image. According to another embodiment, when the compressor 160 has performed downsampling to decrease a bitrate of the original image by a half, the bitstream generator 170 may generate a bitstream including change information indicating that a bitrate of the compressed image is half that of the original image. However, the aforementioned characteristic of the change information obtained by the image compressing device 150 is only an example to describe a characteristic with which the image compressing device 150 may generate a bitstream including information indicating a compression degree of an image, and thus the change information may include various types of information capable of indicating the compression degree.

According to an embodiment, the image reconstructing device 100 may use a filter kernel in each layer so as to perform upsampling using a DNN, and a type of the filter kernel that is usable in each layer may be different from a type of a filter kernel for downsampling.

FIG. 6 is a diagram for describing that types of a filter kernel used in an upsampling process or a downsampling process may be different, according to an embodiment.

According to an embodiment, the compressor 160 may use a DNN including n layers 610, 620, and 630 so as to generate a downsampled compressed image 635. Each layer may perform filtering (e.g., a convolution operation) using a filter kernel as a process for downsampling. Filter kernels 612, 622, and 632 being used by respective layers for filtering may have at least one size. For example, filtering may be performed in the first layer 610 by using Au_1 filter kernel having a size of 5×5, filtering may be performed in the second layer 620 by using Au_2 filter kernel having a size of 3×3, and filtering may be performed in the $n^{th}$ layer 630 by using Au_1 filter kernel having a size of 3×3. According to an embodiment, the compressor 160 may use the DNN to upsample the compressed image 635 that has been downsampled while passing through the n layers 610, 620, and 630.

According to an embodiment, filter kernels may be respectively used in m layers (where, m may be an integer equal to or different from n) included in a DNN for upsampling such that filtering (e.g., a transposed convolution operation) may be performed. According to an embodiment, a type of a filter kernel that is usable in filtering for upsampling may be different from a type of a filter kernel used in filtering for downsampling. For example, even when size types of a filter kernel used in a DNN for downsampling are 3×3, 3×3, and 5×5, size types of a filter kernel in a DNN for upsampling may be 3×3, 5×5, and 7×7. According to an embodiment, size types and a number of filter kernels that are usable by the compressor 160 in each layer of a DNN for upsampling may be different from size types and a number of filter kernels that are usable in a DNN for downsampling.

That is, the compressor 160 may downsample an original image by using the DNN for downsampling, and may generate an encoded residual signal by using the downsampled compressed image. The compressor 160 may decode the residual signal and then may perform again upsampling by using the DNN so as to determine a reconstructed signal, and a training process between the DNNs, the training process being used in the downsampling and upsampling processes, may be shared by the DNNs. The training process of the DNN will be described below in an embodiment. FIG. 7A is a diagram for describing a characteristic in which a predetermined layer from among a plurality of layers included in a DNN performs filtering by using a plurality of filter kernels, according to an embodiment.

According to an embodiment, the compressor 160 may perform filtering by using one type of a filter kernel in each layer. According to an embodiment, to compress an original image that is an input 700 of a DNN, the compressor 160 may use the DNN including a plurality of layers. The compressor 160 may perform filtering by using A_a filter kernels 712 each having a size of Fw_a×Fh_a in the a layer 710 among the plurality of layers, and thus may determine A_a feature maps each having a size of W_a×H_a.

According to an embodiment, the compressor 160 may perform filtering by using a filter kernel having a plurality of sizes in a predetermined layer. According to an embodiment, the compressor 160 may perform filtering by using the filter kernels 722 having sizes of Fw_b1×Fh_b1, Fw_b2×Fh_b2, Fw_b3×Fh_b3, or the like in the b layer 720 among the plurality of layers. According to an embodiment, filter kernels having different sizes may include different numbers of filter kernels. For example, A_b1 filter kernels each having a size of Fw_b1×Fh_b1, A_b2 filter kernels each having a size of Fw_b2×Fh_b2, and A_b3 filter kernels each having a size of Fw_b3×Fh_b3 may be used in filtering. According to an embodiment, the compressor 160 may perform filtering by using filter kernels having a plurality of size types, and thus may determine feature maps corresponding to the number of the used filter kernels. That is, the compressor 160 may perform filtering by using the filter kernels 722 having sizes of Fw_b1×Fh_b1, Fw_b2×Fh_b2, and Fw_b3×Fh_b3, and thus may determine A_b feature maps, and in this case, A_b may correspond to A_b1+A_b2+A_b3. The compressor 160 may perform a remaining compression process by using the A_b feature maps each having a size of W_b×H_b, and thus may determine a compressed image that is an output 725 of the DNN.

FIG. 7B is a diagram for describing a filtering process using feature maps determined by performing filtering according to filter kernels having a plurality of sizes, according to an embodiment.

According to an embodiment, the compressor 160 of the image compressing device 150 may determine feature maps by using filter kernels having a plurality of sizes in an arbitrary layer. According to an embodiment, the compressor 160 may perform filtering by using the filter kernels 732 having a plurality of sizes in the $n^{th}$ layer 730 that is one of a plurality of layers included in a DNN. As a result of performing, by the compressor 160, filtering (e.g., a convolution operation), feature maps 740, 742, and 744 having a plurality of sizes may be determined. According to an embodiment, when a size of a feature map or a frame of an image, which is input to an $n^{th}$ layer, is W_n×H_n, the compressor 160 may perform filtering by using a filter kernel having a size of Fw_n1×Fh_n1 in the $n^{th}$ layer 730 and thus may determine A_n1 feature maps having a size of (W_n−Fw_n1+1)×(H0−Fh_n1+1). In addition, the compressor 160 may perform filtering by using filter kernels having different sizes, and thus may determine A_n2 feature maps having a size of (W_n−Fw_n2+1)×(H0−Fh_n2+1), and A_n3 feature maps having a size of (W_n−Fw_n3+1)×(H0−Fh_n3+1).

According to an embodiment, the compressor 160 may perform a padding operation to allow feature maps to have a same size, the feature maps having been generated depending on sizes of filter kernels. According to an embodiment, the padded feature maps may each have a same size as an input of a corresponding layer. Referring to FIG. 7B, padding may be performed on the feature maps 740, 742, and 744 such that the feature maps 740, 742, and 744 that have been respectively generated depending on sizes of filter kernels may each have a same size as W_n×H_n that is a size of a feature map input to the $n^{th}$ layer 730. Accordingly, the padded feature maps 741, 743, and 745 may have a same size (i.e., W_n×H_n). According to an embodiment, an input and an output of a layer in which filter kernels having a plurality of sizes are used have a same planar size.

According to an embodiment, the compressor 160 may determine feature maps corresponding to the number of filter kernels used in performing filtering by using the filter kernels having a plurality of size types. That is, the compressor 160 may determine the feature maps 740, 742, and 744 by performing filtering by using the filter kernels 732 having sizes of Fw_n1×Fh_n1, Fw_n2×Fh_n2, and Fw_n3×Fh_n3, and may perform padding on the feature maps 740, 742, and 744, thereby determining feature maps 741, 743, and 745 that have been padded to a same size. The compressor 160 may determine an output of the $n^{th}$ layer 730 by concatenating the padded feature maps 741, 743, and 745. Accordingly, as a result of performing filtering by inputting the feature map having a size of W_n×H_n to the $n^{th}$ layer, A_n1+A_n2+A_n3 feature maps each having a size of W_n×H_n may be output.

Figure 8:
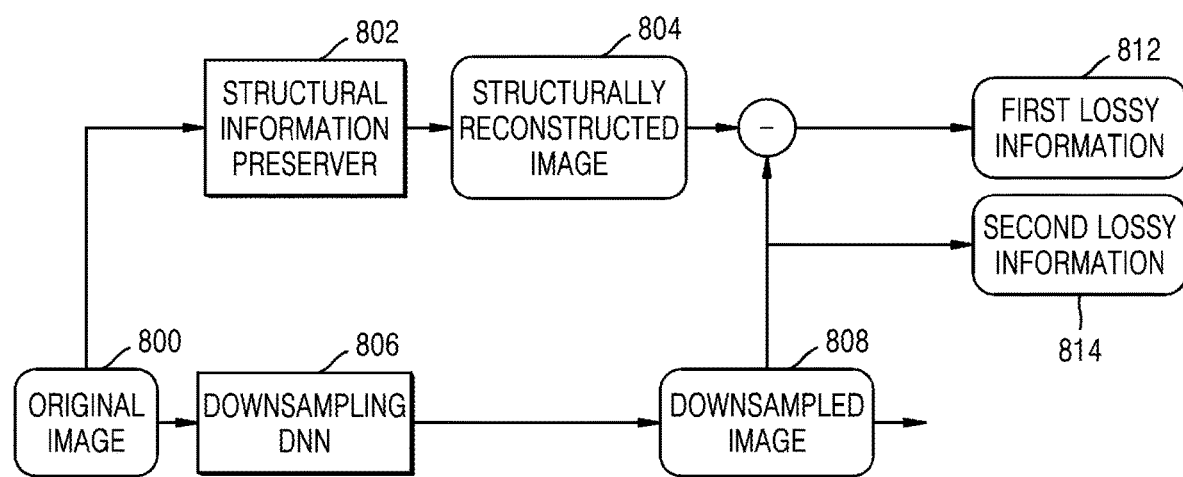
FIG. 8 is a diagram for illustrating lossy information having occurred in a DNN for downsampling, according to an embodiment.

FIG. 8 is a diagram for illustrating lossy information having occurred in a DNN for downsampling, according to an embodiment.

Referring to FIG. 8, the compressor 160 of the image compressing device 150 may determine a downsampled image 808 by using a downsampling DNN 806 capable of downsampling an original image 800. According to an embodiment, when compared to the original image 800, image structural characteristics (e.g., luminance, contrast, a histogram, or the like) of the downsampled image 808 determined by using the downsampling DNN 806 may be significantly different from structural characteristics of the original image 800. When the structural characteristics of the downsampled image 808 become significantly different, compared to the original image 800, coding efficiency may deteriorate. To prevent deterioration in the coding efficiency, according to an embodiment, a structural information preserver 802 of the compressor 160 may determine a structurally reconstructed image 804 by using the structural characteristics of the original image 800, the structurally reconstructed image 804 having a size that is spatially decreased compared to the original image 800, and the compressor 160 may compare the downsampled image 808 with the structurally reconstructed image 804. According to an embodiment, the downsampled image 808 and the structurally reconstructed image 804 are characterized in having resolutions that are spatially the same or similar.

According to an embodiment, the structural information preserver 802 may generate the structurally reconstructed image 804 by referring to various structural characteristics such as luminance, contrast, a histogram, an image compression rate, an encoding quality, compression history information, a type of an original image to be compressed, or the like, and may generate the downsampled image 808, according to a result of comparison with the structurally reconstructed image 804. According to an embodiment, structural information may include a plurality of pieces of information previously determined based on the original image 800, and may include structural information determined based on an input signal or parameter information.

According to an embodiment, the structural information preserver 802 may generate the structurally reconstructed image 804 by using the structural characteristics such as luminance, contrast, a histogram, or the like of the original image 800, wherein the structurally reconstructed image 804 has structural characteristics similar to the structural characteristics of the original image 800 and has a spatial size or a resolution which has been decreased.

According to an embodiment, the structural information preserver 802 may generate the structurally reconstructed image 804, based on the encoding quality or a compression rate which indicates a degree of entropy encoding with respect to the original image 800. For example, a spatial resolution of the structurally reconstructed image 804 may be determined according to an encoding quality determined based on information input by a user or an external source, or a previously determined encoding quality, such that a spatial resolution of a compressed image which corresponds to a result of downsampling performed by the downsampling DNN 806 may be determined.

According to an embodiment, the structural information preserver 802 may generate the downsampled image 808 by using compression history information stored in the image compressing device 150. According to an embodiment, the image compressing device 150 may determine a spatial resolution of the structurally reconstructed image 804 by using compression history information stored in a storage (not shown) or received from an external source, such that a spatial size of the downsampled image 808 may be determined. In detail, according to the compression history information that is usable by the image compressing device 150, a user desired encoding quality or compression rate may be determined, and a size of the structurally reconstructed image 804 and a size of the downsampled image 808 may be determined according to an encoding quality determined based on the compression history information. For example, the size of the structurally reconstructed image 804 and the size of the downsampled image 808 may be determined according to an encoding quality that has been most frequently used based on the compression history information. As another example, the size of the structurally reconstructed image 804 and the size of the downsampled image 808 may be determined according to an encoding quality that has been used more than a predetermined threshold value (e.g., an average quality of encoding qualities that have been used more than the predetermined threshold value may be used), based on the compression history information.

According to an embodiment, the structural information preserver 802 may generate the structurally reconstructed image 804 based on a type of the original image 800. According to an embodiment, when a resolution of a predetermined image is decreased by n %, even when the image is reconstructed at a later time, structural information or an image quality may be similar to the original image 800, but, in a case of an image having a same spatial resolution and a different type compared to a predetermined image, structural information or an image quality after reconstruction may become similar to the original image 800 only when a resolution is decreased by m %. The structural information preserver 802 may determine a rate of decreasing a spatial resolution (i.e., "decrease information") by referring to a type of the original image 800, and thus may generate the structurally reconstructed image 804 accordingly.

The decrease information may be determined by the structural information preserver 802 or may be randomly determined according to a user input. According to an embodiment, the decrease information may be encoded and then transmitted via a bitstream According to an embodiment, the downsampling DNN 806 may downsample the original image 800, based on the decrease information. In this regard, a structure of the downsampling DNN 806 which is necessary for performing downsampling may vary according to a decrease rate indicated by the decrease information. For example, to decrease the original image 800 according to a maximum rate, all layers in the downsampling DNN 806 have to be used, whereas some layers in the downsampling DNN 806 may not be used when the original image 800 is decreased according to a rate smaller than a maximum rate.

That is, according to an embodiment, the downsampling DNN 806 may adjust a decrease degree with respect to the original image 800 by using only some layers in the downsampling DNN 806. In this regard, a layer in the downsampling DNN 806, the layer having to be used in downsampling, may be determined based on the decrease information.

According to an embodiment, the downsampling DNN 806 is a network that is trained, in consideration of structural information of an image, an amount of compressed bits, and a reconstruction network. In this regard, training with respect to the downsampling DNN 806 may be performed by updating, based on an input/output data set, connection relations and weights of a plurality of network nodes configuring the downsampling DNN 806, the input/output data set being provided for training. Therefore, according to an embodiment, the downsampling DNN 806 may be a network that may be constantly updated.

According to an embodiment, the compressor 160 may determine first lossy information 812 indicating a norm of a difference between the structurally reconstructed image 804 and the downsampled image 808. According to an embodiment, the compressor 160 may determine second lossy information 814 indicating spatial complexity included in the downsampled image 808. According to an embodiment, the compressor 160 may calculate a total variance value so as to determine the spatial complexity of the downsampled image 808, and may determine the total variance value as the second lossy information 814.

Figure 9:
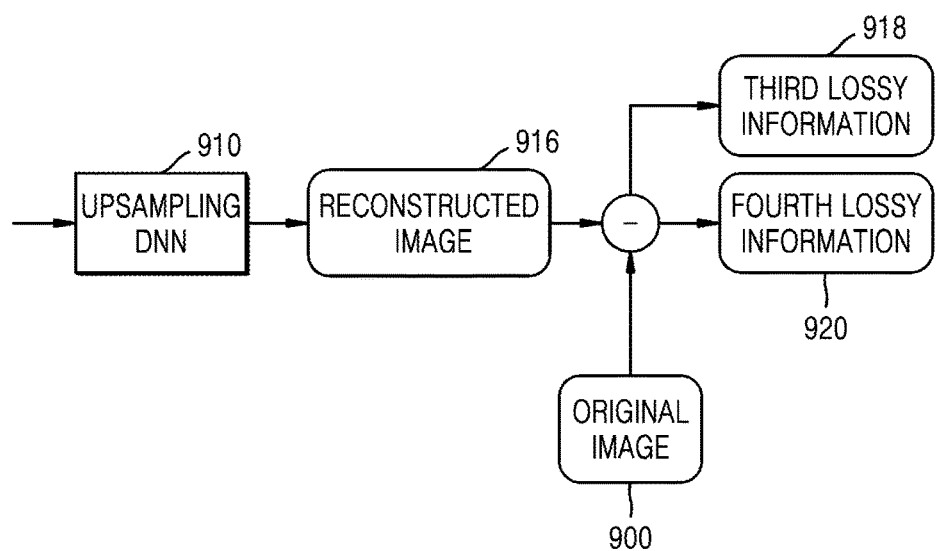
FIG. 9 is a diagram for illustrating lossy information having occurred in a DNN for upsampling.

FIG. 9 is a diagram for illustrating lossy information having occurred in a DNN for upsampling.

According to an embodiment, a downsampled image 908 may be upsampled by an upsampling DNN 910, and as a result thereof, a reconstructed image 916 may be determined. According to an embodiment, an input of the upsampling DNN 910 may be the downsampled image 908 or may be an image obtained by encoding and then decoding the downsampled image 908.

According to an embodiment, the compressor 160 may compare an original image 900 with a reconstructed image 916 and thus may determine third lossy information 918 and fourth lossy information 920. According to an embodiment, the third lossy information 918 may indicate an L1-norm value indicating a difference between the original image 900 and the reconstructed image 916, and the fourth lossy information 920 may indicate an L2-norm value indicating a difference between the original image 900 and the reconstructed image 916. According to an embodiment, the L1-norm value may be a result of summing absolute values of vector components indicating the difference between the original image 900 and the reconstructed image 916. According to an embodiment, the L2-norm value may be a root value of a sum of squares of vector components indicating the difference between the original image 900 and the reconstructed image 916.

According to an embodiment, the compressor 160 may train the DNN for upsampling and the DNN for downsampling according to Equation 1 below.

Equation 1

$$\text{Loss}_{DS} = \text{first lossy information} + a*\text{second lossy information} + b*\text{fourth lossy information}$$

$$\text{Loss}_{US} = c*\text{third lossy information} + d*\text{fourth lossy information} \quad \text{[Equation 1]}$$

According to an embodiment, $\text{Loss}_{DS}$ may correspond to a sum of at least one piece of lossy information indicating a loss having occurred due to downsampling. According to an embodiment, $\text{Loss}_{US}$ may correspond to a sum of at least one piece of lossy information determined by comparing a reconstructed image with an original image before downsampling is performed thereon. According to an embodiment, a, b, c, and d may correspond to predetermined weights.

According to an embodiment, the compressor 160 may share arbitrary lossy information so as to determine $\text{Loss}_{DS}$ and $\text{Loss}_{US}$. According to an embodiment, the compressor 160 may determine $\text{Loss}_{DS}$ and $\text{Loss}_{US}$, based on the fourth lossy information as in Equation 1. However, information shared in a process of determining $\text{Loss}_{DS}$ and $\text{Loss}_{US}$ should not be construed as being limited to the aforementioned embodiment, and thus it should be construed that various types of lossy information may be commonly used in the process of determining $\text{Loss}_{DS}$ and $\text{Loss}_{US}$ to the extent that one of ordinary skill in the art can easily perform.

According to an embodiment, the DNN for upsampling that is usable by the reconstructor 120 of the image reconstructing device 100 may be characterized in that the DNN for upsampling is trained to allow a sum of at least one lossy information to be decreased, wherein the at least one lossy information is determined by comparing an image with an original image before downsampling is performed and the image being reconstructed by performing upsampling after a compressed image has been decoded. Referring to Equation 1, according to an embodiment, the reconstructor 120 may be trained to allow $\text{Loss}_{US}$ to have a minimum value based on the third lossy information and the fourth lossy information to which a weight has been applied. The reconstructor 120 may train the DNN for upsampling to allow Loss$_{US}$ to have a minimum value, thereby performing upsampling by using the DNN trained to have priority on a reconstruction performance.

According to an embodiment, some of the at least one piece of lossy information used in a training process for the DNN for upsampling may have been used in a training process for the DNN for downsampling. Referring to Equation 1, according to an embodiment, the fourth lossy information used in determining Loss$_{US}$ may be one of lossy information used in a process of determining Loss$_{DS}$.

According to another embodiment, the DNN for downsampling used by the compressor 160 of the image compressing device 150 may have been trained to allow a sum of at least one piece of lossy information to be decreased, the at least one piece of lossy information indicating a loss having occurred due to downsampling. Referring to Equation 1, according to an embodiment, the compressor 160 may be trained to allow Loss$_{DS}$ to have a minimum value based on the first lossy information, the second third lossy information, and the fourth lossy information to which a weight has been applied. The compressor 160 may train the DNN for downsampling to allow Loss$_{DS}$ to have a minimum value, thereby performing downsampling by using the DNN trained to have priority on a compression performance and a reconstruction performance.

According to an embodiment, some of the at least one piece of lossy information used in a training process for the DNN for downsampling may have been determined based on a result of comparing an image with an original image before downsampling is performed and the image being reconstructed by performing upsampling after a compressed image has been decoded, and the comparison result may be used in the training process for the DNN for upsampling. Referring to Equation 1, the fourth lossy information may have been used not only in the training process for the DNN for downsampling but also used in the training process for the DNN for upsampling.

According to an embodiment, the aforementioned various embodiments as a process that may be performed by the compressor 160 may be performed based on various data units that are usable in an image encoding process. According to an embodiment, the compressor 160 may perform a process of encoding, downsampling, and upsampling an image by using various data units including a video, a sequence, a frame, a slice, a slice segment, a largest coding unit, a coding unit, a prediction unit, a transform unit, a processing unit, or the like. The bitstream generator 170 may generate a bitstream according to each picture, the bitstream including change information indicating how much an original image has been compressed through downsampling. According to an embodiment, the compressor 160 may perform a process of performing downsampling or upsampling on each largest coding unit. However, the data units used by the compressor 160 to perform a predetermined process should not be construed as being limited to the aforementioned embodiments, and thus it should be construed that various data units may be used to the extent that one of ordinary skill in the art can easily use. Characteristics of the various data units that are usable by the image compressing device 150 will be described below with reference to FIGS. 10 to 23.

A model related to the DNN may be implemented as a software module. When implemented as the software module (e.g., a program module including an instruction), the DNN model may be stored in a computer-readable recording medium.

Also, the DNN model may be integrated in the form of a hardware chip and thus may become a portion of the image reconstructing device 100 or the image compressing device 150. For example, the DNN model may be manufactured as a dedicated hardware chip for artificial intelligence (AI), or may be manufactured as a portion of a general-use processor (e.g., a CPU or an application processor) or a dedicated graphic processor (e.g., a GPU).

Also, the DNN model may be provided as downloadable software. A computer program product may include a product (e.g. a downloadable application) in a software program distributed electronically through a manufacturer or an electronic market. For electronic distribution, at least a part of the software program may be stored in a storage medium or may be temporarily generated. In this case, the storage medium may be a storage medium of a server of the manufacturer, a server of the electronic market, or a relay server.

Hereinafter, with reference to FIGS. 10 to 23, a method of determining a data unit of an image according to an embodiment will now be described.

Figure 10:
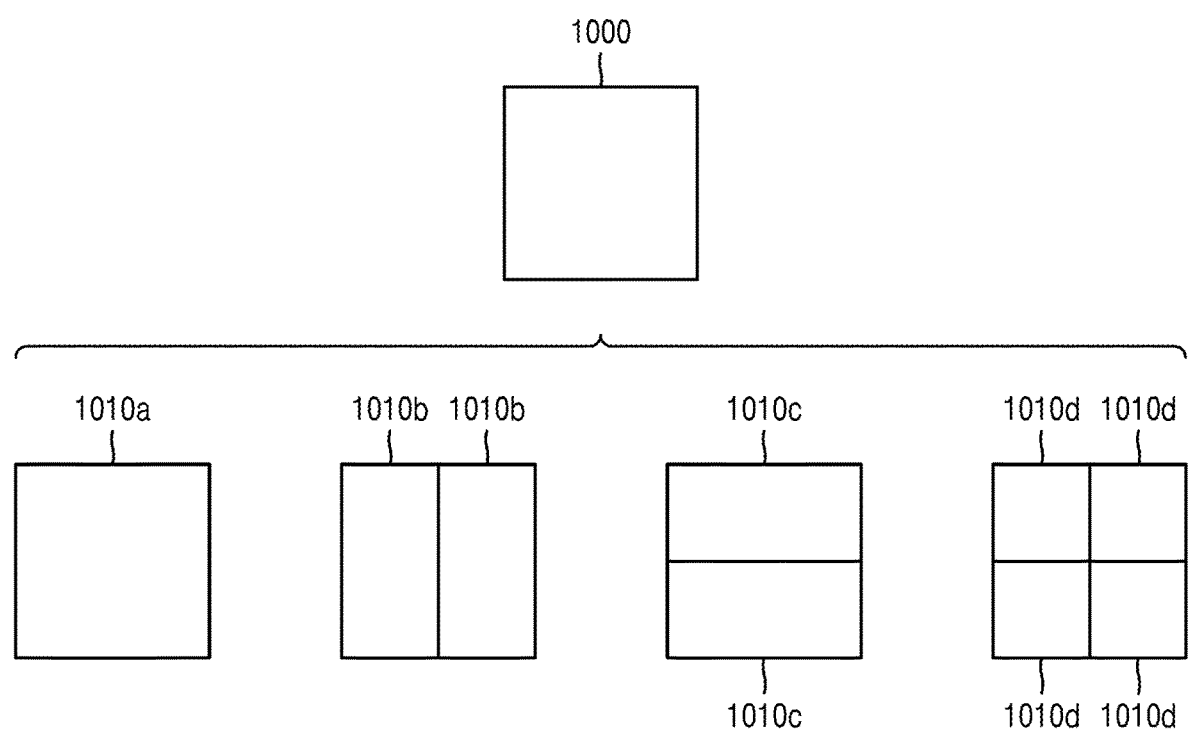
FIG. 10 illustrates a process of determining at least one coding unit by splitting a current coding unit, according to an embodiment.

FIG. 10 illustrates a procedure, performed by the image reconstructing device 100, of determining at least one coding unit by splitting a current coding unit, according to an embodiment.

According to an embodiment, the image reconstructing device 100 may determine a shape of a coding unit by using block shape information, and may determine a splitting method of the coding unit by using split shape information. That is, a coding unit splitting method indicated by the split shape information may be determined based on a block shape indicated by the block shape information used by the image reconstructing device 100.

According to an embodiment, the image reconstructing device 100 may use the block shape information indicating that the current coding unit has a square shape. For example, the image reconstructing device 100 may determine whether not to split a square coding unit, whether to vertically split the square coding unit, whether to horizontally split the square coding unit, or whether to split the square coding unit into four coding units, based on the split shape information. Referring to FIG. 10, when the block shape information of a current coding unit 1000 indicates a square shape, a decoder 1030 may determine that a coding unit 1010*a* having the same size as the current coding unit 1000 is not split, based on the split shape information indicating not to perform splitting, or may determine coding units 1010*b*, 1010*c*, or 1010*d* split based on the split shape information indicating a predetermined splitting method.

Referring to FIG. 10, according to an embodiment, the image reconstructing device 100 may determine two coding units 1010*b* obtained by splitting the current coding unit 1000 in a vertical direction, based on the split shape information indicating to perform splitting in a vertical direction. The image reconstructing device 100 may determine two coding units 1010*c* obtained by splitting the current coding unit 1000 in a horizontal direction, based on the split shape information indicating to perform splitting in a horizontal direction. The image reconstructing device 100 may determine four coding units 1010*d* obtained by splitting the current coding unit 1000 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

Figure 11:
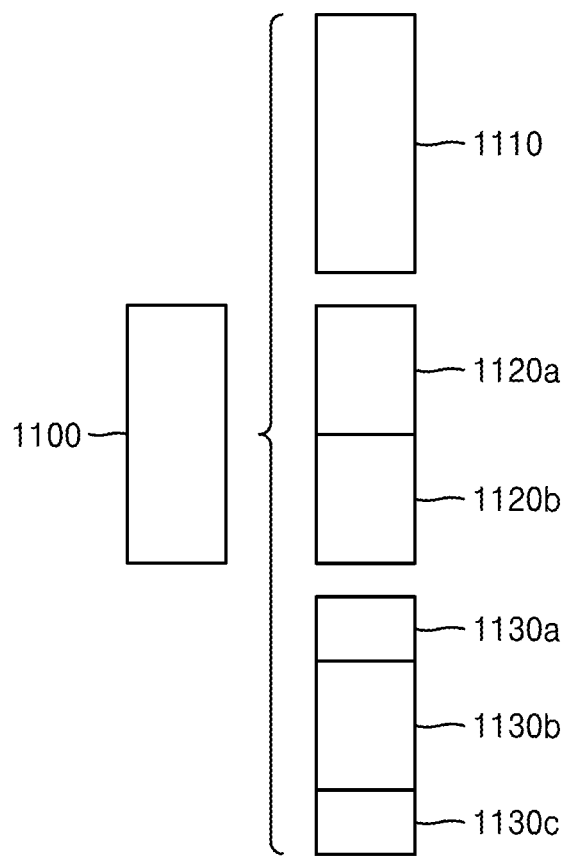
FIG. 11 illustrates a process of determining at least one coding unit by splitting a non-square coding unit, according to an embodiment.
Figure 11:
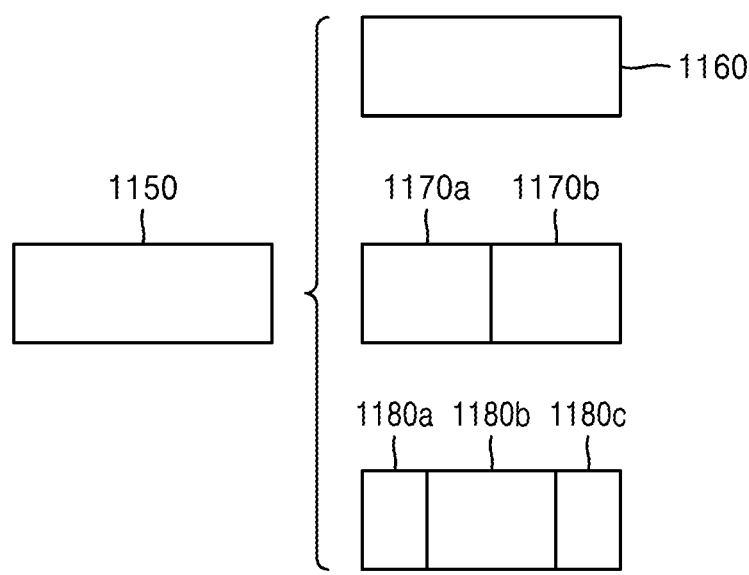

FIG. 11 illustrates a process, performed by the image reconstructing device 100, of determining at least one coding unit by splitting a non-square coding unit, according to an embodiment.

According to an embodiment, the image reconstructing device 100 may use block shape information indicating that a current coding unit has a non-square shape. The image reconstructing device 100 may determine whether not to split the non-square current coding unit or whether to split the non-square current coding unit by using a predetermined splitting method, based on split shape information. Referring to FIG. 11, when the block shape information of a current coding unit 1100 or 1150 indicates a non-square shape, the image reconstructing device 100 may determine that a coding unit 1110 or 1160 having the same size as the current coding unit 1100 or 1150 is not split, based on the split shape information indicating not to perform splitting, or determine coding units 1120*a* and 1120*b*, 1130*a* to 1130*c*, 1170*a* and 1170*b*, or 1180*a* to 1180*c* split based on the split shape information indicating a predetermined splitting method. Predetermined splitting methods of splitting a non-square coding unit will be described in detail below in relation to various embodiments.

According to an embodiment, the image reconstructing device 100 may determine a splitting method of a coding unit by using the split shape information and, in this case, the split shape information may indicate the number of one or more coding units generated by splitting a coding unit. Referring to FIG. 11, when the split shape information indicates to split the current coding unit 1100 or 1150 into two coding units, the image reconstructing device 100 may determine two coding units 1120*a* and 1120*b*, or 1170*a* and 1170*b* included in the current coding unit 1100 or 1150, by splitting the current coding unit 1100 or 1150 based on the split shape information.

According to an embodiment, when the image reconstructing device 100 splits the non-square current coding unit 1100 or 1150 based on the split shape information, the location of a long side of the non-square current coding unit 1100 or 1150 may be considered. For example, the image reconstructing device 100 may determine a plurality of coding units by dividing a long side of the current coding unit 1100 or 1150 considering the shape of the current coding unit 1100 or 1150.

According to an embodiment, when the split shape information indicates to split a coding unit into an odd number of blocks, the image reconstructing device 100 may determine an odd number of coding units included in the current coding unit 1100 or 1150. For example, when the split shape information indicates to split the current coding unit 1100 or 1150 into three coding units, the image reconstructing device 100 may split the current coding unit 1100 or 1150 into three coding units 1130*a*, 1130*b*, and 1130*c*, or 1180*a*, 1180*b*, and 1180*c*. According to an embodiment, the image reconstructing device 100 may determine an odd number of coding units included in the current coding unit 1100 or 1150, and not all the determined coding units have the same size. For example, a predetermined coding unit 1130*b* or 1180*b* from among the determined odd number of coding units 1130*a*, 1130*b*, and 1130*c*, or 1180*a*, 1180*b*, and 1180*c* may have a size different from the size of the other coding units 1130*a* and 1130*c*, or 1180*a* and 1180*c*. That is, coding units which may be determined by splitting the current coding unit 1100 or 1150 may have multiple sizes and, in some cases, all of the odd number of coding units 1130*a*, 1130*b*, and 1130*c*, or 1180*a*, 1180*b*, and 1180*c* may have different sizes.

According to an embodiment, when the split shape information indicates to split a coding unit into an odd number of blocks, the image reconstructing device 100 may determine an odd number of coding units included in the current coding unit 1100 or 1150, and may put a predetermined restriction on at least one coding unit from among the odd number of coding units generated by splitting the current coding unit 1100 or 1150. Referring to FIG. 11, the image reconstructing device 100 may allow a decoding method of the coding unit 1130*b* or 1180*b* to be different from that of the other coding units 1130*a* and 1130*c*, or 1180*a* and 1180*c*, wherein the coding unit 1130*b* or 1180*b* is at a center location from among the three coding units 1130*a*, 1130*b*, and 1130*c*, or 1180*a*, 1180*b*, and 1180*c* generated by splitting the current coding unit 1100 or 1150. For example, the image reconstructing device 100 may restrict the coding unit 1130*b* or 1180*b* at the center location to be no longer split or to be split only a predetermined number of times, unlike the other coding units 1130*a* and 1130*c*, or 1180*a* and 1180*c*.

Figure 12:
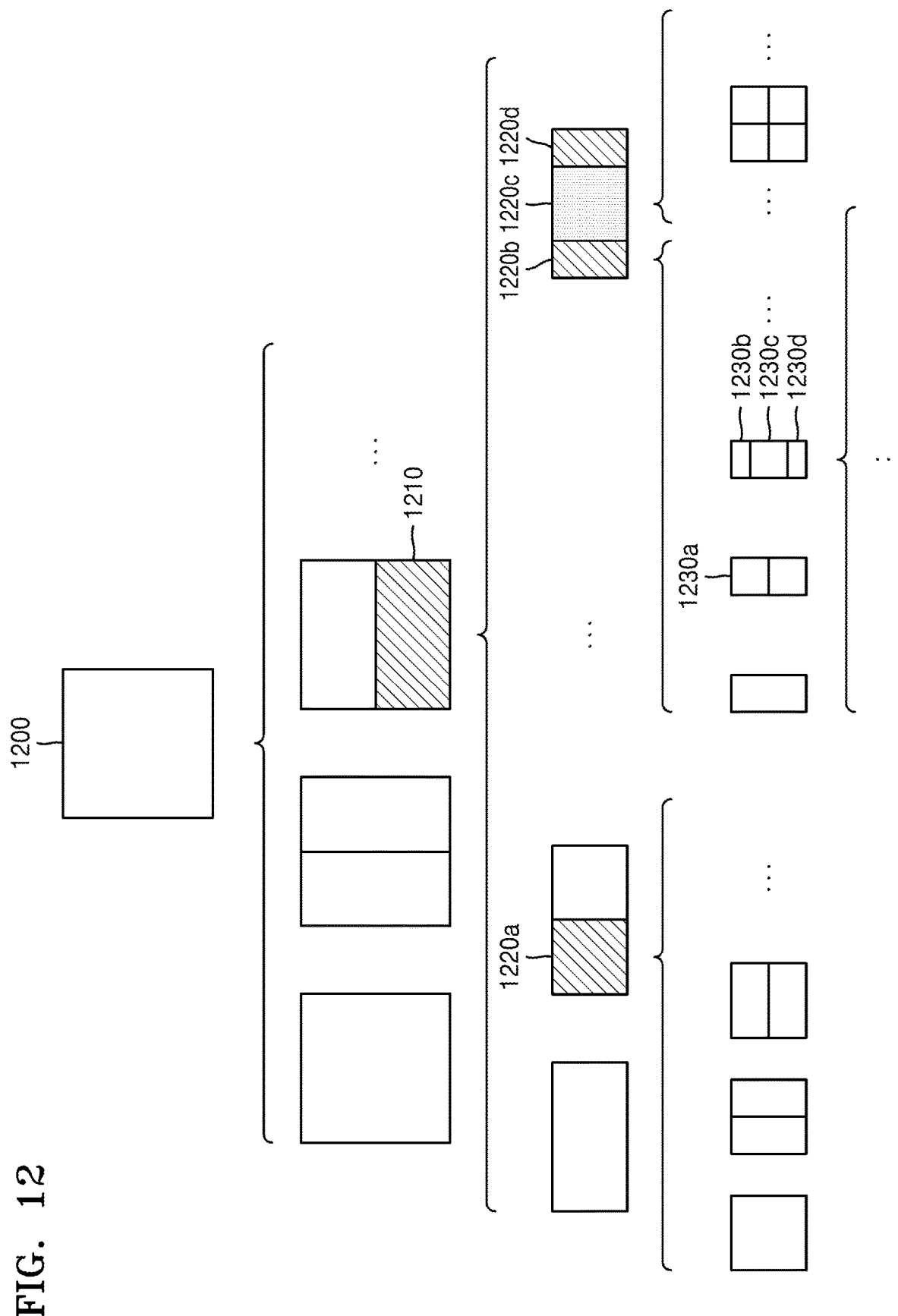
FIG. 12 illustrates an operation of splitting a coding unit, based on at least one of block shape information and split shape information, according to an embodiment.

FIG. 12 illustrates an operation, performed by the image reconstructing device 100, of splitting a coding unit based on at least one of block shape information and split shape information, according to an embodiment.

According to an embodiment, the image reconstructing device 100 may determine to split or not to split a square first coding unit 1200 into coding units, based on at least one of the block shape information and the split shape information. According to an embodiment, when the split shape information indicates to split the first coding unit 1200 in a horizontal direction, the image reconstructing device 100 may determine a second coding unit 1210 by splitting the first coding unit 1200 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first, second, and third coding units follows the above descriptions.

According to an embodiment, the image reconstructing device 100 may determine to split or not to split the determined second coding unit 1210 into coding units, based on at least one of the block shape information and the split shape information. Referring to FIG. 12, the image reconstructing device 100 may or may not split the non-square second coding unit 1210, which is determined by splitting the first coding unit 1200, into one or more third coding units 1220*a*, or 1220*b*, 1220*c*, and 1220*d* based on at least one of the block shape information and the split shape information. The image reconstructing device 100 may obtain at least one of the block shape information and the split shape information, and determine a plurality of various-shaped second coding units (e.g., 1210) by splitting the first coding unit 1200, based on the obtained at least one of the block shape information and the split shape information, and the second coding unit 1210 may be split by using the splitting method of the first coding unit 1200, based on at least one of the block shape information and the split shape information. According to an embodiment, when the first coding unit 1200 is split into the second coding units 1210 based on at least one of the block shape information and the split shape information of the first coding unit 1200, the second coding unit 1210 may also be split into the third coding units 1220*a*, or 1220*b*, 1220*c*, and 1220*d* based on at least one of the block shape information and the split shape information of the second coding unit 1210. That is, a coding unit may be recursively split based on at least one of the block shape information and the split shape information of each coding unit. Therefore, a square coding unit may be determined by splitting a non-square coding unit, and a non-square coding unit may be determined by recursively splitting the square coding unit. Referring to FIG. 12, a predetermined coding unit from among an odd number of third coding units 1220*b*, 1220*c*, and 1220*d* determined by splitting the non-square second coding unit 1210 (e.g., a coding unit at a center location or a square coding unit) may be recursively split. According to an embodiment, the square third coding unit 1220*c* from among the odd number of third coding units 1220*b*, 1220*c*, and 1220*d* may be split in a horizontal direction into a plurality of fourth coding units. A non-square fourth coding unit 1240 from among the plurality of fourth coding units may be split into a plurality of coding units. For example, the non-square fourth coding unit 1240 may be split into an odd number of coding units 1250*a*, 1250*b*, and 1250*c*.

A method that may be used to recursively split a coding unit will be described below in relation to various embodiments.

According to an embodiment, the image reconstructing device 100 may determine to split each of the third coding units 1220*a*, or 1220*b*, 1220*c*, and 1220*d* into coding units or not to split the second coding unit 1210, based on at least one of the block shape information and the split shape information. According to an embodiment, the image reconstructing device 100 may split the non-square second coding unit 1210 into the odd number of third coding units 1220*b*, 1220*c*, and 1220*d*. The image reconstructing device 100 may put a predetermined restriction on a predetermined third coding unit from among the odd number of third coding units 1220*b*, 1220*c*, and 1220*d*. For example, the image reconstructing device 100 may restrict the third coding unit 1220*c* at a center location from among the odd number of third coding units 1220*b*, 1220*c*, and 1220*d* to be no longer split or to be split a settable number of times. Referring to FIG. 12, the image reconstructing device 100 may restrict the third coding unit 1220*c*, which is at the center location from among the odd number of third coding units 1220*b*, 1220*c*, and 1220*d* included in the non-square second coding unit 1210, to be no longer split, to be split by using a predetermined splitting method (e.g., split into only four coding units or split by using a splitting method of the second coding unit 1210), or to be split only a predetermined number of times (e.g., split only n times (where n>0)). However, the restrictions on the third coding unit 1220*c* at the center location are not limited to the above-described examples, and may include various restrictions for decoding the third coding unit 1220*c* at the center location differently from the other third coding units 1220*b* and 1220*d*.

According to an embodiment, the image reconstructing device 100 may obtain at least one of the block shape information and the split shape information, which is used to split a current coding unit, from a predetermined location in the current coding unit.

Figure 13:
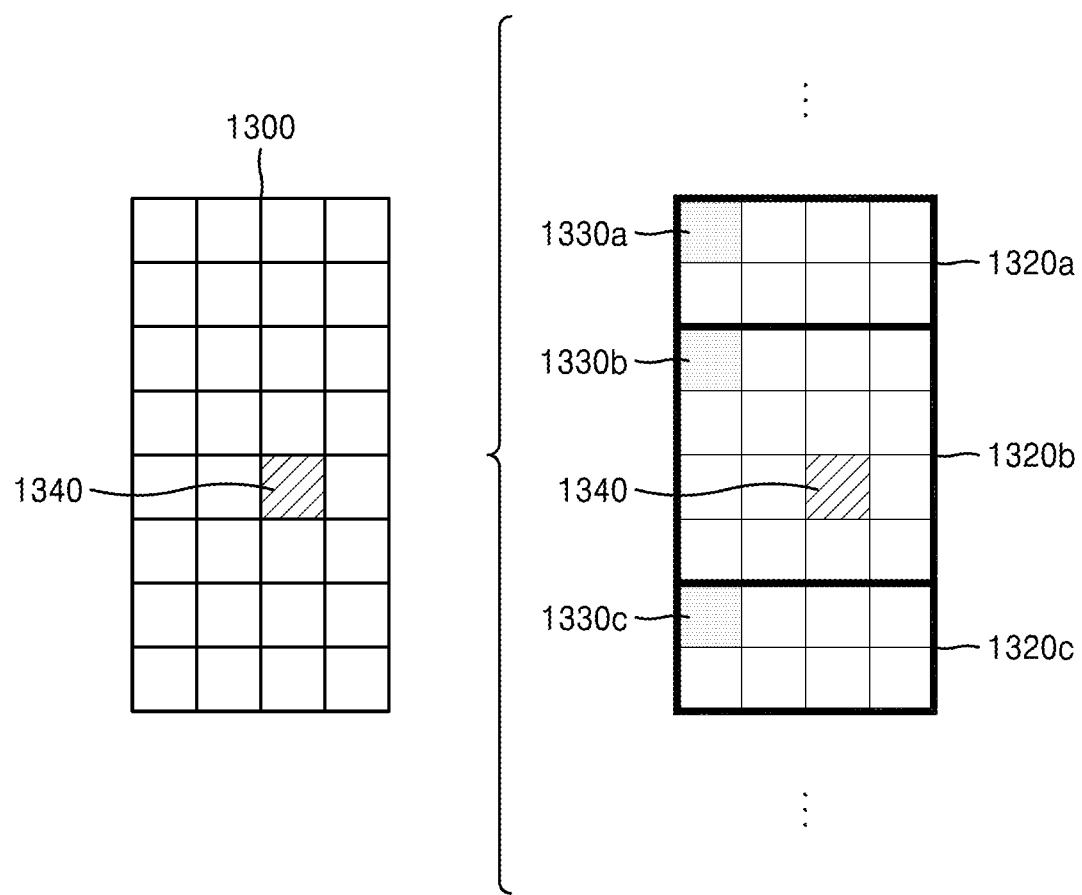
FIG. 13 illustrates a method of determining a predetermined coding unit from among an odd number of coding units, according to an embodiment.

FIG. 13 illustrates a method, performed by the image reconstructing device 100, of determining a predetermined coding unit from among an odd number of coding units, according to an embodiment. Referring to FIG. 13, at least one of block shape information and split shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the split shape information may be obtained, is not limited to the center location in FIG. 13, and may include various locations included in the current coding unit 1300 (e.g., top, bottom, left, right, top left, bottom left, top right, and bottom right locations). The image reconstructing device 100 may obtain at least one of the block shape information and the split shape information from the predetermined location and determine to split or not to split the current coding unit into various-shaped and various-sized coding units.

According to an embodiment, when the current coding unit is split into a predetermined number of coding units, the image reconstructing device 100 may select one of the coding units. Various methods may be used to select one of a plurality of coding units, as will be described below in relation to various embodiments.

According to an embodiment, the image reconstructing device 100 may split the current coding unit into a plurality of coding units, and may determine a coding unit at a predetermined location.

FIG. 13 illustrates a method, performed by the image reconstructing device 100, of determining a coding unit of a predetermined location from among an odd number of coding units, according to an embodiment.

According to an embodiment, the image reconstructing device 100 may use information indicating locations of the odd number of coding units, to determine a coding unit at a center location from among the odd number of coding units. Referring to FIG. 13, the image reconstructing device 100 may determine an odd number of coding units 1320*a*, 1320*b*, and 1320*c* by splitting the current coding unit 1300. The image reconstructing device 100 may determine a coding unit 1320*b* at a center location by using information about locations of the odd number of coding units 1320*a* to 1320*c*. For example, the image reconstructing device 100 may determine the coding unit 1320*b* of the center location by determining the locations of the coding units 1320*a*, 1320*b*, and 1320*c* based on information indicating locations of predetermined samples included in the coding units 1320*a*, 1320*b*, and 1320*c*. In detail, the image reconstructing device 100 may determine the coding unit 1320*b* at the center location by determining the locations of the coding units 1320*a*, 1320*b*, and 1320*c* based on information indicating locations of top left samples 1330*a*, 1330*b*, and 1330*c* of the coding units 1320*a*, 1320*b*, and 1320*c*.

According to an embodiment, the information indicating the locations of the top left samples 1330*a*, 1330*b*, and 1330*c*, which are included in the coding units 1320*a*, 1320*b*, and 1320*c*, respectively, may include information about locations or coordinates of the coding units 1320*a*, 1320*b*, and 1320*c* in a picture. According to an embodiment, the information indicating the locations of the top left samples 1330*a*, 1330*b*, and 1330*c*, which are included in the coding units 1320*a*, 1320*b*, and 1320*c*, respectively, may include information indicating widths or heights of the coding units 1320*a*, 1320*b*, and 1320*c* included in the current coding unit 1300, and the widths or heights may correspond to information indicating differences between the coordinates of the coding units 1320*a*, 1320*b*, and 1320*c* in the picture. That is, the image reconstructing device 100 may determine the coding unit 1320*b* at the center location by directly using the information about the locations or coordinates of the coding units 1320*a*, 1320*b*, and 1320*c* in the picture, or by using the information about the widths or heights of the coding units, which correspond to the difference values between the coordinates.

According to an embodiment, information indicating the location of the top left sample 1330a of the upper coding unit 1320a may include coordinates (xa, ya), information indicating the location of the top left sample 1330b of the middle coding unit 1320b may include coordinates (xb, yb), and information indicating the location of the top left sample 1330c of the lower coding unit 1320c may include coordinates (xc, yc). The image reconstructing device 100 may determine the middle coding unit 1320b by using the coordinates of the top left samples 1330a, 1330b, and 1330c which are included in the coding units 1320a, 1320b, and 1320c, respectively. For example, when the coordinates of the top left samples 1330a, 1330b, and 1330c are sorted in an ascending or descending order, the coding unit 1320b including the coordinates (xb, yb) of the sample 1330b at a center location may be determined as a coding unit at a center location from among the coding units 1320a, 1320b, and 1320c determined by splitting the current coding unit 1300. However, the coordinates indicating the locations of the top left samples 1330a, 1330b, and 1330c may include coordinates indicating absolute locations in the picture, or may use coordinates (dxb, dyb) indicating a relative location of the top left sample 1330b of the middle coding unit 1320b and coordinates (dxc, dyc) indicating a relative location of the top left sample 1330c of the lower coding unit 1320c with reference to the location of the top left sample 1330a of the upper coding unit 1320a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image reconstructing device 100 may split the current coding unit 1300 into a plurality of coding units 1320a, 1320b, and 1320c, and select one of the coding units 1320a, 1320b, and 1320c based on a predetermined criterion. For example, the image reconstructing device 100 may select the coding unit 1320b, which has a size different from that of the others, from among the coding units 1320a, 1320b, and 1320c.

According to an embodiment, the image reconstructing device 100 may determine the widths or heights of the coding units 1320a, 1320b, and 1320c by using the coordinates (xa, ya) indicating the location of the top left sample 1330a of the upper coding unit 1320a, the coordinates (xb, yb) indicating the location of the top left sample 1330b of the middle coding unit 1320b, and the coordinates (xc, yc) indicating the location of the top left sample 1330c of the lower coding unit 1320c. The image reconstructing device 100 may determine the sizes of the coding units 1320a, 1320b, and 1320c by using the coordinates (xa, ya), (xb, yb), and (xc, yc) indicating the locations of the coding units 1320a, 1320b, and 1320c.

According to an embodiment, the image reconstructing device 100 may determine the width of the upper coding unit 1320a to be xb-xa and determine the height thereof to be yb-ya. According to an embodiment, the image reconstructing device 100 may determine the width of the middle coding unit 1320b to be xc-xb and determine the height thereof to be yc-yb. According to an embodiment, the image reconstructing device 100 may determine the width or height of the lower coding unit 1320c by using the width or height of the current coding unit 1300 or the widths or heights of the upper and middle coding units 1320a and 1320b. The image reconstructing device 100 may determine a coding unit, which has a size different from that of the others, based on the determined widths and heights of the coding units 1320a to 1320c. Referring to FIG. 13, the image reconstructing device 100 may determine the middle coding unit 1320b, which has a size different from the size of the upper and lower coding units 1320a and 1320c, as the coding unit of the predetermined location. However, the above-described method, performed by the image reconstructing device 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image reconstructing device 100 may select a coding unit at a predetermined location from among an odd number of coding units determined by splitting the current coding unit, considering the shape of the current coding unit. For example, when the current coding unit has a non-square shape, a width of which is longer than a height, the image reconstructing device 100 may determine the coding unit at the predetermined location in a horizontal direction. That is, the image reconstructing device 100 may determine one of coding units at different locations in a horizontal direction and put a restriction on the coding unit. When the current coding unit has a non-square shape, a height of which is longer than a width, the image reconstructing device 100 may determine the coding unit at the predetermined location in a vertical direction. That is, the image reconstructing device 100 may determine one of coding units at different locations in a vertical direction and put a restriction on the coding unit.

According to an embodiment, the image reconstructing device 100 may use information indicating locations of an even number of coding units, to determine the coding unit at the predetermined location from among the even number of coding units. The image reconstructing device 100 may determine an even number of coding units by splitting the current coding unit, and determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 13, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image reconstructing device 100 may use at least one of block shape information and split shape information, which is stored in a sample included in a coding unit at a center location, in a splitting operation to determine the coding unit at the center location from among the plurality of coding units determined by splitting the current coding unit.

Referring to FIG. 13, the image reconstructing device 100 may split the current coding unit 1300 into a plurality of coding units 1320a, 1320b, and 1320c based on at least one of the block shape information and the split shape information, and determine a coding unit 1320b at a center location from among the plurality of the coding units 1320a, 1320b, and 1320c. Furthermore, the image reconstructing device 100 may determine the coding unit 1320b at the center location, in consideration of a location from which at least one of the block shape information and the split shape information is obtained. That is, at least one of the block shape information and the split shape information of the current coding unit 1300 may be obtained from the sample 1340 at a center location of the current coding unit 1300 and, when the current coding unit 1300 is split into the plurality of coding units 1320a, 1320b, and 1320c based on at least one of the block shape information and the split shape information, the coding unit 1320b including the sample 1340 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the image reconstructing device 100 may use at least one of the block shape information and the split shape information, which is obtained from a sample at a predetermined location in the current coding unit 1300 (e.g., a sample at a center location of the current coding unit 1300) to determine a coding unit at a predetermined location from among the plurality of the coding units 1320a, 1320b, and 1320c determined by splitting the current coding unit 1300 (e.g., a coding unit at a center location from among a plurality of split coding units). That is, the image reconstructing device 100 may determine the sample at the predetermined location by considering a block shape of the current coding unit 1300, determine the coding unit 1320b including a sample, from which predetermined information (e.g., at least one of the block shape information and the split shape information) may be obtained, from among the plurality of coding units 1320a, 1320b, and 1320c determined by splitting the current coding unit 1300, and put a predetermined restriction on the coding unit 1320b. Referring to FIG. 13, according to an embodiment, the image reconstructing device 100 may determine the sample 1340 at the center location of the current coding unit 1300 as the sample from which the predetermined information may be obtained, and put a predetermined restriction on the coding unit 1320b including the sample 1340, in a decoding operation. However, the location of the sample from which the predetermined information may be obtained is not limited to the above-described location, and may include arbitrary locations of samples included in the coding unit 1320b to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the image reconstructing device 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image reconstructing device 100 may determine one of samples adjacent to a boundary for dividing a long side of the current coding unit in half, as the sample from which the predetermined information may be obtained.

According to an embodiment, when the current coding unit is split into a plurality of coding units, the image reconstructing device 100 may use at least one of the block shape information and the split shape information to determine a coding unit at a predetermined location from among the plurality of coding units. According to an embodiment, the image reconstructing device 100 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 12, and thus detailed descriptions thereof will not be provided herein.

According to an embodiment, the image reconstructing device 100 may determine one or more coding units by splitting the current coding unit, and determine an order of decoding the one or more coding units, based on a predetermined block (e.g., the current coding unit).

Figure 14:
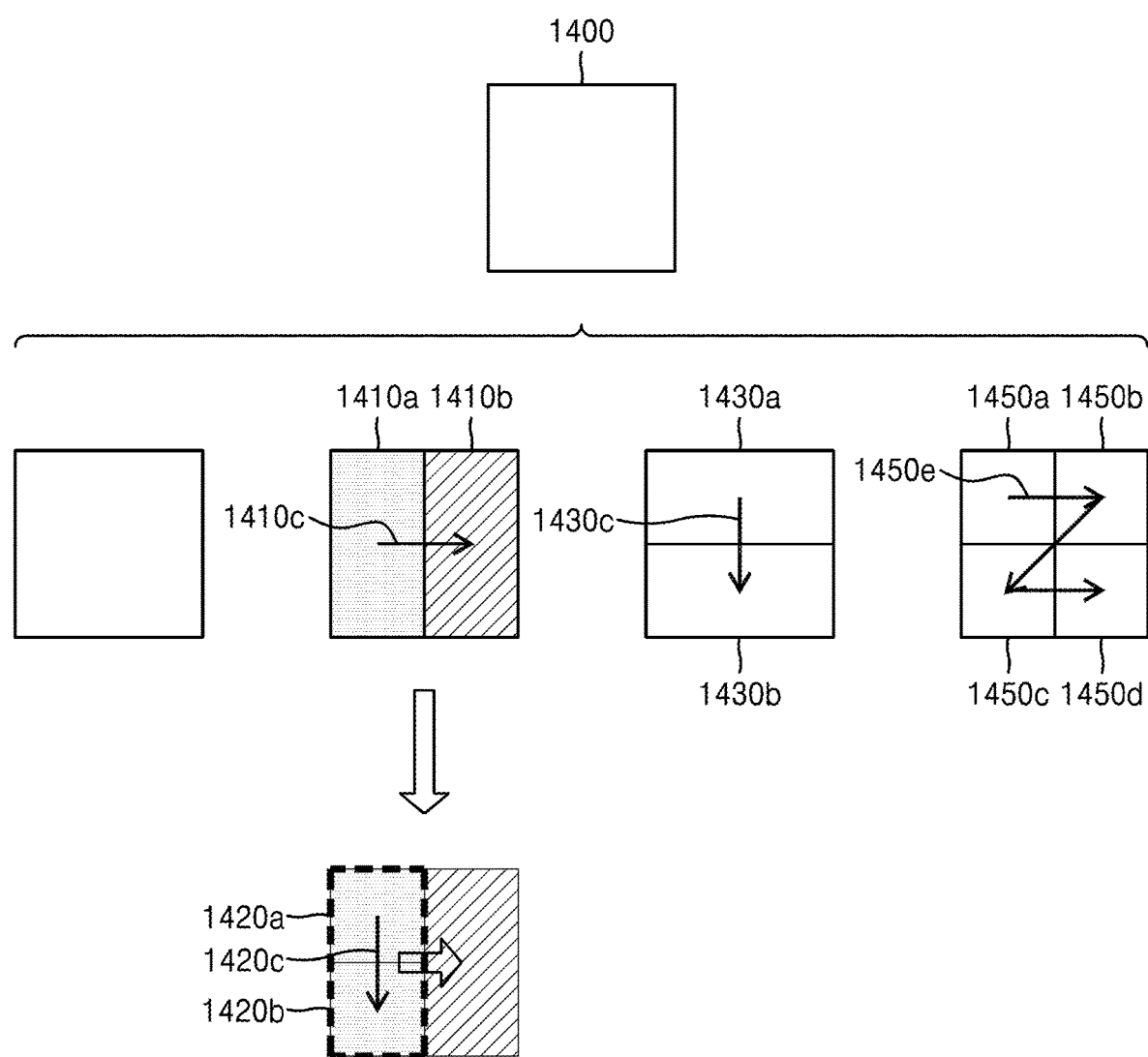
FIG. 14 illustrates an order of processing a plurality of coding units when the plurality of coding units are determined by splitting a current coding unit, according to an embodiment.

FIG. 14 illustrates an order of processing a plurality of coding units when the image reconstructing device 100 determines the plurality of coding units by splitting a current coding unit, according to an embodiment.

According to an embodiment, the image reconstructing device 100 may determine second coding units 1410a and 1410b by splitting a first coding unit 1400 in a vertical direction, determine second coding units 1430a and 1430b by splitting the first coding unit 1400 in a horizontal direction, or determine second coding units 1450a to 1450d by splitting the first coding unit 1400 in vertical and horizontal directions, based on block shape information and split shape information.

Referring to FIG. 14, the image reconstructing device 100 may determine to process the second coding units 1410a and 1410b, which are determined by splitting the first coding unit 1400 in a vertical direction, in a horizontal direction order 1410c. The image reconstructing device 100 may determine to process the second coding units 1430a and 1430b, which are determined by splitting the first coding unit 1400 in a horizontal direction, in a vertical direction order 1430c. The image reconstructing device 100 may determine to process the second coding units 1450a to 1450d, which are determined by splitting the first coding unit 1400 in vertical and horizontal directions, in a predetermined order for processing coding units in a row and then processing coding units in a next row (e.g., in a raster scan order or Z-scan order 1450e).

According to an embodiment, the image reconstructing device 100 may recursively split coding units. Referring to FIG. 14, the image reconstructing device 100 may determine a plurality of coding units 1410a, 1410b, 1430a, 1430b, 1450a, 1450b, 1450c, and 1450d by splitting the first coding unit 1400, and recursively split each of the determined plurality of coding units 1410a, 1410b, 1430a, 1430b, 1450a, 1450b, 1450c, and 1450d. A splitting method of the plurality of coding units 1410a, 1410b, 1430a, 1430b, 1450a, 1450b, 1450c, and 1450d may correspond to a splitting method of the first coding unit 1400. As such, each of the plurality of coding units 1410a, 1410b, 1430a, 1430b, 1450a, 1450b, 1450c, and 1450d may be independently split into a plurality of coding units. Referring to FIG. 14, the image reconstructing device 100 may determine the second coding units 1410a and 1410b by splitting the first coding unit 1400 in a vertical direction, and determine to independently split or not to split each of the second coding units 1410a and 1410b.

According to an embodiment, the image reconstructing device 100 may determine third coding units 1420a and 1420b by splitting the left second coding unit 1410a in a horizontal direction, and may not split the right second coding unit 1410b.

According to an embodiment, a processing order of coding units may be determined based on an operation of splitting a coding unit. In other words, a processing order of split coding units may be determined based on a processing order of coding units immediately before being split. The image reconstructing device 100 may determine a processing order of the third coding units 1420a and 1420b determined by splitting the left second coding unit 1410a, independently of the right second coding unit 1410b. Because the third coding units 1420a and 1420b are determined by splitting the left second coding unit 1410a in a horizontal direction, the third coding units 1420a and 1420b may be processed in a vertical direction order 1420c. Because the left and right second coding units 1410a and 1410b are processed in the horizontal direction order 1410c, the right second coding unit 1410b may be processed after the third coding units 1420a and 1420b included in the left second coding unit 1410a are processed in the vertical direction order 1420c. An operation of determining a processing order of coding units based on a coding unit before being split is not limited to the above-described example, and various methods may be used to independently process coding units, which are split and determined to various shapes, in a predetermined order.

Figure 15:
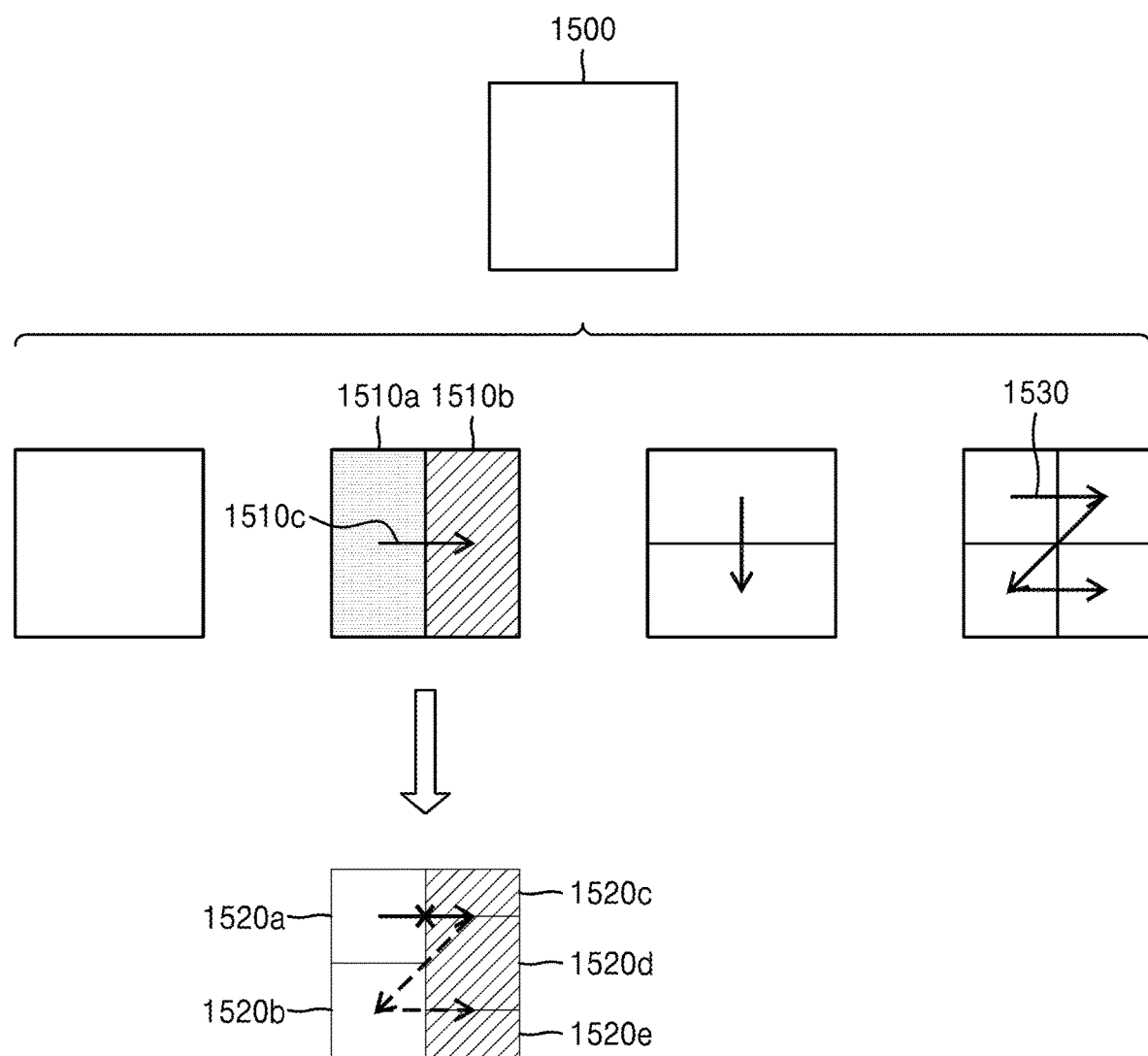
FIG. 15 illustrates a process of determining that a current coding unit is to be split into an odd number of coding units, when the coding units are not processable in a predetermined order, according to an embodiment.

FIG. 15 illustrates a process, performed by the image reconstructing device 100, of determining that a current coding unit is to be split into an odd number of coding units, when the coding units are not processable in a predetermined order, according to an embodiment.

According to an embodiment, the image reconstructing device 100 may determine whether the current coding unit is split into an odd number of coding units, based on obtained block shape information and split shape information. Referring to FIG. 15, a square first coding unit 1500 may be split into non-square second coding units 1510a and 1510b, and the second coding units 1510a and 1510b may be independently split into third coding units 1520a and 1520b, and 1520c to 1520e. According to an embodiment, the image reconstructing device 100 may determine a plurality of third coding units 1520a and 1520b by splitting the left second coding unit 1510a in a horizontal direction, and split the right second coding unit 1510b into an odd number of third coding units 1520c to 1520e.

According to an embodiment, the image reconstructing device 100 may determine whether any coding unit is split into an odd number of coding units, by deciding whether the third coding units 1520a and 1520b, and 1520c to 1520e are processable in a predetermined order. Referring to FIG. 15, the image reconstructing device 100 may determine the third coding units 1520a and 1520b, and 1520c to 1520e by recursively splitting the first coding unit 1500. The image reconstructing device 100 may determine whether any of the first coding unit 1500, the second coding units 1510a and 1510b, and the third coding units 1520a and 1520b, and 1520c to 1520e are split into an odd number of coding units, based on at least one of the block shape information and the split shape information. For example, the right second coding unit 1510b may be split into an odd number of third coding units 1520c to 1520e. A processing order of a plurality of coding units included in the first coding unit 1500 may be a predetermined order (e.g., a Z-scan order 1530), and the image reconstructing device 100 may decide whether the third coding units 1520c to 1520e, which are determined by splitting the right second coding unit 1510b into an odd number of coding units, satisfy a condition for processing in the predetermined order.

According to an embodiment, the image reconstructing device 100 may determine whether the third coding units 1520a and 1520b, and 1520c to 1520e included in the first coding unit 1500 satisfy the condition for processing in the predetermined order, and the condition relates to whether at least one of a width and height of the second coding units 1510a and 1510b is divided in half along a boundary of the third coding units 1520a and 1520b, and 1520c to 1520e. For example, the third coding units 1520a and 1520b determined by dividing the height of the non-square left second coding unit 1510a in half satisfy the condition. However, because boundaries of the third coding units 1520c to 1520e determined by splitting the right second coding unit 1510b into three coding units do not divide the width or height of the right second coding unit 1510b in half, it may be determined that the third coding units 1520c to 1520e do not satisfy the condition. When the condition is not satisfied as described above, the image reconstructing device 100 may decide disconnection of a scan order, and determine that the right second coding unit 1510b is split into an odd number of coding units, based on a result of the decision. According to an embodiment, when a coding unit is split into an odd number of coding units, the image reconstructing device 100 may put a predetermined restriction on a coding unit at a predetermined location among the split coding units. The restriction or the predetermined location has been described above in relation to various embodiments, and thus a detailed description thereof will not be provided here.

Figure 16:
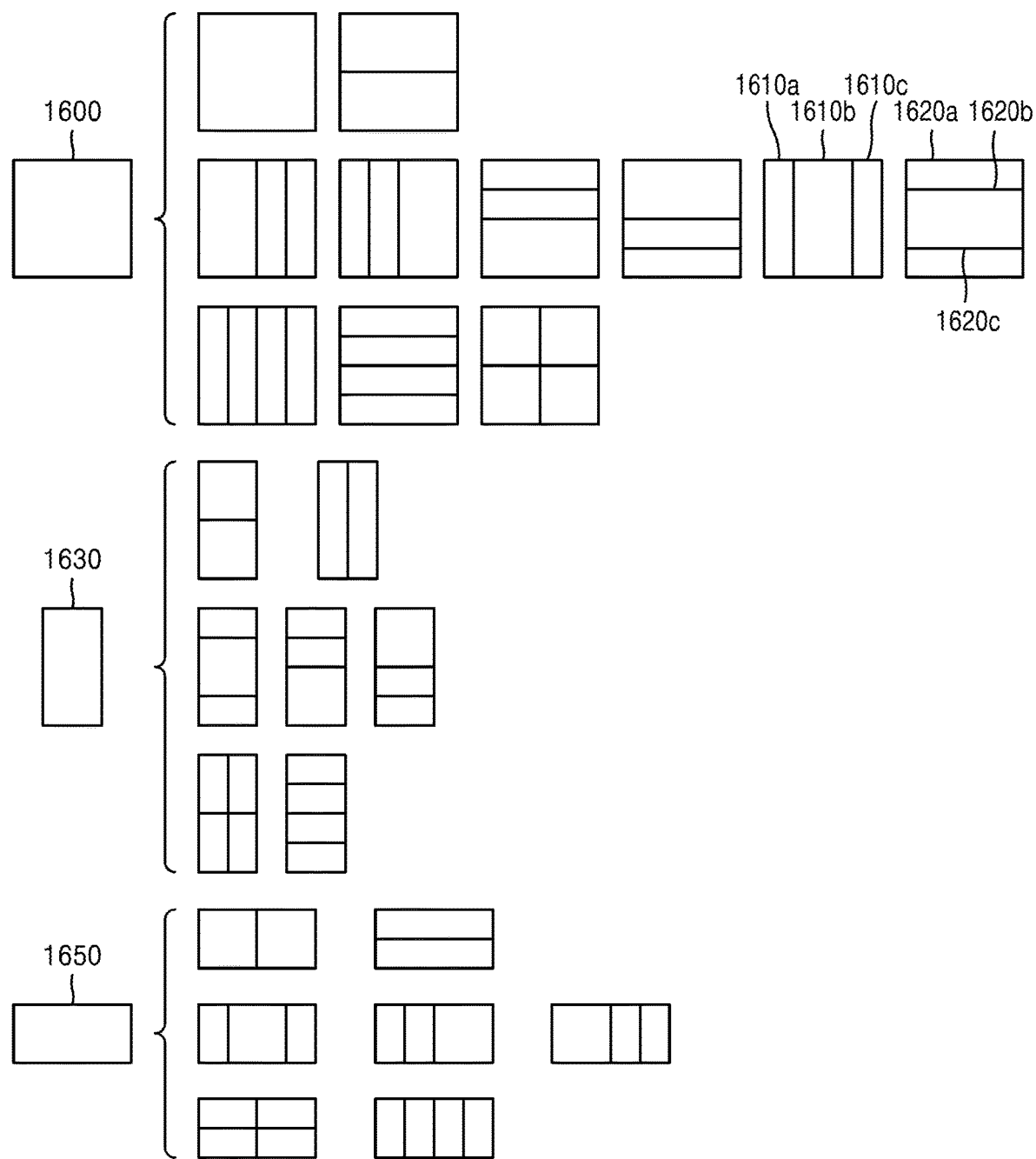
FIG. 16 illustrates a process of determining at least one coding unit by splitting a first coding unit, according to an embodiment.

FIG. 16 illustrates a process, performed by the image reconstructing device 100, of determining at least one coding unit by splitting a first coding unit 1600, according to an embodiment. According to an embodiment, the image reconstructing device 100 may split the first coding unit 1600, based on at least one of block shape information and split shape information, which is obtained by a receiver 210. The square first coding unit 1600 may be split into four square coding units or into a plurality of non-square coding units. For example, referring to FIG. 16, when the block shape information indicates that the first coding unit 1600 has a square shape and the split shape information indicates to split the first coding unit 1600 into non-square coding units, the image reconstructing device 100 may split the first coding unit 1600 into a plurality of non-square coding units. In detail, when the split shape information indicates to determine an odd number of coding units by splitting the first coding unit 1600 in a horizontal direction or a vertical direction, the image reconstructing device 100 may split the square first coding unit 1600 into an odd number of coding units, e.g., second coding units 1610a, 1610b, and 1610c determined by splitting the square first coding unit 1600 in a vertical direction or second coding units 1620a, 1620b, and 1620c determined by splitting the square first coding unit 1600 in a horizontal direction.

According to an embodiment, the image reconstructing device 100 may determine whether the second coding units 1610a, 1610b, 1610c, 1620a, 1620b, and 1620c included in the first coding unit 1600 satisfy a condition for processing in a predetermined order, and the condition relates to whether at least one of a width and height of the first coding unit 1600 is divided in half along a boundary of the second coding units 1610a, 1610b, 1610c, 1620a, 1620b, and 1620c. Referring to FIG. 16, because boundaries of the second coding units 1610a, 1610b, and 1610c determined by splitting the square first coding unit 1600 in a vertical direction do not divide the width of the first coding unit 1600 in half, it may be determined that the first coding unit 1600 does not satisfy the condition for processing in the predetermined order. In addition, because boundaries of the second coding units 1620a, 1620b, and 1620c determined by splitting the square first coding unit 1600 in a horizontal direction do not divide the width of the first coding unit 1600 in half, it may be determined that the first coding unit 1600 does not satisfy the condition for processing in the predetermined order. When the condition is not satisfied as described above, the image reconstructing device 100 may decide disconnection of a scan order, and may determine that the first coding unit 1600 is split into an odd number of coding units, based on a result of the decision. According to an embodiment, when a coding unit is split into an odd number of coding units, the image reconstructing device 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image reconstructing device 100 may determine various-shaped coding units by splitting a first coding unit.

Referring to FIG. 16, the image reconstructing device 100 may split the square first coding unit 1600 or a non-square first coding unit 1630 or 1650 into various-shaped coding units.

Figure 17:
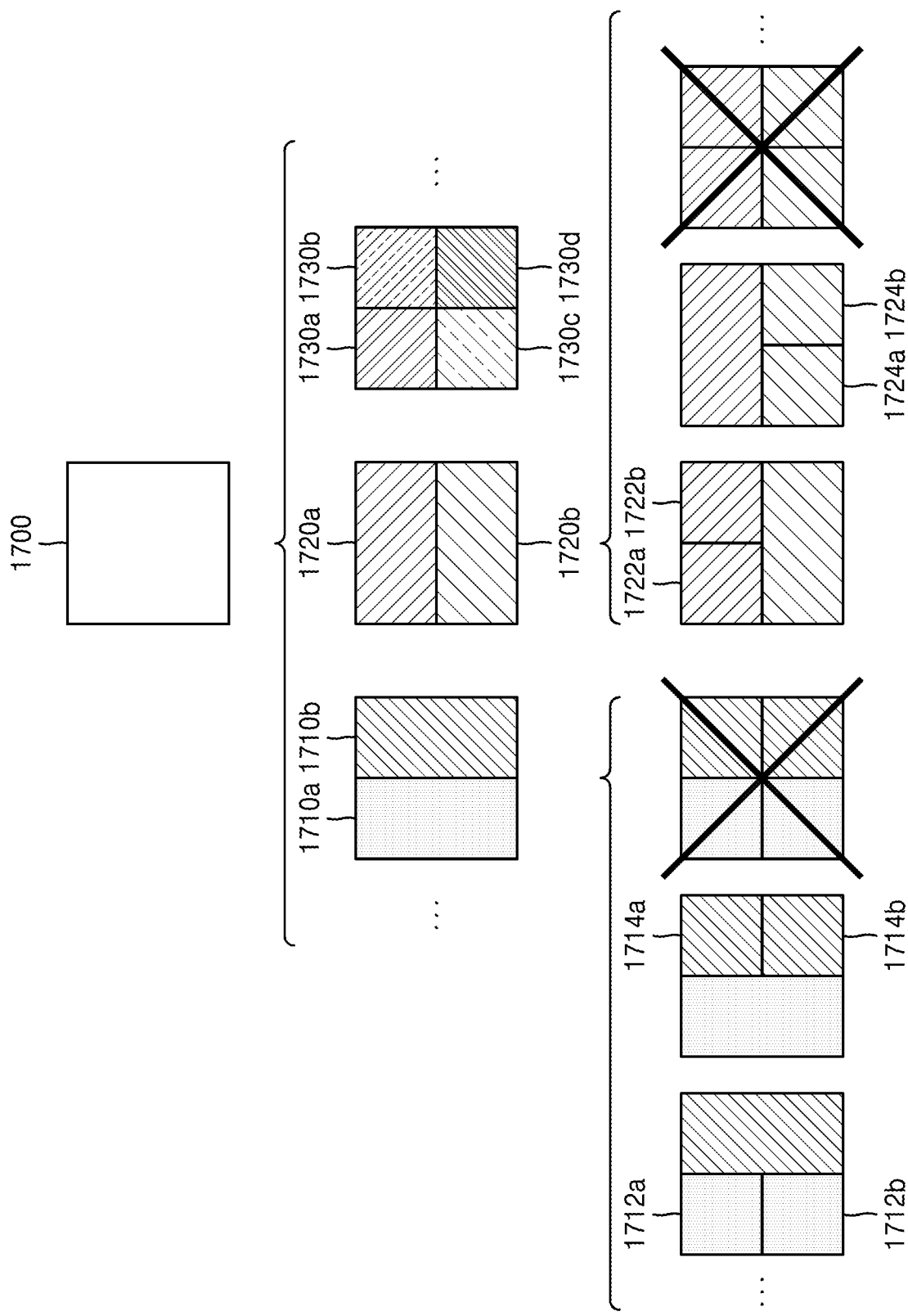
FIG. 17 illustrates that a shape into which a second coding unit is splittable is restricted when the second coding unit having a non-square shape, which is determined by splitting a first coding unit, satisfies a predetermined condition, according to an embodiment.

FIG. 17 illustrates that a shape into which a second coding unit is splittable by the image reconstructing device 100 is restricted when the second coding unit having a non-square shape, which is determined by splitting a first coding unit 1700, satisfies a predetermined condition, according to an embodiment.

According to an embodiment, the image reconstructing device 100 may determine to split the square first coding unit 1700 into non-square second coding units 1710a, 1710b, 1720a, and 1720b, based on at least one of block shape information and split shape information, which is obtained by the receiver 210. The second coding units 1710a, 1710b, 1720a, and 1720b may be independently split. As such, the image reconstructing device 100 may determine to split or not to split the first coding unit 1700 into a plurality of coding units, based on at least one of the block shape information and the split shape information of each of the second coding units 1710a, 1710b, 1720a, and 1720b. According to an embodiment, the image reconstructing device 100 may determine third coding units 1712a and 1712b by splitting the non-square left second coding unit 1710a, which is determined by splitting the first coding unit 1700 in a vertical direction, in a horizontal direction. However, when the left second coding unit 1710a is split in a horizontal direction, the image reconstructing device 100 may restrict the right second coding unit 1710b to not be split in a horizontal direction in which the left second coding unit 1710a is split. When third coding units 1714a and 1714b are determined by also splitting the right second coding unit 1710b in a horizontal direction, because the left and right second coding units 1710a and 1710b are independently split in a horizontal direction, the third coding units 1712a, 1712b, 1714a, and 1714b may be determined. However, this case serves equally as a case in which the image reconstructing device 100 splits the first coding unit 1700 into four square second coding units 1730a, 1730b, 1730c, and 1730d, based on at least one of the block shape information and the split shape information, and may be inefficient in terms of image decoding.

According to an embodiment, the image reconstructing device 100 may determine third coding units 1722a, 1722b, 1724a, and 1724b by splitting the non-square second coding unit 1720a or 1720b, which is determined by splitting the first coding unit 1700 in a horizontal direction, in a vertical direction. However, when a second coding unit (e.g., the upper second coding unit 1720a) is split in a vertical direction, for the above-described reason, the image reconstructing device 100 may restrict the other second coding unit (e.g., the lower second coding unit 1720b) to not be split in a vertical direction in which the upper second coding unit 1720a is split.

Figure 18:
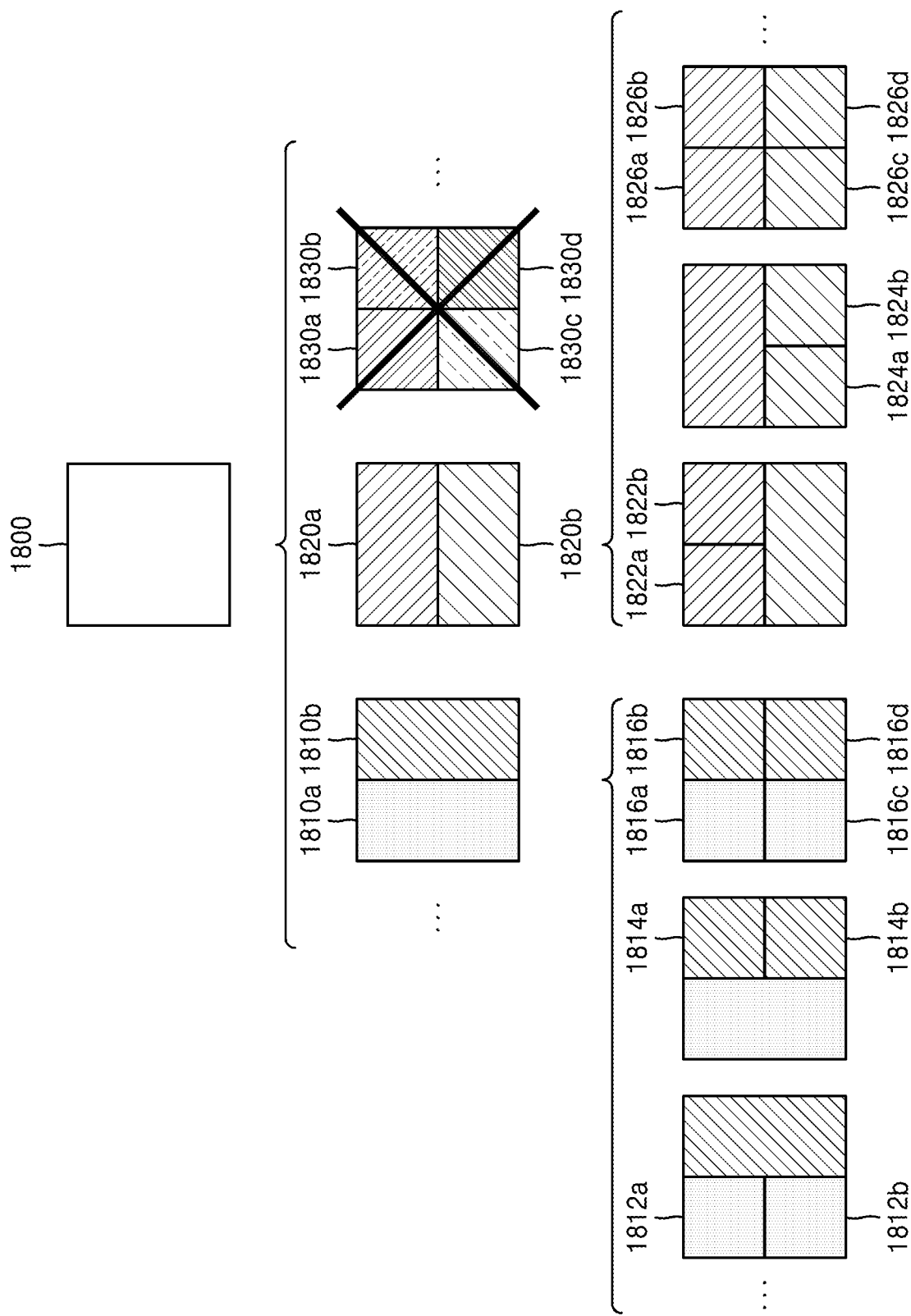
FIG. 18 illustrates a process of splitting a square coding unit when split shape information indicates that the square coding unit is not to be split into four square coding units, according to an embodiment.

FIG. 18 illustrates a process, performed by the image reconstructing device 100, of splitting a square coding unit when split shape information indicates that the square coding unit is not to be split into four square coding units, according to an embodiment.

According to an embodiment, the image reconstructing device 100 may determine second coding units 1810a, 1810b, 1820a, 1820b, etc. by splitting a first coding unit 1800, based on at least one of block shape information and split shape information. The split shape information may include information about various methods of splitting a coding unit but, the information about various splitting methods may not include information for splitting a coding unit into four square coding units. According to this split shape information, the image reconstructing device 100 may not split the first square coding unit 1800 into four square second coding units 1830a, 1830b, 1830c, and 1830d. The image reconstructing device 100 may determine the non-square second coding units 1810a, 1810b, 1820a, 1820b, etc., based on the split shape information.

According to an embodiment, the image reconstructing device 100 may independently split the non-square second coding units 1810a, 1810b, 1820a, 1820b, etc. Each of the second coding units 1810a, 1810b, 1820a, 1820b, etc. may be recursively split in a predetermined order, and this may correspond to a splitting method of the first coding unit 1800, based on at least one of the block shape information and the split shape information.

For example, the image reconstructing device 100 may determine square third coding units 1812a and 1812b by splitting the left second coding unit 1810a in a horizontal direction, and determine square third coding units 1814a and 1814*b* by splitting the right second coding unit 1810*b* in a horizontal direction. Furthermore, the image reconstructing device 100 may determine square third coding units 1816*a* to 1816*d* by splitting both of the left and right second coding units 1810*a* and 1810*b* in a horizontal direction. In this case, coding units having the same shape as the four square second coding units 1830*a*, 1830*b*, 1830*c*, and 1830*d* split from the first coding unit 1800 may be determined.

As another example, the image reconstructing device 100 may determine square third coding units 1822*a* and 1822*b* by splitting the upper second coding unit 1820*a* in a vertical direction, and may determine square third coding units 1824*a* and 1824*b* by splitting the lower second coding unit 1820*b* in a vertical direction. Furthermore, the image reconstructing device 100 may determine square third coding units 1826*a*, 1826*b*, 1826*c*, and 1826*d* by splitting both of the upper and lower second coding units 1820*a* and 1820*b* in a vertical direction. In this case, coding units having the same shape as the four square second coding units 1830*a*, 1830*b*, 1830*c*, and 1830*d* split from the first coding unit 1800 may be determined.

Figure 19:
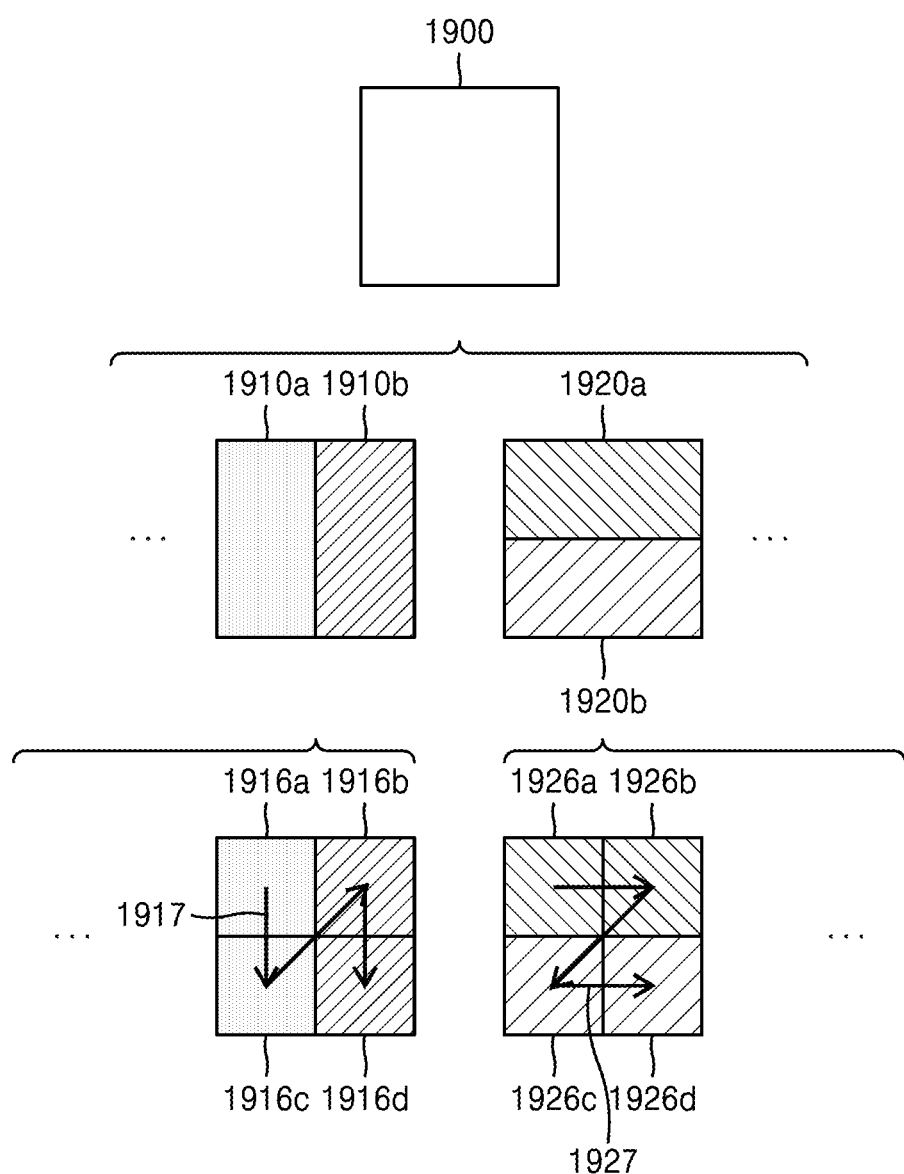
FIG. 19 illustrates that a processing order between a plurality of coding units may be changed depending on a process of splitting a coding unit, according to an embodiment.

FIG. 19 illustrates that a processing order between a plurality of coding units may be changed depending on a process of splitting a coding unit, according to an embodiment.

According to an embodiment, the image reconstructing device 100 may split a first coding unit 1900, based on block shape information and split shape information. When the block shape information indicates a square shape and the split shape information indicates to split the first coding unit 1900 in at least one of horizontal and vertical directions, the image reconstructing device 100 may determine second coding units 1910*a*, 1910*b*, 1920*a*, 1920*b*, 1930*a*, 1930*b*, 1930*c*, and 1930*d* by splitting the first coding unit 1900. Referring to FIG. 19, the non-square second coding units 1910*a*, 1910*b*, 1920*a*, and 1920*b* determined by splitting the first coding unit 1900 in only a horizontal direction or vertical direction may be independently split based on the block shape information and the split shape information of each coding unit. For example, the image reconstructing device 100 may determine third coding units 1916*a*, 1916*b*, 1916*c*, and 1916*d* by splitting the second coding units 1910*a* and 1910*b*, which are generated by splitting the first coding unit 1900 in a vertical direction, in a horizontal direction, and determine third coding units 1926*a*, 1926*b*, 1926*c*, and 1926*d* by splitting the second coding units 1920*a* and 1920*b*, which are generated by splitting the first coding unit 1900 in a horizontal direction, in a vertical direction. An operation of splitting the second coding units 1910*a*, 1910*b*, 1920*a*, and 1920*b* has been described above in relation to FIG. 17, and thus detailed descriptions thereof will not be provided herein.

According to an embodiment, the image reconstructing device 100 may process coding units in a predetermined order. An operation of processing coding units in a predetermined order has been described above in relation to FIG. 14, and thus detailed descriptions thereof will not be provided herein. Referring to FIG. 19, the image reconstructing device 100 may determine four square third coding units 1916*a*, 1916*b*, 1916*c*, and 1916*d*, and 1926*a*, 1926*b*, 1926*c*, and 1926*d* by splitting the square first coding unit 1900. According to an embodiment, the image reconstructing device 100 may determine a processing order of the third coding units 1916*a*, 1916*b*, 1916*c*, 1916*d*, 1926*a*, 1926*b*, 1926*c*, and 1926*d* based on a splitting method of the first coding unit 1900.

According to an embodiment, the image reconstructing device 100 may determine the third coding units 1916*a*, 1916*b*, 1916*c*, and 1916*d* by splitting the second coding units 1910*a* and 1910*b* generated by splitting the first coding unit 1900 in a vertical direction, in a horizontal direction, and may process the third coding units 1916*a*, 1916*b*, 1916*c*, and 1916*d* in a processing order 1917 for initially processing the third coding units 1916*a* and 1916*c*, which are included in the left second coding unit 1910*a*, in a vertical direction and then processing the third coding unit 1916*b* and 1916*d*, which are included in the right second coding unit 1910*b*, in a vertical direction.

According to an embodiment, the image reconstructing device 100 may determine the third coding units 1926*a*, 1926*b*, 1926*c*, and 1926*d* by splitting the second coding units 1920*a* and 1920*b* generated by splitting the first coding unit 1900 in a horizontal direction, in a vertical direction, and process the third coding units 1926*a*, 1926*b*, 1926*c*, and 1926*d* in a processing order 1927 for initially processing the third coding units 1926*a* and 1926*b*, which are included in the upper second coding unit 1920*a*, in a horizontal direction and then processing the third coding unit 1926*c* and 1926*d*, which are included in the lower second coding unit 1920*b*, in a horizontal direction.

Referring to FIG. 19, the square third coding units 1916*a*, 1916*b*, 1916*c*, 1916*d*, 1926*a*, 1926*b*, 1926*c*, and 1926*d* may be determined by splitting the second coding units 1910*a*, 1910*b*, 1920*a*, and 1920*b*. Although the second coding units 1910*a* and 1910*b* are determined by splitting the first coding unit 1900 in a vertical direction differently from the second coding units 1920*a* and 1920*b* which are determined by splitting the first coding unit 1900 in a horizontal direction, the third coding units 1916*a*, 1916*b*, 1916*c*, 1916*d*, 1926*a*, 1926*b*, 1926*c*, and 1926*d* split therefrom eventually show same-shaped coding units split from the first coding unit 1900. As such, by recursively splitting a coding unit in different manners based on at least one of the block shape information and the split shape information, the image reconstructing device 100 may process a plurality of coding units in different orders even when the coding units are eventually determined to be the same shape.

FIG. 20 illustrates a process of determining a depth of a coding unit as a shape and size of the coding unit change, when the coding unit is recursively split such that a plurality of coding units are determined, according to an embodiment.

According to an embodiment, the image reconstructing device 100 may determine the depth of the coding unit based on a predetermined criterion. For example, the predetermined criterion may be the length of a long side of the coding unit. When the length of a long side of a coding unit before being split is 2n times (n>0) the length of a long side of a split current coding unit, the image reconstructing device 100 may determine that a depth of the current coding unit is increased from a depth of the coding unit before being split, by n. In the following description, a coding unit having an increased depth is expressed as a coding unit of a deeper depth.

Referring to FIG. 20, according to an embodiment, the image reconstructing device 100 may determine a second coding unit 2002 and a third coding unit 2004 of deeper depths by splitting a square first coding unit 2000 based on block shape information indicating a square shape (for example, the block shape information may be expressed as '0: SQUARE'). Assuming that the size of the square first coding unit 2000 is 2N×2N, the second coding unit 2002 determined by dividing a width and height of the first coding unit 2000 to $½^1$ may have a size of N×N. Furthermore, the third coding unit 2004 determined by reducing a width and height of the second coding unit 2002 to ½ may have a size of N/2×N/2. In this case, a width and height of the third coding unit 2004 are $½^2$ times those of the first coding unit 2000. When a depth of the first coding unit 2000 is D, a depth of the second coding unit 2002, the width and height of which are $½^1$ times those of the first coding unit 2000, may be D+1, and a depth of the third coding unit 2004, the width and height of which are $½^2$ times those of the first coding unit 2000, may be D+2.

According to an embodiment, the image reconstructing device 100 may determine a second coding unit 2012 or 2022 and a third coding unit 2014 or 2024 of deeper depths by splitting a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image reconstructing device 100 may determine a second coding unit 2002, 2012, or 2022 by dividing at least one of a width and height of the first coding unit 2010 having a size of N×2N. That is, the image reconstructing device 100 may determine the second coding unit 2002 having a size of N×N or the second coding unit 2022 having a size of N×N/2 by splitting the first coding unit 2010 in a horizontal direction, or determine the second coding unit 2012 having a size of N/2×N by splitting the first coding unit 2010 in horizontal and vertical directions.

According to an embodiment, the image reconstructing device 100 may determine the second coding unit 2002, 2012, or 2022 by dividing at least one of a width and height of the first coding unit 2020 having a size of 2N×N. That is, the image reconstructing device 100 may determine the second coding unit 2002 having a size of N×N or the second coding unit 2012 having a size of N/2×N by splitting the first coding unit 2020 in a vertical direction, or may determine the second coding unit 2022 having a size of N×N/2 by splitting the first coding unit 2020 in horizontal and vertical directions.

According to an embodiment, the image reconstructing device 100 may determine a third coding unit 2004, 2014, or 2024 by dividing at least one of a width and height of the second coding unit 2002 having a size of N×N. That is, the image reconstructing device 100 may determine the third coding unit 2004 having a size of N/2×N/2, the third coding unit 2014 having a size of $N/2^2$×N/2, or the third coding unit 2024 having a size of $N/2×N/2^2$ by splitting the second coding unit $200^2$ in vertical and horizontal directions.

According to an embodiment, the image reconstructing device 100 may determine the third coding unit 2004, 2014, or 2024 by dividing at least one of a width and height of the second coding unit 2012 having a size of N/2×N. That is, the image reconstructing device 100 may determine the third coding unit 2004 having a size of N/2×N/2 or the third coding unit 2024 having a size of $N/2×N/2^2$ by splitting the second coding unit 2012 in a horizontal direction, or determine the third coding unit 2014 having a size of $N/2^2$×N/2 by splitting the second coding unit 2012 in vertical and horizontal directions.

According to an embodiment, the image reconstructing device 100 may determine the third coding unit 2004, 2014, or 2024 by dividing at least one of a width and height of the second coding unit 2022 having a size of N×N/2. That is, the image reconstructing device 100 may determine the third coding unit 2004 having a size of N/2×N/2 or the third coding unit 2014 having a size of $N/2^2$×N/2 by splitting the second coding unit 2022 in a vertical direction, or determine the third coding unit 2024 having a size of $N/2×N/2^2$ by splitting the second coding unit 2022 in vertical and horizontal directions.

According to an embodiment, the image reconstructing device 100 may split the square coding unit 2000, 2002, or 2004 in a horizontal or vertical direction. For example, the image reconstructing device 100 may determine the first coding unit 2010 having a size of N×2N by splitting the first coding unit 2000 having a size of 2N×2N in a vertical direction, or determine the first coding unit 2020 having a size of 2N×N by splitting the first coding unit 2000 in a horizontal direction. According to an embodiment, when a depth is determined based on the length of the longest side of a coding unit, a depth of a coding unit determined by splitting the first coding unit 2000, 2002 or 2004 having a size of 2N×2N in a horizontal or vertical direction may be the same as the depth of the first coding unit 2000, 2002 or 2004.

According to an embodiment, a width and height of the third coding unit 2014 or 2024 may be $½^2$ times those of the first coding unit 2010 or 2020. When a depth of the first coding unit 2010 or 2020 is D, a depth of the second coding unit 2012 or 2022, the width and height of which are ½ times those of the first coding unit 2010 or 2020, may be D+1, and a depth of the third coding unit 2014 or 2024, the width and height of which are $½^2$ times those of the first coding unit 2010 or 2020, may be D+2.

Figure 21:
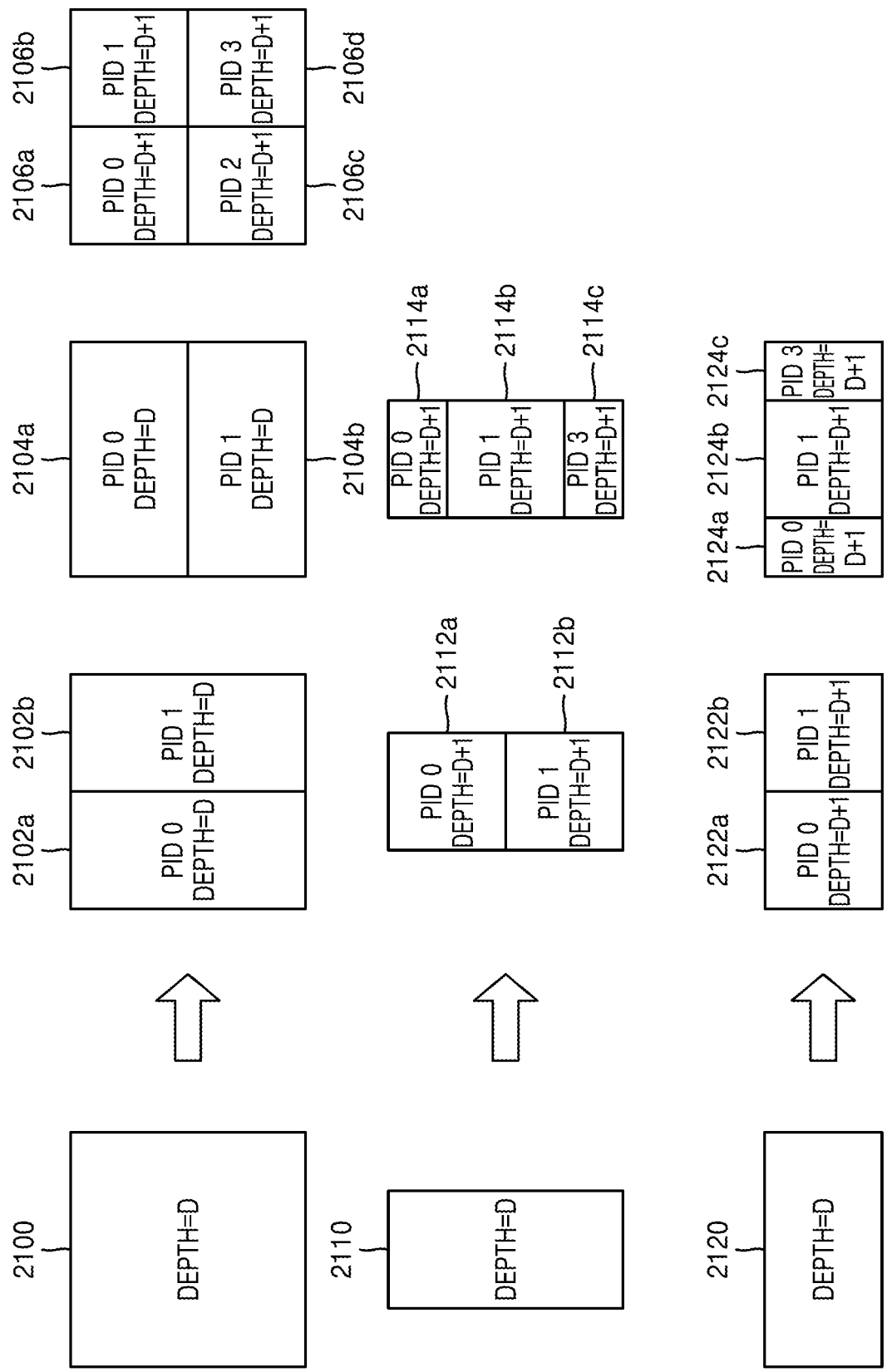
FIG. 21 illustrates depths that are determinable based on shapes and sizes of coding units, and part indexes (PIDs) that are for distinguishing the coding units, according to an embodiment.

FIG. 21 illustrates depths that are determinable based on shapes and sizes of coding units, and part indexes (PIDs) that are for distinguishing the coding units, according to an embodiment.

According to an embodiment, the image reconstructing device 100 may determine various-shaped second coding units by splitting a square first coding unit 2100. Referring to FIG. 21, the image reconstructing device 100 may determine second coding units 2102a, 2102b, 2104a, 2104b, 2106a, 2106b, 2106c, and 2106d by splitting the first coding unit 2100 in at least one of vertical and horizontal directions based on split shape information. That is, the image reconstructing device 100 may determine the second coding units 2102a, 2102b, 2104a, 2104b, 2106a, 2106b, 2106c, and 2106d based on the split shape information of the first coding unit 2100.

According to an embodiment, a depth of the second coding units 2102a, 2102b, 2104a, 2104b, 2106a, 2106b, 2106c, and 2106d, which are determined based on the split shape information of the square first coding unit 2100, may be determined based on the length of a long side thereof. For example, because the length of a side of the square first coding unit 2100 equals the length of a long side of the non-square second coding units 2102a, 2102b, 2104a, and 2104b, the first coding unit 2100 and the non-square second coding units 2102a, 2102b, 2104a, and 2104b may have the same depth, e.g., D. However, when the image reconstructing device 100 splits the first coding unit 2100 into the four square second coding units 2106a, 2106b, 2106c, and 2106d based on the split shape information, because the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the image reconstructing device 100 may determine a plurality of second coding units 2112a, 2112b, 2114a, 2114b, and 2114c by splitting a first coding unit 2110, a height of which is longer than a width, in a horizontal direction based on the split shape information. According to an embodiment, the image reconstructing device 100 may determine a plurality of second coding units 2122a, 2122b, 2124a, 2124b, and 2124c by splitting a first coding unit 2120, a width of which is longer than a height, in a vertical direction based on the split shape information.

According to an embodiment, a depth of the second coding units 2112a, 2112b, 2114a, 2114b, 2114c, 2122a, 2122b, 2124a, 2124b, and 2124c, which are determined based on the split shape information of the non-square first coding unit 2110 or 2120, may be determined based on the length of a long side thereof. For example, because the length of a side of the square second coding units 2112a and 2112b is ½ times the length of a long side of the first coding unit 2110 having a non-square shape, a height of which is longer than a width, a depth of the square second coding units 2112a and 2112b is D+1 which is deeper than the depth D of the non-square first coding unit 2110 by 1.

Furthermore, the image reconstructing device 100 may split the non-square first coding unit 2110 into an odd number of second coding units 2114a, 2114b, and 2114c based on the split shape information. The odd number of second coding units 2114a, 2114b, and 2114c may include the non-square second coding units 2114a and 2114c and the square second coding unit 2114b. In this case, because the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The image reconstructing device 100 may determine depths of coding units split from the first coding unit 2120 having a non-square shape, a width of which is longer than a height, by using the above-described method of determining depths of coding units split from the first coding unit 2110.

According to an embodiment, the image reconstructing device 100 may determine PIDs for identifying split coding units, based on a size ratio between the coding units when an odd number of split coding units do not have equal sizes. Referring to FIG. 21, a coding unit 2114b of a center location among an odd number of split coding units 2114a, 2114b, and 2114c may have a width equal to that of the other coding units 2114a and 2114c and a height which is two times that of the other coding units 2114a and 2114c. That is, in this case, the coding unit 2114b at the center location may include two of the other coding unit 2114a or 2114c. Therefore, assuming that a PID of the coding unit 2114b at the center location is 1 based on a scan order, a PID of the coding unit 2114c located next to the coding unit 2114b may be increased by 2 and thus may be 3. That is, discontinuity in PID values may be present. According to an embodiment, the image reconstructing device 100 may determine whether an odd number of split coding units do not have equal sizes, based on whether discontinuity is present in PIDs for identifying the split coding units.

According to an embodiment, the image reconstructing device 100 may determine whether to use a specific splitting method, based on PID values for identifying a plurality of coding units determined by splitting a current coding unit. Referring to FIG. 21, the image reconstructing device 100 may determine an even number of coding units 2112a and 2112b or an odd number of coding units 2114a, 2114b, and 2114c by splitting the first coding unit 2110 having a rectangular shape, a height of which is longer than a width.

The image reconstructing device 100 may use PIDs to identify a plurality of coding units. According to an embodiment, the PID may be obtained from a sample of a predetermined location of each coding unit (e.g., a top left sample).

According to an embodiment, the image reconstructing device 100 may determine a coding unit at a predetermined location from among the split coding units, by using the PIDs for distinguishing the coding units. According to an embodiment, when the split shape information of the first coding unit 2110 having a rectangular shape, a height of which is longer than a width, indicates to split a coding unit into three coding units, the image reconstructing device 100 may split the first coding unit 2110 into three coding units 2114a, 2114b, and 2114c. The image reconstructing device 100 may assign a PID to each of the three coding units 2114a, 2114b, and 2114c. The image reconstructing device 100 may compare PIDs of an odd number of split coding units to determine a coding unit at a center location from among the coding units. The image reconstructing device 100 may determine the coding unit 2114b having a PID corresponding to a middle value among the PIDs of the coding units, as the coding unit at the center location from among the coding units determined by splitting the first coding unit 2110. According to an embodiment, the image reconstructing device 100 may determine PIDs for distinguishing split coding units, based on a size ratio between the coding units when the split coding units do not have equal sizes. Referring to FIG. 21, the coding unit 2114b generated by splitting the first coding unit 2110 may have a width equal to that of the other coding units 2114a and 2114c and a height which is two times that of the other coding units 2114a and 2114c. In this case, assuming that the PID of the coding unit 2114b at the center location is 1, the PID of the coding unit 2114c located next to the coding unit 2114b may be increased by 2 and thus may be 3. When the PID is not uniformly increased as described above, the image reconstructing device 100 may determine that a coding unit is split into a plurality of coding units including a coding unit having a size different from that of the other coding units. According to an embodiment, when the split shape information indicates to split a coding unit into an odd number of coding units, the image reconstructing device 100 may split a current coding unit in such a manner that a coding unit of a predetermined location among an odd number of coding units (e.g., a coding unit of a centre location) has a size different from that of the other coding units. In this case, the image reconstructing device 100, may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image reconstructing device 100 may use a predetermined data unit where a coding unit starts to be recursively split.

Figure 22:
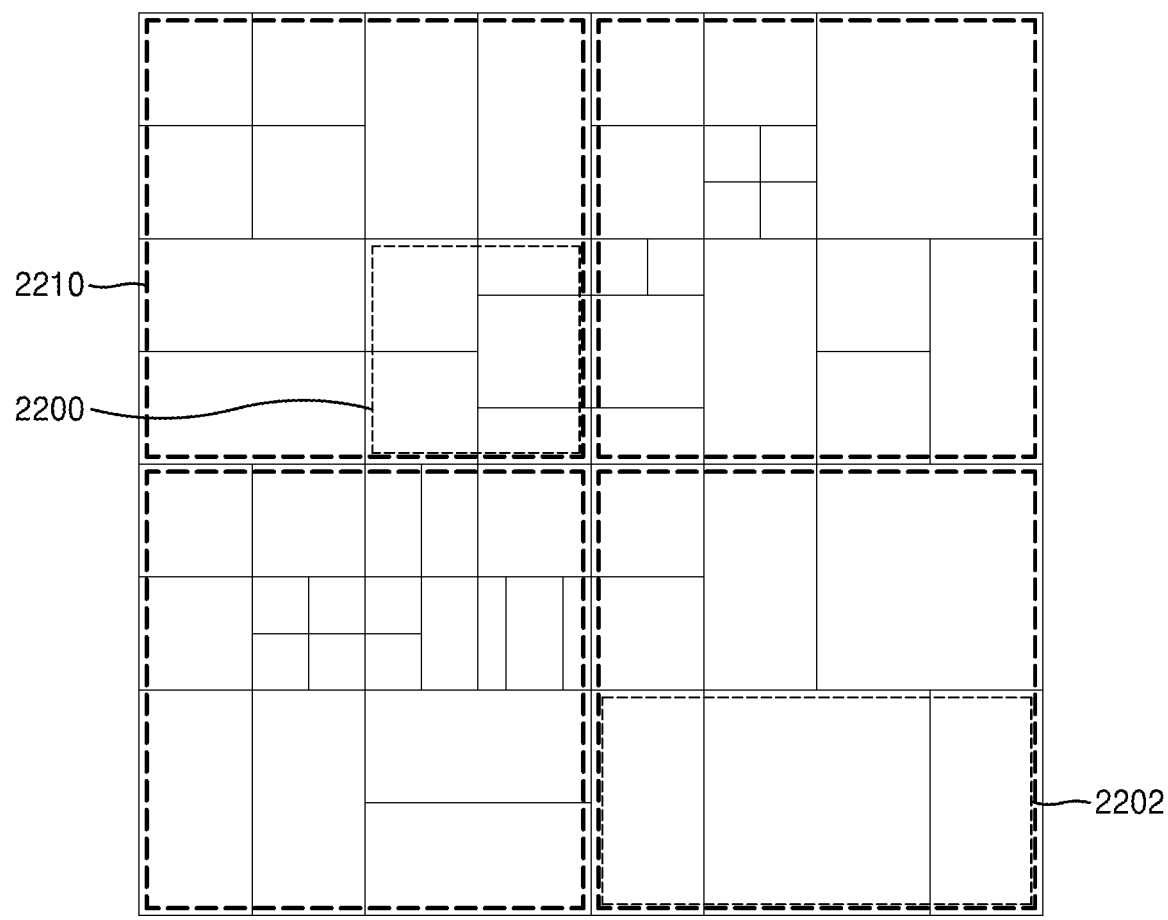
FIG. 22 illustrates that a plurality of coding units are determined based on a plurality of predetermined data units included in a picture, according to an embodiment.

FIG. 22 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following description, for convenience of explanation, the predetermined data unit is referred to as a reference data unit.

According to an embodiment, the reference data unit may have a predetermined size and shape. According to an embodiment, the reference data unit may include M×N samples. Herein, M and N may be equal to each other, and may be integers expressed as multipliers of 2. That is, the reference data unit may have a square or non-square shape, and may be an integer number of coding units.

According to an embodiment, the image reconstructing device 100 may split the current picture into a plurality of reference data units. According to an embodiment, the image reconstructing device 100 may split the plurality of reference data units, which are split from the current picture, by using splitting information about each reference data unit. The operation of splitting the reference data unit may correspond to a splitting operation using a quadtree structure.

According to an embodiment, the image reconstructing device 100 may previously determine the minimum size allowed for the reference data units included in the current picture. As such, the image reconstructing device 100 may determine various reference data units having sizes equal to or greater than the minimum size, and determine one or more coding units by using the block shape information and the split shape information with reference to the determined reference data unit.

Referring to FIG. 22, the image reconstructing device 100 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, and largest coding units).

According to an embodiment, the receiver 210 of the image reconstructing device 100 may obtain, from a bitstream, at least one of reference coding unit shape information and reference coding unit size information with respect to each of the various data units. An operation of splitting the square reference coding unit 2200 into one or more coding units has been described above in relation to the operation of splitting the current coding unit 1000 of FIG. 10, and an operation of splitting the non-square reference coding unit 2202 into one or more coding units has been described above in relation to the operation of splitting the current coding unit 1100 or 1150 of FIG. 11. Thus, detailed descriptions thereof will not be provided herein.

According to an embodiment, the image reconstructing device 100 may use a PID for identifying the size and shape of reference coding units, to determine the size and shape of reference coding units according to some data units previously determined based on a predetermined condition. That is, the receiver 210 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, and largest coding units). The image reconstructing device 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, because efficiency of using the bitstream may not be high, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image reconstructing device 100 may determine at least one of the size and shape of reference coding units included in a data unit serving as a unit for obtaining the PID, by selecting the previously determined at least one of the size and shape of reference coding units based on the PID.

According to an embodiment, the image reconstructing device 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image reconstructing device 100 may determine the reference coding units by splitting the largest coding unit n times based on a quadtree structure, and split the reference coding unit based on at least one of the block shape information and the split shape information according to various embodiments.

Figure 23:
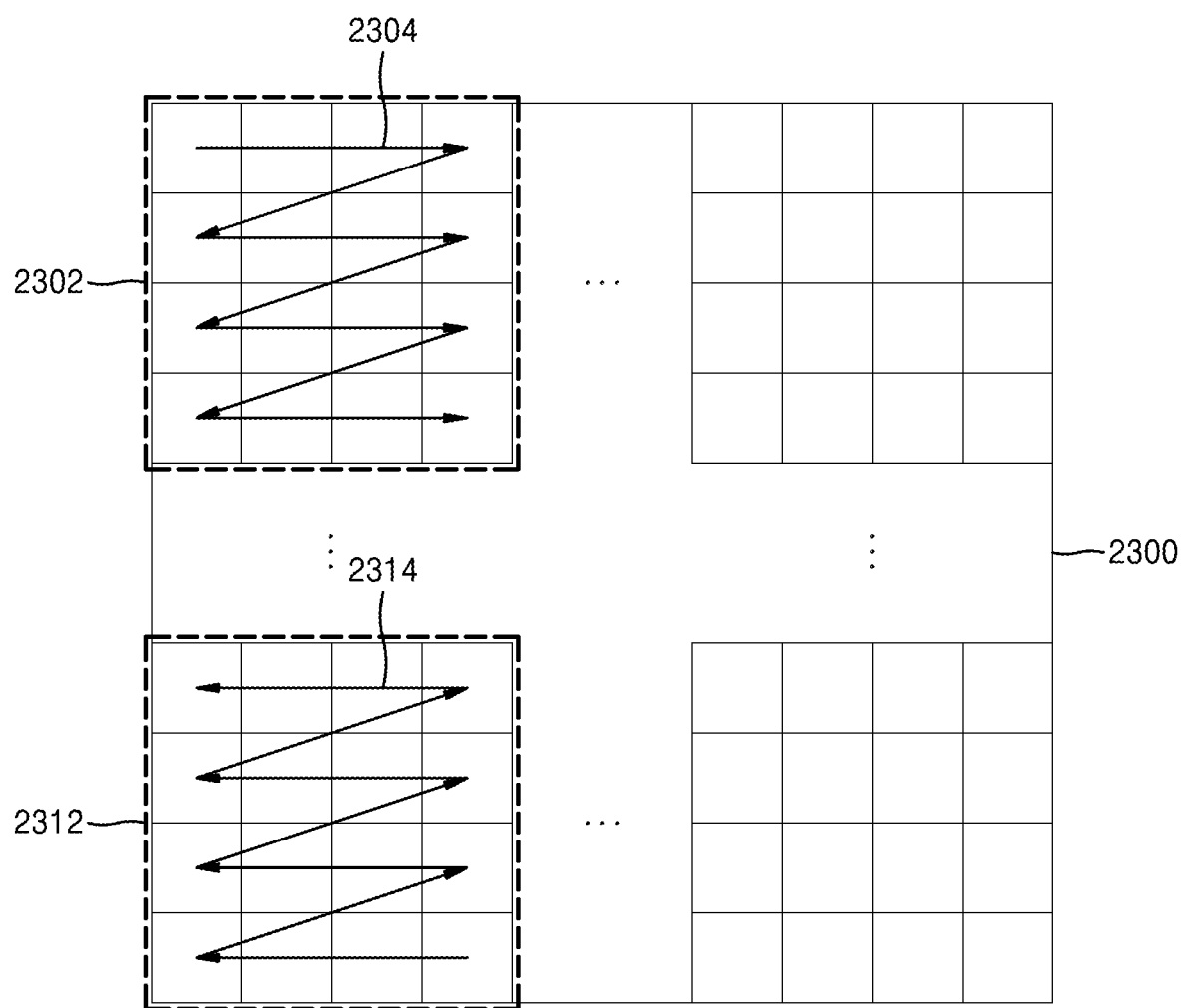
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the image reconstructing device 100 may determine one or more processing blocks split from a picture. The processing block is a data unit including one or more reference coding units split from a picture, and the one or more reference coding units included in the processing block may be determined in a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image reconstructing device 100 may obtain processing block size information and determine the size of one or more processing blocks included in the picture. The image reconstructing device 100 may obtain the processing block size information from a bitstream and determine the size of one or more processing blocks included in the picture. The size of processing blocks may be a predetermined size of data units, which is indicated by the processing block size information.

According to an embodiment, the receiver 210 of the image reconstructing device 100 may obtain the processing block size information from the bitstream according to each specific data unit. For example, the processing block size information may be obtained from the bitstream in a data unit such as an image, sequence, picture, slice, or slice segment. That is, the receiver 210 may obtain the processing block size information from the bitstream according to each of the various data units, and the image reconstructing device 100 may determine the size of one or more processing blocks, which are split from the picture, by using the obtained processing block size information. The size of the processing blocks may be integer times that of the reference coding units.

According to an embodiment, the image reconstructing device 100 may determine the size of processing blocks 2302 and 2312 included in the picture 2300. For example, the image reconstructing device 100 may determine the size of processing blocks based on the processing block size information obtained from the bitstream. Referring to FIG. 23, according to an embodiment, the image reconstructing device 100 may determine a width of the processing blocks 2302 and 2312 to be four times the width of the reference coding units, and may determine a height of the processing blocks 2302 and 2312 to be four times the height of the reference coding units. The image reconstructing device 100 may determine a determination order of one or more reference coding units in one or more processing blocks.

According to an embodiment, the image reconstructing device 100 may determine the processing blocks 2302 and 2312, which are included in the picture 2300, based on the size of processing blocks, and determine a determination order of one or more reference coding units in the processing blocks 2302 and 2312. According to an embodiment, determination of reference coding units may include determination of the size of the reference coding units.

According to an embodiment, the image reconstructing device 100 may obtain, from the bitstream, determination order information of one or more reference coding units included in one or more processing blocks, and determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image reconstructing device 100 may obtain the determination order information of reference coding units from the bitstream according to each specific data unit. For example, the receiver 210 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image reconstructing device 100 may determine one or more reference coding units based on the determined determination order.

According to an embodiment, the receiver 210 may obtain the determination order information of reference coding units from the bitstream as information related to the processing blocks 2302 and 2312, and the image reconstructing device 100 may determine a determination order of one or more reference coding units included in the processing blocks 2302 and 2312 and determine one or more reference coding units, which are included in the picture 2300, based on the determination order. Referring to FIG. 23, the image reconstructing device 100 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included in the processing block 2302 may be determined in a raster scan order. Unlike this, when the determination order 2314 of reference coding units in the other processing block 2312 is an inverse raster scan order, reference coding units included in the processing block 2312 may be determined in an inverse raster scan order.

According to an embodiment, the image reconstructing device 100 may decode the determined one or more reference coding units. The image reconstructing device 100 may decode the picture based on the reference coding units determined as described above. A method of decoding the reference coding units may include various image decoding methods.

According to an embodiment, the image reconstructing device 100 may obtain block shape information indicating the shape of a current coding unit or split shape information indicating a splitting method of the current coding unit, from the bitstream, and use the obtained information. The block shape information or the split shape information may be included in the bitstream related to various data units. For example, the image reconstructing device 100 may use the block shape information or the split shape information included in a sequence parameter set, a picture parameter set, a video parameter set, a slice header, or a slice segment header. Furthermore, the image reconstructing device 100 may obtain syntax corresponding to the block shape information or the split shape information from the bitstream according to each largest coding unit, reference coding unit, or processing block, and use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

Meanwhile, the afore-described embodiments of the present disclosure can be written as computer programs and can be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. A method performed by an electronic device for displaying an image, the method comprising:
   receiving a bitstream generated by encoding a first image;
   decoding the bitstream to obtain a second image;
   obtaining a third image upsampled from the second image by using a first deep neural network (DNN) for upsampling, based on upsampling target information; and
   providing, on a display of the electronic device, the third image,
   wherein the first image is generated by downsampling an original image by using a second DNN for downsampling, the second DNN is trained based on minimizing a weighted sum of first lossy information, second lossy information and third lossy information, the first lossy information is based on a first difference between a spatially decreased image and a downsampled image from an original image for training, the spatially decreased image being with respect to the original image for training, the second lossy information corresponds to structural complexity of the downsampled image, and the third lossy information is based on a second difference between an upsampled image from the downsampled image and the original image for training, and wherein the third lossy information is used to train the first DNN.

2. The method of claim 1, wherein the upsampling target information indicates a conversion degree of resolution of the first image.

3. The method of claim 1, wherein the upsampling target information is determined based on performance information about the display, compression history information, or a type of the original image.

4. The method of claim 1, wherein the first DNN is trained based on lossy information obtained by upsampling a downsampled image that is downsampled by the second DNN from the original image for training.

5. The method of claim 1, wherein the spatially decreased image has a structural characteristic of the original image for training,
wherein the structural characteristic comprises at least one of luminance of the original image for training, contrast of the original image for training, a histogram of the original image for training, an encoding quality, compression history information, or a type of the original image for training.

6. A method for providing an image by a server, the method comprising:
inputting an original image into a second deep neural network (DNN) for downsampling;
obtaining a first image downsampled from the original image by the second DNN;
obtaining image data by encoding the first image, and upsampling target information; and
providing an electronic device with the image data and the upsampling target information,
wherein a second image corresponding to the first image is upsampled by a first DNN for upsampling based on the upsampling target information, the second DNN is trained based on minimizing a weighted sum of first lossy information, second lossy information and third lossy information, the first lossy information is based on a first difference between a spatially decreased image and a downsampled image from an original image for training, the spatially decreased image being with respect to the original image for training, the second lossy information corresponds to structural complexity of the downsampled image, and the third lossy information is based on a second difference between an upsampled image from the downsampled image and the original image for training, and wherein the third lossy information is used to train the first DNN.

7. An electronic device for displaying an image, the electronic device comprising:
a display; and
one or more processors, when executing one or more instructions stored in the electronic device, configured to:
receive a bitstream generated by encoding a first image,
decode the bitstream to obtain a second image,
obtain a third image upsampled from the second image by using a first deep neural network (DNN) for upsampling, based on upsampling target information; and
provide, on the display, the third image,
wherein the first image is generated by downsampling an original image by using a second DNN for downsampling, the second DNN is trained based on minimizing a weighted sum of first lossy information, second lossy information and third lossy information, the first lossy information is based on a first difference between a spatially decreased image and a downsampled image from an original image for training, the spatially decreased image being with respect to the original image for training, the second lossy information corresponds to structural complexity of the downsampled image, and the third lossy information is based on a second difference between an upsampled image from the downsampled image and the original image for training, and wherein the third lossy information is used to train the first DNN.

* * * * *